(12) United States Patent
Kim et al.

(10) Patent No.: US 11,101,956 B2
(45) Date of Patent: Aug. 24, 2021

(54) METHOD FOR TRANSMITTING/RECEIVING REFERENCE SIGNAL IN WIRELESS COMMUNICATION SYSTEM, AND DEVICE THEREFOR

(71) Applicant: LG Electronics Inc., Seoul (KR)

(72) Inventors: Kyuseok Kim, Seoul (KR); Hyungtae Kim, Seoul (KR); Jiwon Kang, Seoul (KR); Seonwook Kim, Seoul (KR); Kilborn Lee, Seoul (KR); Hyunsoo Ko, Seoul (KR); Kijun Kim, Seoul (KR); Minki Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/708,240

(22) Filed: Dec. 9, 2019

(65) Prior Publication Data
US 2020/0266946 A1    Aug. 20, 2020

Related U.S. Application Data

(63) Continuation of application No. PCT/KR2018/002883, filed on Mar. 12, 2018.

(Continued)

(51) Int. Cl.
*H04L 5/00* (2006.01)
*H04B 1/713* (2011.01)
(Continued)

(52) U.S. Cl.
CPC .......... *H04L 5/0048* (2013.01); *H04B 1/713* (2013.01); *H04B 7/0452* (2013.01); *H04L 27/2601* (2013.01)

(58) Field of Classification Search
None
See application file for complete search history.

(56) References Cited

U.S. PATENT DOCUMENTS 9,426,800 B2 * 8/2016 Aiba ...................... H04L 5/0051
2011/0206089 A1 * 8/2011 Cho ........................ H04L 5/0016
375/141

(Continued)

FOREIGN PATENT DOCUMENTS

JP    2014192860    10/2014
KR   20120093026    8/2012

(Continued)

OTHER PUBLICATIONS

Huawei, HiSilicon, "Long duration PUCCH structure", R1-1706953, 3GPP TSG RAN WG1 Meeting #89, Hangzhou, China, May 15-19, 2017, 7 pages.

(Continued)

*Primary Examiner* — Otis L Thompson, Jr.
(74) *Attorney, Agent, or Firm* — Fish & Richardson P.C.

(57) ABSTRACT

The present disclosure relates to a method and a device for a terminal transmitting a reference signal in a wireless communication system. According to the present disclosure, a method and a device may be provided, the method comprising: receiving, from a base station, configuration information associated with a configuration of a first demodulation reference signal for demodulating uplink data; and on the basis of the configuration information, transmitting the first demodulation reference signal and the uplink data to the base station via at least one antenna port, wherein the first demodulation reference signal and the uplink data are transmitted in a sub frame by means of frequency hopping, and the first demodulation reference signal is positioned on the same time axial symbol as that of at least one other demodulation reference signal transmitted on another antenna port.

20 Claims, 35 Drawing Sheets

Related U.S. Application Data

(60) Provisional application No. 62/571,739, filed on Oct. 12, 2017, provisional application No. 62/570,581, filed on Oct. 10, 2017, provisional application No. 62/565,156, filed on Sep. 29, 2017, provisional application No. 62/517,210, filed on Jun. 9, 2017.

(51) Int. Cl.
  *H04B 7/0452* (2017.01)
  *H04L 27/26* (2006.01)

(56) References Cited

U.S. PATENT DOCUMENTS

| | | | |
|---|---|---|---|
| 2013/0022087 A1 | 1/2013 | Chen et al. | |
| 2015/0181568 A1* | 6/2015 | Seo | H04L 5/0053 370/329 |
| 2016/0380738 A1* | 12/2016 | Aiba | H04L 5/0035 370/329 |
| 2017/0041052 A1* | 2/2017 | Blankenship | H04L 1/08 |
| 2018/0145802 A1* | 5/2018 | Hwang | H04W 72/0453 |
| 2019/0199477 A1* | 6/2019 | Park | H04L 1/0693 |
| 2019/0280734 A1* | 9/2019 | Park | H04B 1/7143 |
| 2020/0052835 A1* | 2/2020 | Xiong | H04L 1/1861 |
| 2020/0059924 A1* | 2/2020 | Matsumura | H04L 5/0055 |
| 2020/0106591 A1* | 4/2020 | Chen | H04L 5/0007 |
| 2020/0221394 A1* | 7/2020 | Yoshimura | H04W 52/325 |
| 2020/0245372 A1* | 7/2020 | Lei | H04L 25/067 |
| 2021/0100003 A1* | 4/2021 | Liu | H04W 72/042 |

FOREIGN PATENT DOCUMENTS

| | | | |
|---|---|---|---|
| KR | 20120113698 | 10/2012 | |
| KR | 20160040580 | 4/2016 | |
| KR | 20170059911 | 5/2017 | |
| WO | WO2016130896 | 8/2016 | |
| WO | WO2017017971 | 2/2017 | |
| WO | WO-2018075963 A1 * | 4/2018 | ........... H04L 5/0051 |

OTHER PUBLICATIONS

Huawei, HiSilicon, "UL DMRS design for 2-symbol sPUSCH", R1-1701742, 3GPP TSG RAN WG1 Meeting #88, Athens, Greece, Feb. 13-17, 2017, 5 pages.
Huawei, HiSilicon, "UL DMRS design for data transmission", R1-1701696, 3GPP TSG RAN WG1 Meeting # 88, Athens, Greece, Feb. 13-17, 2017, 9 pages.
LG Electronics, "Design of long NR-PUCCH format", R1-1704909, 3GPP TSG RAN WG1 Meeting #88bis, Spokane, USA, Apr. 3-7, 2017, 7 pages.
3rd Generation Partnership Project; Technical Specification Group Radio Access Network; "Evolved Universal Terrestrial Radio Access (E-UTRA); Physical layer procedures (Release 8)," 3GPP TS 36.213 V8.8.0, dated Sep. 2009, 77 pages.
Ericsson, "Design aspects of sPUSCH," R1-167491, 3GPP TSG-RAN WG1 #86, Göteborg, Sweden, dated Aug. 22-26, 2016, 5 pages.
NTT Docomo, Inc., "UL DMRS design for sPUSCH," R1-1708422, 3GPP TSG RAN WGl Meeting #89, Hangzhou, P.R. China, dated May 15-19, 2017, 4 pages.
Ericsson, "On UL sTTI layout," R1-1703256, 3GPP TSG-RAN WG1 Meeting #88, Athens, Greece Feb. 13-17, 2017, 8 pages.
Korean Notice of Allowance in Korean Appln. No. 10-2020-7000743, dated Jul. 6, 2020, 12 pages (with English translation).
LG Electronics, "Discussion on DMRS density and structure to handle high Doppler case," R1-157436, 3GPP TSG RAN WG1 Meeting #83, Anaheim, USA, Nov. 15-22, 2015, 15 pages.
NTT Docomo, Inc., "sPUSCH for shortened TTI," R1-1612697, 3GPP TSG RAN WG1 Meeting #87, Reno, USA Nov. 14-18, 2016, 7 pages.
EP Extended European Search Report in European Appln. No. 18814006.5, dated Feb. 16, 2021, 9 pages.
JP Office Action in Japanese Appln. No. 2019-568056, dated Mar. 16, 2021, 6 pages (with English translation).
ZTE, "Discussion on downlink DMRS design," R1-1707130, 3GPP TSG RAN WG1 Meeting #89, Hangzhou, P.R. China, dated May 15-19, 2017, 11 pages.

* cited by examiner

FIG. 4
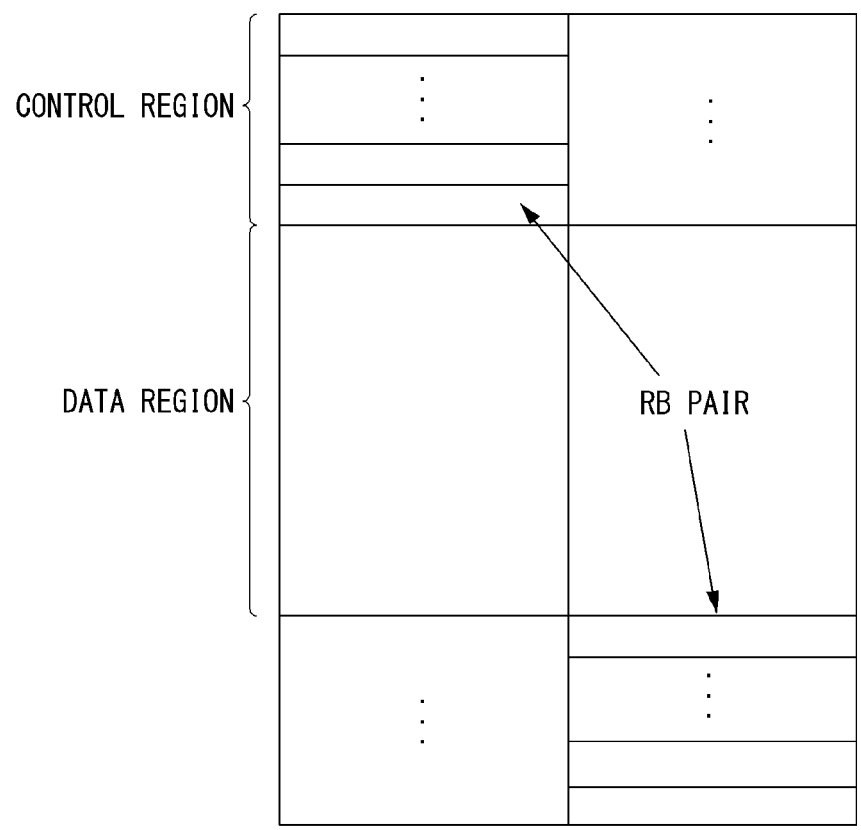
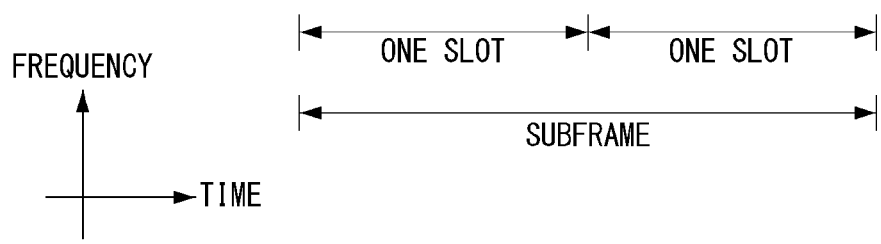

FIG. 9B  MULTIPLE CC

FIG. 9A  SINGLE CC

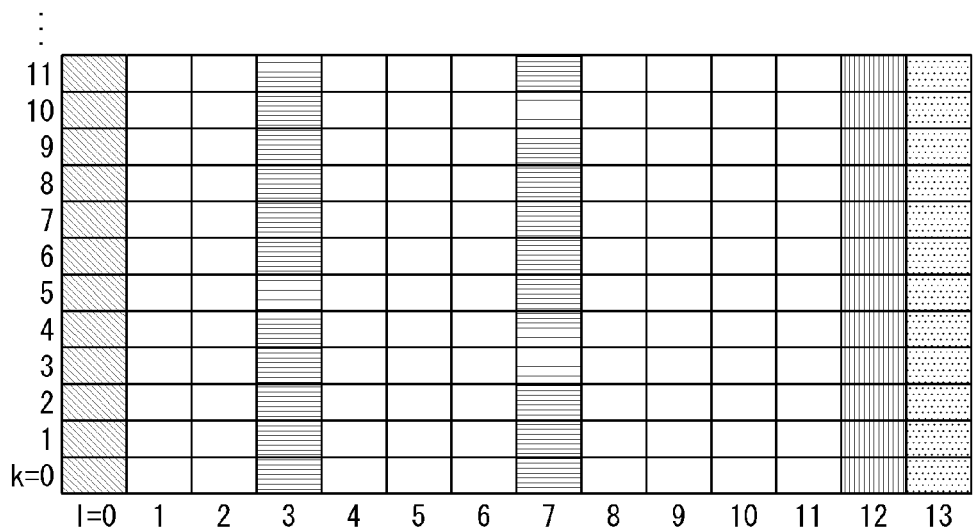
FIG. 21A
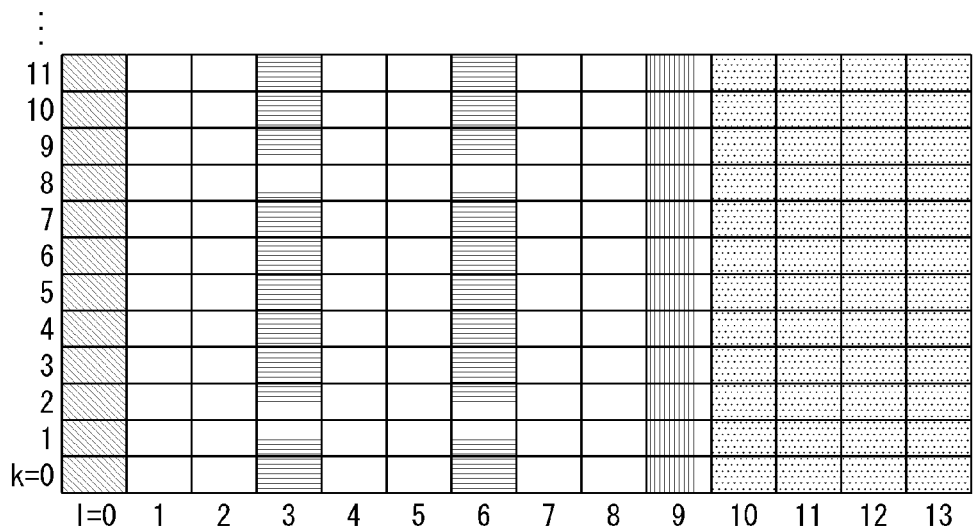
FIG. 21B
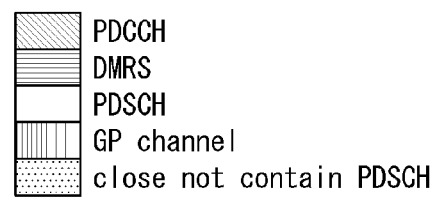

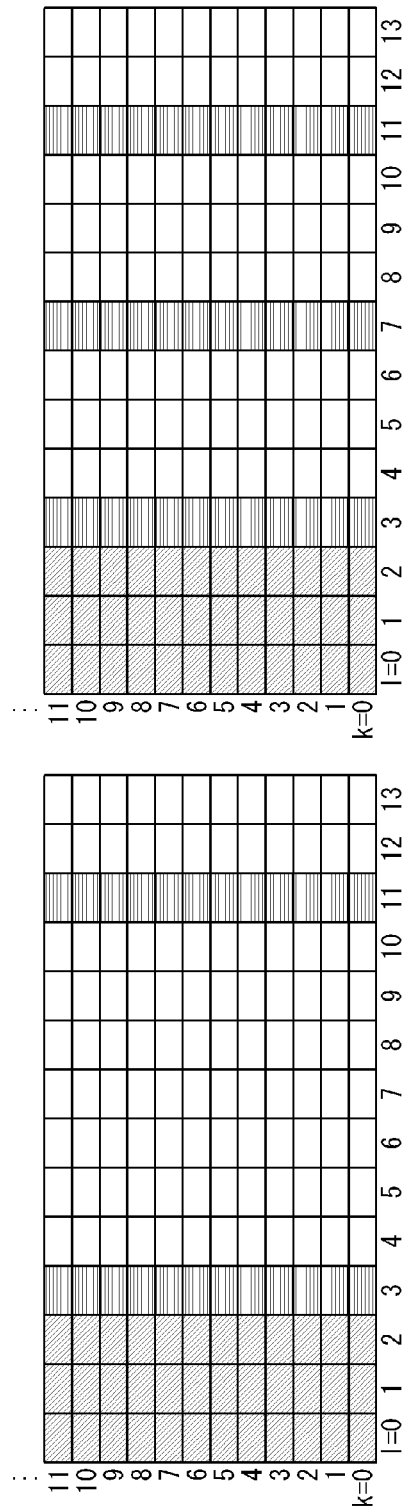
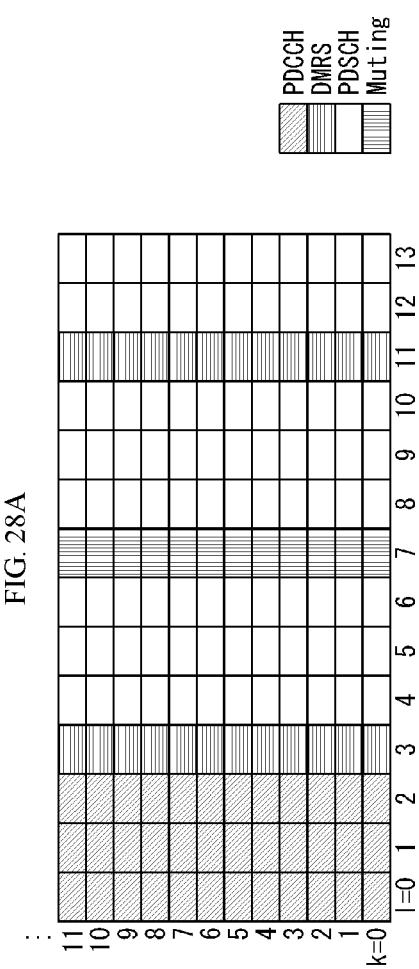
FIG. 28A
FIG. 28B
FIG. 28C

METHOD FOR TRANSMITTING/RECEIVING REFERENCE SIGNAL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2018/002883, filed on Mar. 12, 2018, which claims the benefit of U.S. Provisional Application No. 62/517,210, filed on Jun. 9, 2017, No. 62/565,156, filed on Sep. 29, 2017, No. 62/570,581, filed on Oct. 10, 2017, and No. 62/571,739, filed on Oct. 12, 2017, the contents of which are all hereby incorporated by reference herein in their entirety.

TECHNICAL FIELD

The present disclosure relates to a wireless communication system, and more particularly, a method and a device for generating a demodulation reference signal (DMRS) for decoding data and transmitting/receiving the generated DMRS in a wireless communication system.

BACKGROUND ART

A mobile communication system has been developed to provide voice services while ensuring the activity of a user. However, the mobile communication system has been expanded to its region up to data services in addition to the voice. Today, the shortage of resources is caused due to an explosive increase of traffic, and thus there is a need for a more advanced mobile communication system because users require higher speed services.

Requirements for a next-generation mobile communication system basically include the accommodation of explosive data traffic, a significant increase of a transfer rate per user, the accommodation of the significantly increased number of connection devices, very low end-to-end latency, and high energy efficiency. To this end, research is carried out on various technologies, such as dual connectivity, massive multiple input multiple output (MIMO), in-band full duplex, non-orthogonal multiple access (NOMA), super broadband support, and device networking.

DISCLOSURE

Technical Problem

The present disclosure has been made in an effort to provide a method and a device for generating and transmitting/receiving a Demodulation Reference Signal (DMRS) for decoding data.

Furthermore, the present disclosure has been made in an effort to provide a method and a device for generating and transmitting/receiving a DMRS for a Common Phase Error (CPE)/Carrier Frequency Offset (CFO) value due to a Doppler Effect.

Furthermore, the present disclosure has been made in an effort to provide a method and a device for transmitting a DMRS through frequency hopping in order to enhance transmission/reception performance of data by using a frequency diversity effect.

Furthermore, the present disclosure has been made in an effort to provide a method and a device for performing a multi user (MU)-multiple-input multiple output (MIMO) operation between UEs in which a DMRS is mapped to the same location or different locations.

The technical objects of the present disclosure are not limited to the aforementioned technical objects, and other technical objects, which are not mentioned above, will be apparently appreciated by a person having ordinary skill in the art from the following description.

Technical Solution

In order to solve the technical problem, according to an embodiment of the present disclosure, a method for transmitting a reference signal by a terminal in a wireless communication system includes: receiving, from a base station, configuration information related to a configuration of a first demodulation reference signal for demodulating uplink data; and transmitting the first demodulation reference signal and the uplink data to the base station through at least one antenna port based on the configuration information, in which the first demodulation reference signal and the uplink data are transmitted by using frequency hopping in a subframe, and the first demodulation reference signal is positioned on the same time-axis symbol as at least one another demodulation reference signal transmitted on another antenna port.

Further, in the present disclosure, the frequency hopping is performed in units of one hop, and the hop includes at least one Orthogonal Frequency Division Multiplexing (OFDM) symbol to which the first demodulation reference signal is mapped.

Further, in the present disclosure, the first demodulation reference signal is transmitted in a first hop in the subframe and positioned in a first OFDM symbol of the first hop.

Further, in the present disclosure, the configuration information includes at least one of a first parameter indicating whether to apply the frequency hopping or resource information indicating a location of each hop in which the frequency hopping is performed in the subframe.

Furthermore, in the present disclosure, the method further includes transmitting a second demodulation reference signal to the base station through the at least one antenna port based on the configuration information, in which the second demodulation reference signal is transmitted in a second hop in the subframe and positioned in the first OFDM symbol of the second hop.

Furthermore, in the present disclosure, the terminal performs uplink multi user (MU)-multiple-input multiple output (MIMO) with another terminal.

Furthermore, in the present disclosure, the configuration information further includes pattern information of mapping patterns of the first demodulation reference signal and the second demodulation reference signal, and locations of OFDM symbols to which the first and second demodulation reference signals are mapped are the same as the location of a symbol to which the demodulation reference signal of another terminal is mapped.

Furthermore, in the present disclosure, the numbers and locations of OFDM symbols to which the first and second demodulation reference signals are mapped are the same as the number and locations of OFDM symbols to which the demodulation reference signal of the another terminal is mapped.

Furthermore, in the present disclosure, when the number and locations of OFDM symbols to which the first or second demodulation reference signal is mapped is different from the number and locations of OFDM symbols to which the demodulation reference signal of the another terminal is mapped, the OFDM symbol to which the demodulation reference signal of the another terminal is mapped is muted.

Furthermore, in the present disclosure, the configuration information further includes configuration information indicating the number and locations of OFDM symbols to which the demodulation reference signal of the another terminal is mapped.

Further, the present disclosure provides a terminal transmitting a reference signal in a wireless communication system, including: a radio frequency (RF) unit transmitting and receiving a radio signal to and from the outside; and a processor functionally coupled with the RF unit, in which the processor is configured to receive, from a base station, configuration information related to a configuration of a first demodulation reference signal for demodulating uplink data, and transmit the first demodulation reference signal and the uplink data to the base station through at least one antenna port based on the configuration information, the first demodulation reference signal and the uplink data are transmitted by using frequency hopping in a subframe, and the first demodulation reference signal is positioned on the same time-axis symbol as at least one another demodulation reference signal transmitted on another antenna port.

Advantageous Effects

According to the present disclosure, there is an effect that data can be decoded by estimating Common Phase Error (CPE) and Carrier Frequency Offset (CFO) values due to a Doppler Effect through a DMRS.

Furthermore, according to the present disclosure, there is an effect that the DMRS is transmitted by using frequency hopping to enhance transmission/reception performance of data by using a frequency diversity effect.

Furthermore, according to the present disclosure, there is an effect that when the DMRS is transmitted by using the frequency hopping, the DMRS is positioned at a first symbol of a hopped hop to enhance a decoding speed.

Furthermore, according to the present disclosure, there is an effect that an eNB configures DMRS patterns of UEs to perform an MU-MIMO operation between a UE performing the frequency hopping and a UE not performing the frequency hopping.

Furthermore, another UE mutes a resource element (RE) transmitting the DMRS to perform the MU-MIMO operation between the UEs even though the DMRS is mapped to the same location or different locations.

Advantages which can be obtained in the present disclosure are not limited to the aforementioned advantages and other unmentioned advantages will be clearly understood by those skilled in the art from the following description.

DESCRIPTION OF DRAWINGS

The accompanying drawings, which are included herein as a part of the description for help understanding the present disclosure, provide embodiments of the present disclosure, and describe the technical features of the present disclosure with the description below.

FIG. 4 is a diagram illustrating a structure of uplink subframe in a wireless communication system to which the present disclosure may be applied.

FIGS. 20 to 21B are diagrams illustrating one example of a method for determining whether to transmit a demodulation reference signal proposed by the present disclosure.

FIGS. 26 to 30B are diagrams illustrating one example of a mapping pattern of a demodulation reference signal for performing an MU-MIMO operation between UEs proposed by the present disclosure.

MODE FOR INVENTION

Figure 1A:
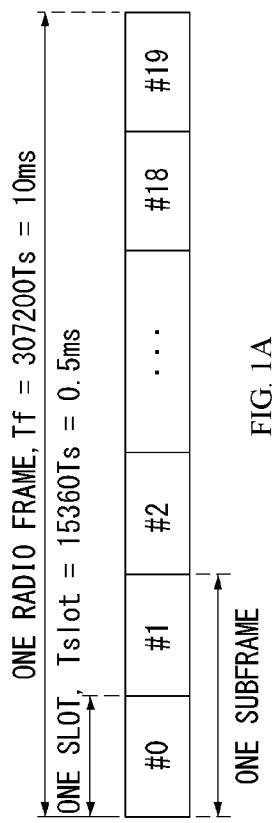
FIGS. 1A and 1B are diagrams illustrating the structure of a radio frame in a wireless communication system to which the present disclosure may be applied.

Reference will now be made in detail to the preferred embodiments of the present disclosure, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present disclosure. However, it will be apparent to those skilled in the art that these teachings may be implemented and practiced without these specific details.

In some instances, known structures and devices are omitted, or are shown in a block diagram form focused on important features of the structures and devices in order to avoid making obscure the concept of the present disclosure.

In present disclosure, a base station has a meaning as a terminal node of a network, directly communicating with a terminal. In this document, a specific operation illustrated as being performed by a base station may be performed by an upper node of the base station according to circumstances. That is, it is evident that in a network including multiple network nodes including a base station, various operations performed for communication with a terminal may be performed by the base station or other network nodes other than the base station. A "base station (BS)" may be substituted with a term, such as a fixed station, a Node B, an evolved-NodeB (eNB), a base transceiver system (BTS), an access point (AP) or a transmission stage. Furthermore, a "terminal" may be fixed or may have mobility, and may be substituted with a term, such as a user equipment (UE), a mobile station (MS), a user terminal (UT), a mobile subscriber station (MSS), a subscriber station (SS), an advanced mobile station (AMS), a wireless terminal (WT), a mMachine-type communication (MTC) device, a machine-to-machine (M2M) device, a device-to-device (D2D) device or a reception stage.

Hereinafter, downlink (DL) refers to communication from a base station to a UE, and uplink (UL) refers to communication from a UE to a base station. In downlink, a transmitter may be part of a base station, and a receiver may be part of a UE. In uplink, a transmitter may be part of a UE, and a receiver may be part of a base station.

Specific terms used in the following description are provided to help understanding of the present disclosure. The use of such specific terms may be changed in other forms without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service(GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA(Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present disclosure may be based on standard documents disclosed in at least one of IEEE 802, 3GPP, and 3GPP2 which are the wireless access systems. That is, steps or parts which are not described to definitely show the technical spirit of the present disclosure among the embodiments of the present disclosure may be based on the documents. Further, all terms disclosed in the document may be described by the standard document.

3GPP LTE/LTE-A is primarily described for clear description, but technical features of the present disclosure are not limited thereto.

Figure 1B:
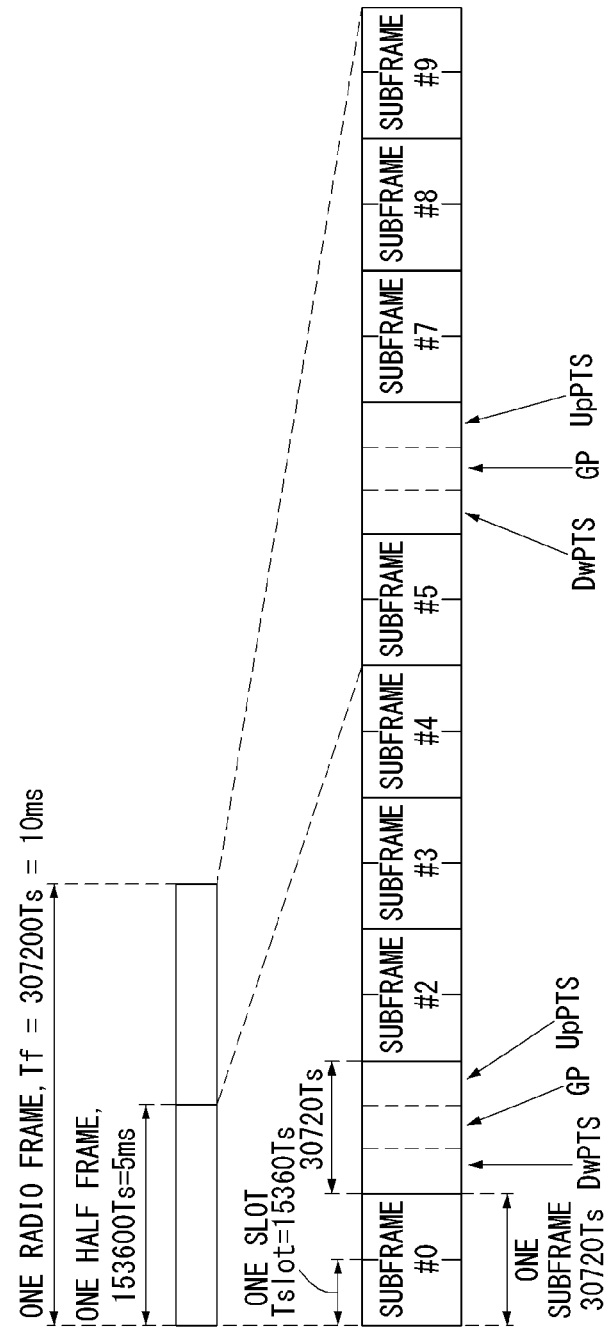

General Wireless Communication System to which the Present Disclosure May be Applied FIGS. 1A and 1B show the structure of a radio frame in a wireless communication system to which the present disclosure may be applied.

3GPP LTE/LTE-A supports a type 1 radio frame structure applicable to frequency division duplex (FDD) and a type 2 radio frame structure applicable to time division duplex (TDD).

In FIGS. 1A and 1B, the size of the radio frame in the time domain is represented as a multiple of a time unit of $T\_s=1/(15000*2048)$. Downlink and uplink transmission are configured with a radio frame having a period of $T\_f=307200*T\_s=10$ ms.

FIG. 1A illustrates the structure of the type 1 radio frame. The Type 1 radio frame may be applied to both full duplex and half duplex FDD.

The radio frame includes 10 subframes. One radio frame includes 20 slots of $T\_slot=15360*T\_s=0.5$ ms length. The slots are assigned indices from 0 to 19. One subframe includes contiguous 2 slots in the time domain, and a subframe i includes a slot 2i and a slot 2i+1. The time taken to transmit one subframe is called a transmission time period (TTI). For example, the length of one subframe may be 1 ms, and the length of one slot may be 0.5 ms.

In FDD, uplink transmission and downlink transmission are divided in the frequency domain. There is no limit to full duplex FDD, whereas a user equipment cannot perform transmission and reception at the same time in a half duplex FDD operation.

One slot includes a plurality of orthogonal frequency division multiplexing (OFDM) symbols in the time domain and includes multiple resource blocks (RBs) in the frequency domain. 3GPP LTE uses OFDMA in downlink, and thus an OFDM symbol is for representing one symbol period. An OFDM symbol may be called one SC-FDMA symbol or symbol period. A resource block is a resource allocation unit, and includes a plurality of contiguous subcarriers in one slot.

FIG. 1B shows the frame structure type 2.

A type 2 radio frame includes 2 half frames, each one having a length of 153600*T_s=5 ms. Each half frame includes 5 subframes having a length of 30720*T_s=1 ms.

In the frame structure type 2 of a TDD system, an uplink-downlink configuration is a rule indicating whether uplink and downlink are allocated (or reserved) with respect to all subframes.

Table 1 shows an unlink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each subframe of a radio frame, "D" indicates a subframe for downlink transmission, "U" is a subframe for uplink transmission, and "S" indicates a special subframe including three fields of a downlink pilot time slot (DwPTS), a guard period (GP), and an uplink pilot time slot (UpPTS).

The DwPTS is used for initial cell search, synchronization or channel estimation in a user equipment. The UpPTS is used to perform channel estimation in a base station and uplink transmission synchronization for a user equipment. The GP is a period for removing interference occurring in uplink due to the multi-path delay of a downlink signal between uplink and downlink.

Each subframe i includes a slot 2i and a slot 2i+1, each one having a length of T_slot=15360*T_s=0.5 ms.

An uplink-downlink configuration may be divided into 7 types. The position and/or number of downlink subframes, special subframes, uplink subframes are different for each configuration.

A point of time switching from the downlink to the uplink or a point of time switching from the uplink to the downlink is called a switching point. Switching point periodicity means the period in which an aspect in which an uplink subframe and a downlink subframe switch is identically repeated, and supports both 5 ms and 10 ms. In the case of the 5 ms downlink-uplink switching point periodicity, a special subframe S is present in each half-frame. In the case of the 5 ms downlink-uplink switching point periodicity, a special subframe S is present only in the first half-frame.

In all configurations, Nos. 0 and 5 subframe and a DwPTS are an interval for only downlink transmission. An UpPTS and a subframe subsequent to a subframe is always an interval for uplink transmission.

Such an uplink-downlink configuration is system information and may be known to both a base station and a user equipment. The base station may notify the user equipment of a change in the uplink-downlink allocation state of a radio frame by transmitting only the index of configuration information whenever uplink-downlink configuration information is changed. Furthermore, the configuration information is a kind of downlink control information and may be transmitted through a physical downlink control channel (PDCCH) like other scheduling information. The configuration information is broadcast information and may be transmitted to all user equipments within a cell in common through a broadcast channel.

Table 2 shows the configuration of a special subframe (the length of DwPTS/GP/UpPTS).

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384· $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of the radio frame according to the example of FIGS. 1A and 1B is merely one example, and the number of subcarriers included in the radio frame or the number of slots included in a subframe or the number of OFDM symbols included in a slot may be changed in various manners.

Figure 2:
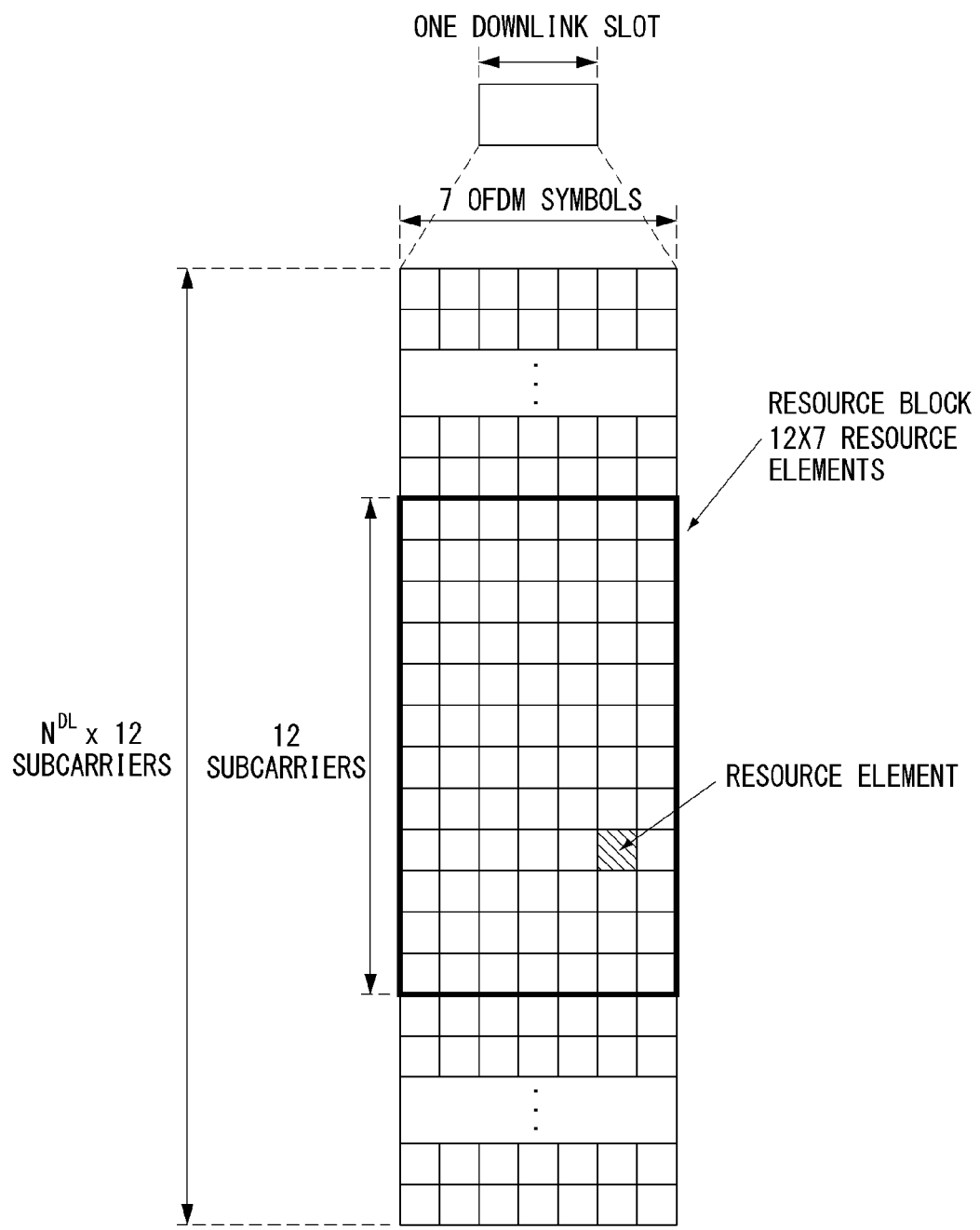
FIG. 2 is a diagram illustrating a resource grid for a downlink slot in a wireless communication system to which the present disclosure may be applied.

FIG. 2 is a diagram illustrating a resource grid for one downlink slot in the wireless communication system to which the present disclosure can be applied.

Referring to FIG. 2, one downlink slot includes the plurality of OFDM symbols in the time domain. Herein, it is exemplarily described that one downlink slot includes 7

OFDM symbols and one resource block includes 12 subcarriers in the frequency domain, but the present disclosure is not limited thereto.

Each element on the resource grid is referred to as a resource element and one resource block includes 12×7 resource elements. The number of resource blocks included in the downlink slot, N^DL is subordinated to a downlink transmission bandwidth.

A structure of the uplink slot may be the same as that of the downlink slot.

Figure 3:
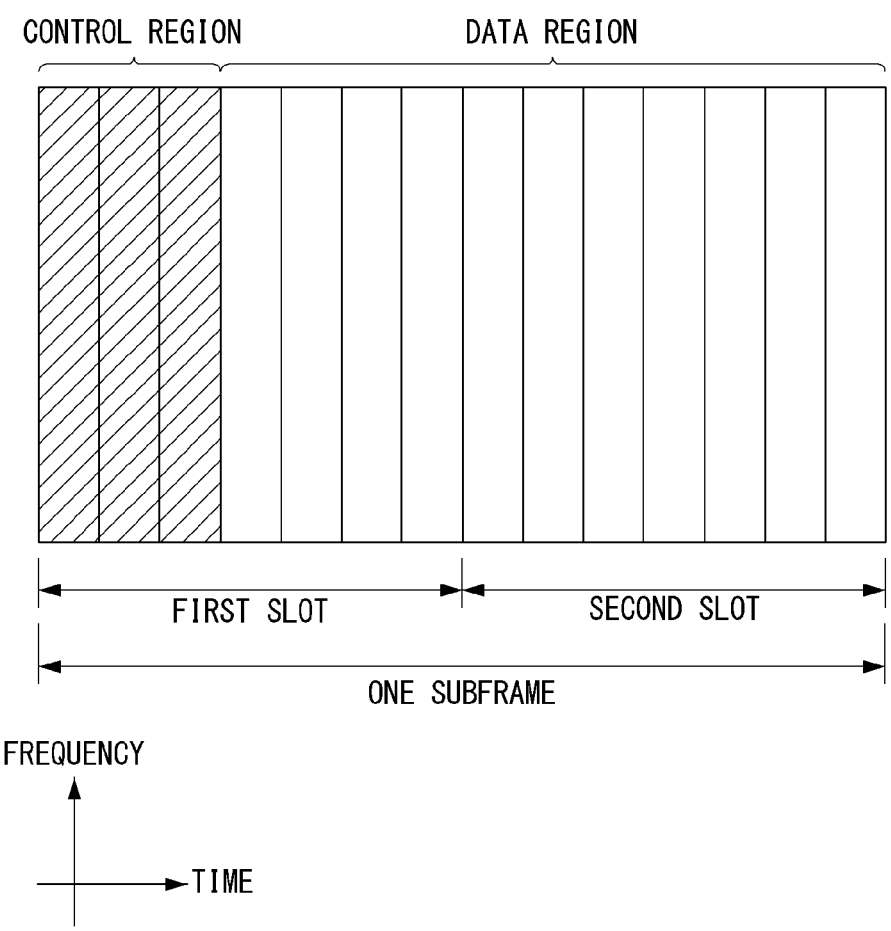
FIG. 3 is a diagram illustrating a structure of downlink subframe in a wireless communication system to which the present disclosure may be applied.

FIG. 3 illustrates a structure of a downlink subframe in the wireless communication system to which the present disclosure can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

PDCCH (Physical Downlink Control Channel)

Hereinafter, a PDCCH will be described in detail.

The control information transmitted via the PDCCH is referred to as downlink control information (DCI). The size and use of control information transmitted via the PDCCH may be changed according to DCI format or the size of control information may be changed according to coding rate.

Table 3 shows the DCI according to DCI format

TABLE 3

| PUCCH Format | Uplink Control Information(UCI) |
|---|---|
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

Referring to Table 3 above, the DCI format includes format 0 for scheduling of a PUSCH, format 1 for scheduling of one PDSCH codeword, format 1A for compact scheduling of one PDSCH codeword, format 1c for very compact scheduling of a DL-SCH, format 2 for PDSCH scheduling in a closed-loop spatial multiplexing mode, format 2A for PDSCH scheduling in an open-loop spatial multiplexing mode, formats 3 and 3A for transmission of a transmission power control (TPC) command for an uplink channel, and format 4 for PUSCH scheduling in a uplink cell in a multiple antenna port transmission mode.

DCI format 1A may be used for PDSCH scheduling regardless of the transmission mode of the UE.

Such DCI format is independently applicable per UE and PDCCHs of several UEs may be multiplexed within one subframe. The PDCCH is composed of an aggregate of one or several control channel elements (CCEs). The CCE is a logical allocation unit used to provide a PDCCH with a coding rate according to radio channel state. The CCE refers to a unit corresponding to 9 sets of REGs composed of four resource elements. The BS may use {1, 2, 4, 8} CCEs in order to configure one PDCCH signal and {1, 2, 4, 8} is referred to as a CCE aggregation level.

The number of CCEs used to transmit a specific PDCCH is determined by the BS according to channel state. The PDCCH configured according to UE is interleaved and mapped to a control channel region of each subframe by a CCE-to-RE mapping rule. The location of the PDCCH may depend on the number of OFDM symbols for a control channel of each subframe, the number of PHICH groups, transmit antenna, frequency shift, etc.

As described above, channel coding is performed independent of the multiplexed PDCCHs of the UEs and cyclic redundancy check (CRC) is applied. A unique identifier (UE ID) of each UE is masked to the CRC such that the UE receives the PDCCH thereof. However, in the control region allocated within the subframe, the BS does not provide the UE with information about where the PDCCH of the UE is located. Since the UE does not know the location of the PDCCH thereof and at which CCE aggregation level or with which DCI format the PDCCH thereof is transmitted, the UE monitors a set of PDCCH candidates within the subframe to detect the PDCCH thereof, in order to receive the control channel from the BS. This is referred to as blind decoding (BD).

The BD may also be referred to as blind detection or blind detect. The BD refers to a method of, at a UE, de-masking a UE ID thereof in a CRC portion, checking CRC errors, and determining whether a PDCCH is a control channel thereof.

Hereinafter, the information transmitted by DCI format 0 will be described.

DCI format 0 is used for PUSCH scheduling in one uplink cell.

Table 4 represents the information transmitted through DCI format 0

TABLE 4

| Format 0 (Release 8) | Format 0 (Release 10) |
| --- | --- |
|  | Carrier Indicator (CIF) |
| Flag for format 0/format 1A differentiation | Flag for format 0/format 1A differentiation |
| Hopping flag (FH) | Hopping flag (FH) |
| Resource block assignment (RIV) | Resource block assignment (RIV) |
| MCS and RV | MCS and RV |
| NDI (New Data Indicator) | NDI (New Data Indicator) |
| TPC for PUSCH | TPC for PUSCH |
| Cyclic shift for DM RS | Cyclic shift for DM RS |
| UL index (TDD only) | UL index (TDD only) |
| Downlink Assignment Index (DAI) | Downlink Assignment Index (DAI) |
| CSI request (1 bit) | CSI request (1 or 2 bits: 2 bit is for multi carrier) |
|  | SRS request |
|  | Resource allocation type (RAT) |

Referring to Table 4 above, the following information is transmitted through DCI format 0.

Referring to Table 4 above, the following information is transmitted through DCI format 0.

1) Carrier indicator, which has a length of 0 or 3 bits.

2) Flag for DCI format 0 and DCI format 1A differentiation, which has a length of 1 bit, and 0 indicates DCI format 0 and 1 indicates DCI format 1A 3) Frequency hopping flag, which has 1 bit. This field may used for the multi-cluster allocation for the Most Significant bit (MSB) of the corresponding resource allocation if it is required.

4) Resource block assignment and hopping resource allocation, which has $\lceil \log_2 (N_{RB}^{DL}(N_{RB}^{DL}+1)/2) \rceil$ bit.

Herein, in the case of PUSCH hopping in a single-cluster allocation, in order to acquire the value of $ñ_{PRB}(i)$, the most significant bits (MSBs) of NUL_hop number are used. $(\lceil \log_2(N_{RB}^{DL}(N_{RB}^{DL}+1)/2) \rceil - N_{UL\_hop})$ bit provides the resource allocation of the first slot in the uplink subframe. In addition, in the case that there is no PUSCH hopping in the single-cluster allocation, $(\lceil \log_2(N_{RB}^{DL}(N_{RB}^{DL}+1)/2) \rceil)$ bit provides the resource allocation in the uplink subframe. In addition, in the case that there is no PUSCH hopping in a multi-cluster allocation, the resource allocation information is obtained from the concatenation between the frequency hopping flag field and the hopping resource allocation field of the resource block allocation, and $(\lceil \log_2(N_{RB}^{DL}(N_{RB}^{DL}+1)/2) \rceil)$ bit provides the resource allocation in the uplink subframe. In this case, value of P is determined by the number of downlink resource blocks.

5) Modulation and coding scheme (MCS), which has a length of 1 bit.

6) New data indicator, which has a length of 2 bits.

7) Transmit Power Control (TPC) command for PUSCH, which has a length of 2 bits.

8) Cyclic shift (CS) for a demodulation reference signal (DMRS) and an index of orthogonal cover/orthogonal cover code (OC/OCC), which has 3 bits.

9) Uplink index, which has a length of 2 bits. This field exits only for the TDD operation according to uplink-downlink configuration 0.

10) Downlink Assignment Index (DAD, which has a length of 2 bits. This field exits only for the TDD operation according to uplink-downlink configurations 1-6.

11) Channel State Information (CSI) request, which has a length of 1 bit or 2 bits. Herein, the field of 2 bits is applied only to the case that the corresponding DCI is mapped to the UE to which one or more downlink cells are configured by the Cell-RNTI (C-RNTI) in a UE-specific manner.

12) Sounding Reference Signal (SRS) request, which has a length of 0 bit or 1 bit. Herein, this field exists only in the case that the scheduling PUSCH is mapped by the C-RNTI in the UE-specific manner.

13) Resource allocation type, which has a length of 1 bit.

In the case that the number of information bits in DCI format 0 is smaller than the payload size (including additional padding bits) of DCI format 1A, 0 is added in order that DCI format 1A becomes identical to DCI format 0.

FIG. 4 illustrates a structure of an uplink subframe in the wireless communication system to which the present disclosure can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Physical Uplink Control Channel (PUCCH)

The uplink control information (UCI) transmitted through the PUCCH may include a scheduling request (SR), HARQ ACK/NACK information, and downlink channel measurement information.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel. Various types of sequences may be used as the base sequence the CAZAC sequence is one example of the corresponding sequence.

Further, the amount of control information which the terminal may transmit in one subframe may be determined according to the number (that is, SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as shown in Table 5 given below

TABLE 5

| PUCCH Format | Uplink Control Information(UCI) |
| --- | --- |
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

PUCCH format 1 is used for transmitting only the SR. A waveform which is not modulated is adopted in the case of transmitting only the SR and this will be described below in detail.

PUCCH format 1a or 1b is used for transmitting the HARQ ACK/NACK. PUCCH format 1a or 1b may be used when only the HARQ ACK/NACK is transmitted in a predetermined subframe. Alternatively, the HARQ ACK/NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK.

In the case of an extended CP, PUCCH format 2 may be transmitted for transmitting the CQI and the HARQ ACK/NACK.

Figure 5:
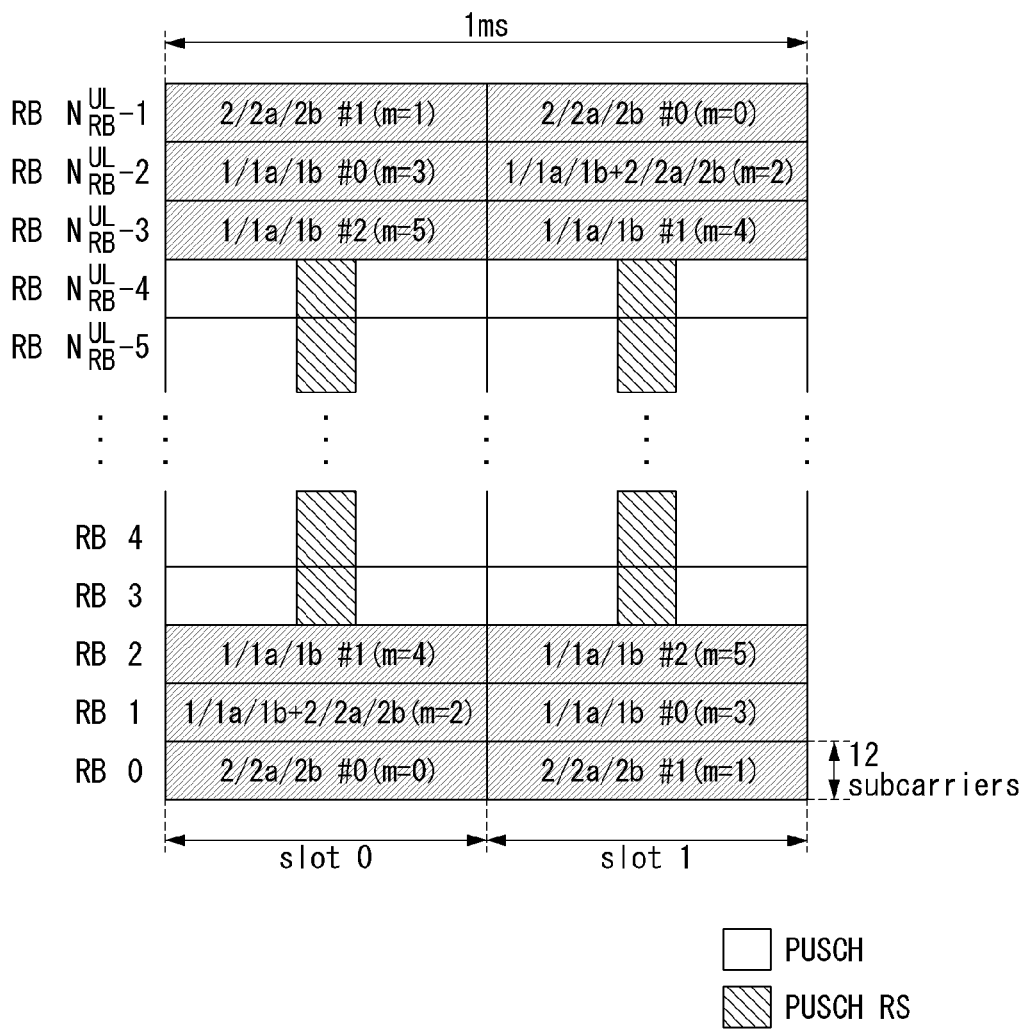
FIG. 5 is a diagram illustrating an example of the shape in which PUCCH formats are mapped to the PUCCH region of uplink physical resource block in a wireless communication system to which the present disclosure may be applied.

FIG. 5 a diagram illustrating one example of a type in which PUCCH formats are mapped to a PUCCH region of an uplink physical resource block in the wireless communication system to which the present disclosure can be applied.

In FIG. 5, $N_{RB}^{UL}$ represents the number of resource blocks in the uplink and $0, 1, \ldots, N_{RB}^{UL}-1$ mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixed and mapped to a PUCCH region expressed as m=2. Next, PUCCH format 1/1a/1b may be mapped to a PUCCH region expressed as m=3, 4, and 5. The number $(N_{RB}^{(2)})$ of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

Figure 6:
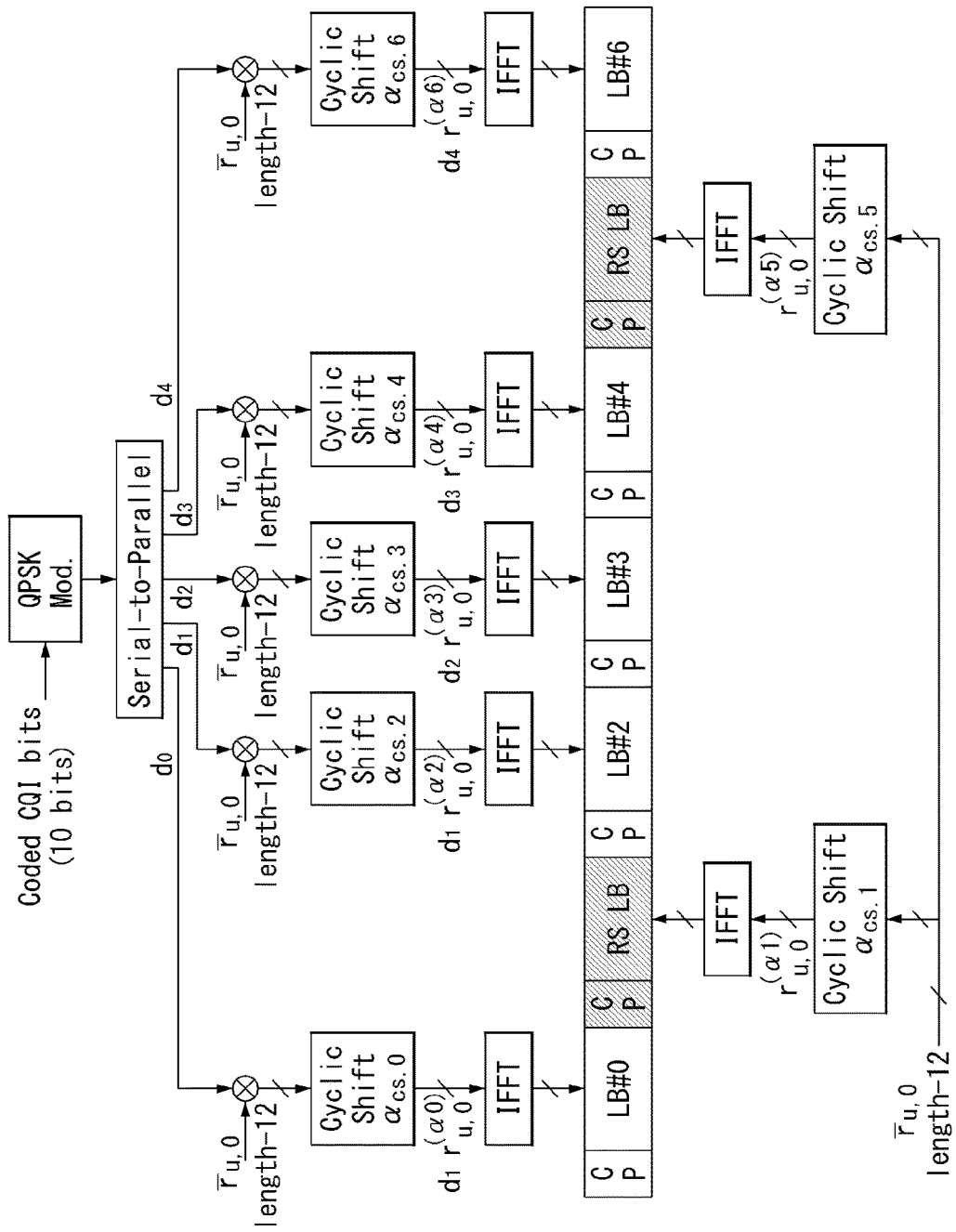
FIG. 6 is a diagram illustrating a structure of CQI channel in the case of normal CP in a wireless communication system to which the present disclosure may be applied.

FIG. 6 illustrates a structure of a CQI channel in the case of a general CP in the wireless communication system to which the present disclosure can be applied.

In SC-FDMA symbols 0 to 6 of one slot, SC-FDMA symbols 1 and 5 (second and sixth symbols) may be used for transmitting a demodulation reference signal and the CQI information may be transmitted in the residual SC-FDMA symbols. Meanwhile, in the case of the extended CP, one SC-FDMA symbol (SC-FDMA symbol 3) is used for transmitting the DMRS.

In PUCCH format 2/2a/2b, modulation by the CAZAC sequence is supported and the CAZAC sequence having the length of 12 is multiplied by a QPSK-modulated symbol. The cyclic shift (CS) of the sequence is changed between the symbol and the slot. The orthogonal covering is used with respect to the DMRS.

The reference signal (DMRS) is loaded on two SC-FDMA symbols separated from each other by 3 SC-FDMA symbols among 7 SC-FDMA symbols included in one slot and the CQI information is loaded on 5 residual SC-FDMA symbols. Two RSs are used in one slot in order to support a high-speed terminal. Further, the respective terminals are distinguished by using the CS sequence. CQI information symbols are modulated and transferred to all SC-FDMA symbols and the SC-FDMA symbol is constituted by one sequence. That is, the terminal modulates and transmits the CQI to each sequence.

The number of symbols which may be transmitted to one TTI is 10 and modulation of the CQI information is determined up to QPSK. When QPSK mapping is used for the SC-FDMA symbol, since a CQI value of 2 bits may be loaded, a CQI value of 10 bits may be loaded on one slot. Therefore, a CQI value of a maximum of 20 bits may be loaded on one subframe. A frequency domain spread code is used for spreading the CQI information in the frequency domain.

The CAZAC sequence (for example, ZC sequence) having the length of 12 may be used as the frequency domain spread code. CAZAC sequences having different CS values may be applied to the respective control channels to be distinguished from each other. IFFT is performed with respect to the CQI information in which the frequency domain is spread.

12 different terminals may be orthogonally multiplexed on the same PUCCH RB by a cyclic shift having 12 equivalent intervals. In the case of a general CP, a DMRS sequence on SC-FDMA symbol 1 and 5 (on SC-FDMA symbol 3 in the case of the extended CP) is similar to a CQI signal sequence on the frequency domain, but the modulation of the CQI information is not adopted.

The terminal may be semi-statically configured by upper-layer signaling so as to periodically report different CQI, PMI, and RI types on PUCCH resources indicated as PUCCH resource indexes ($n_{PUCCH}^{(1,\tilde{p})}$, $n_{PUCCH}^{(2,\tilde{p})}$, and $n_{PUCCH}^{(3,\tilde{p})}$). Herein, the PUCCH resource index ($n_{PUCCH}^{(2,\tilde{p})}$) is information indicating the PUCCH region used for PUCCH format 2/2a/2b and a CS value to be used.

PUCCH Channel Structure

PUCCH formats 1a and 1b are described.

In PUCCH format 1a and 1b, the CAZAC sequence having the length of 12 is multiplied by a symbol modulated by using a BPSK or QPSK modulation scheme. For example, a result acquired by multiplying a modulated symbol d(0) by a CAZAC sequence r(n) (n=0, 1, 2, . . . , N−1) having a length of N becomes y(0), y(1), y(2), . . . , y(N−1). y(0), . . . , y(N−1) symbols may be designated as a block of symbols. The modulated symbol is multiplied by the CAZAC sequence and thereafter, the block-wise spread using the orthogonal sequence is adopted.

A Hadamard sequence having a length of 4 is used with respect to general ACK/NACK information and a discrete Fourier transform (DFT) sequence having a length of 3 is used with respect to the ACK/NACK information and the reference signal.

The Hadamard sequence having the length of 2 is used with respect to the reference signal in the case of the extended CP.

Figure 7:
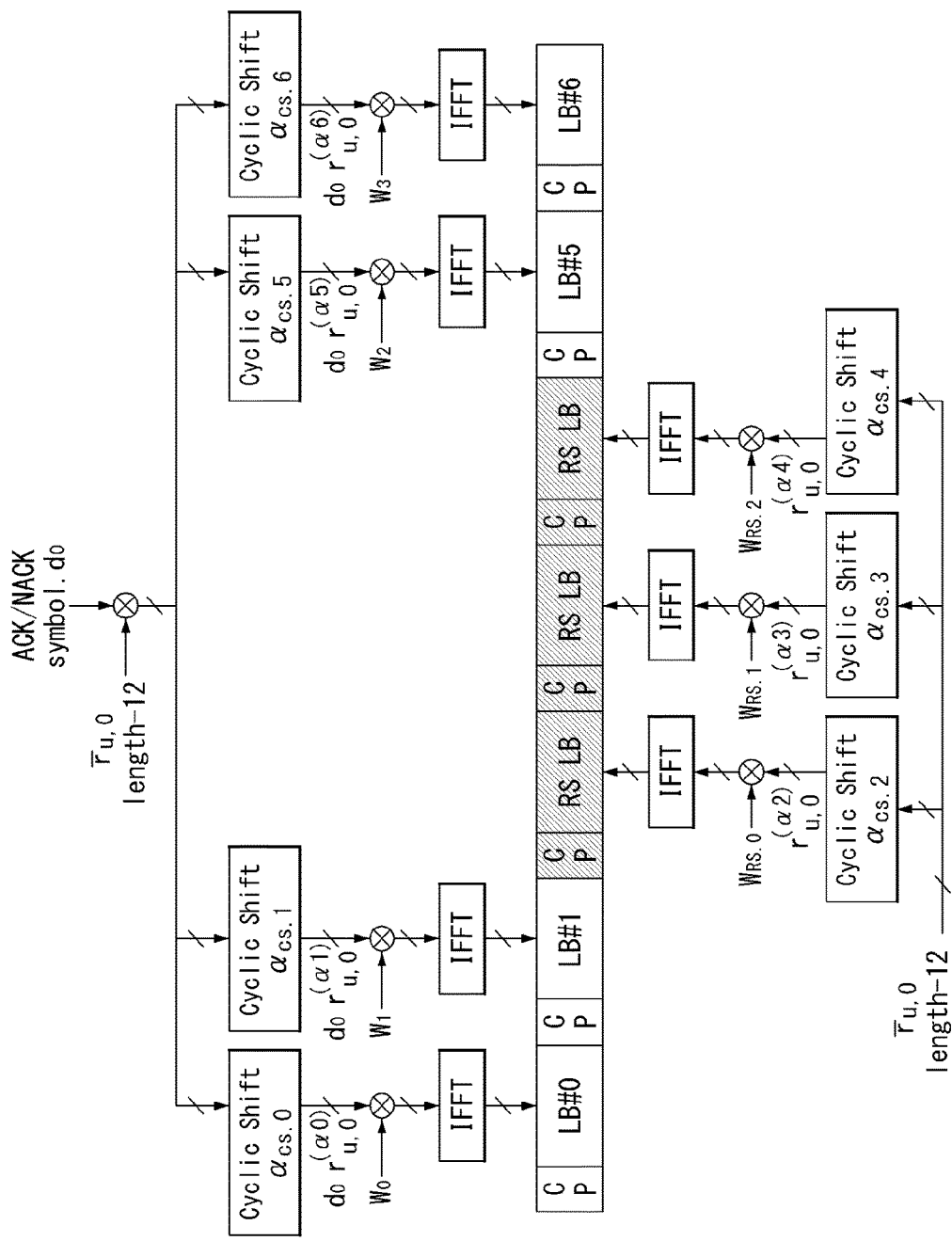
FIG. 7 is a diagram illustrating a structure of ACK/NACK channel in the case of normal CP in a wireless communication system to which the present disclosure may be applied.

FIG. 7 illustrates a structure of an ACK/NACK channel in the case of a general CP in the wireless communication system to which the present disclosure can be applied.

In FIG. 7, a PUCCH channel structure for transmitting the HARQ ACK/NACK without the CQI is exemplarily illustrated.

The reference signal (DMRS) is loaded on three consecutive SC-FDMA symbols in a middle part among 7 SC-FDMA symbols and the ACK/NACK signal is loaded on 4 residual SC-FDMA symbols.

Meanwhile, in the case of the extended CP, the RS may be loaded on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional (D) spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and as a result, multiplexing different terminals or different control channels may be applied. The number of CS resources supported in an SC-FDMA symbol for PUCCH RBs for HARQ ACK/NACK transmission is set by a cell-specific upper-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

Multiple terminals may be multiplexed by a code division multiplexing (CDM) scheme by using the CS resources in the frequency domain and the OC resources in the time domain described above. That is, ACK/NACK information and RSs of a lot of terminals may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the general CP, the ACK/NACK information may be transmitted in four symbols and not 4 but 3 orthogonal spreading codes are used for the ACK/NACK information and the reason is that the number of RS transmitting symbols is limited to 3 to use only 3 orthogonal spreading codes for the RS.

In the case of the subframe of the general CP, when 3 symbols are used for transmitting the RS and 4 symbols are used for transmitting the ACK/NACK information in one slot, for example, if 6 CSs in the frequency domain and 3 orthogonal cover (OC) resources may be used, HARQ acknowledgement responses from a total of 18 different terminals may be multiplexed in one PUCCH RB. In the case of the subframe of the extended CP, when 2 symbols are used for transmitting the RS and 4 symbols are used for transmitting the ACK/NACK information in one slot, for example, if 6 CSs in the frequency domain and 2 orthogonal cover (OC) resources may be used, the HARQ acknowledgement responses from a total of 12 different terminals may be multiplexed in one PUCCH RB.

Next, PUCCH format 1 is described. The scheduling request (SR) is transmitted by a scheme in which the terminal requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the general CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The terminal transmits the HARQ ACK/NACK through a resource allocated for the ACK/NACK in order to transmit a negative SR.

Next, an enhanced-PUCCH (e-PUCCH) format is described. An e-PUCCH may correspond to PUCCH format 3 of an LTE-A system. A block spreading technique may be applied to ACK/NACK transmission using PUCCH format 3.

Figure 8:
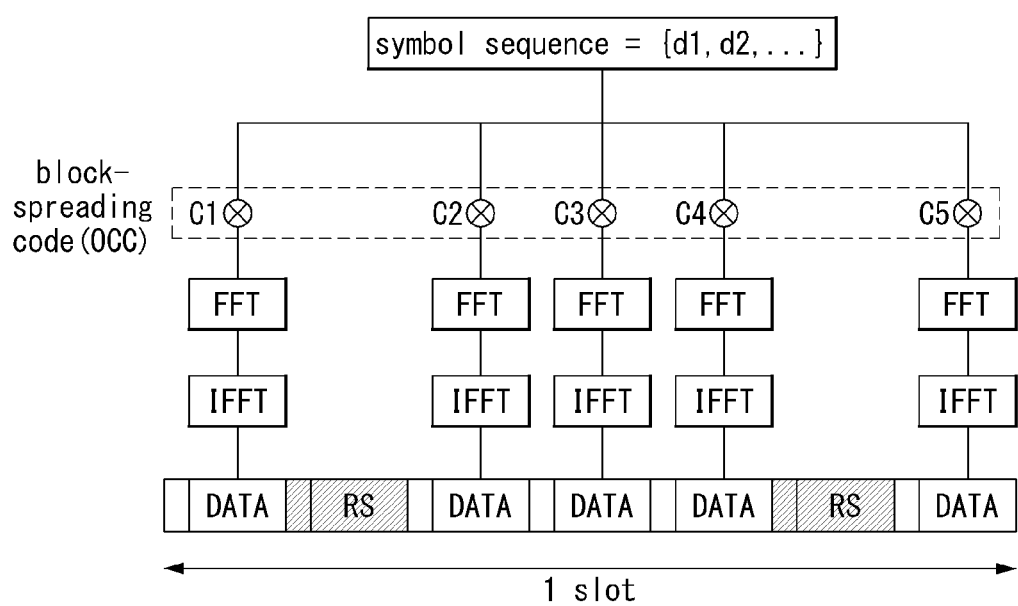
FIG. 8 is a diagram illustrating an example of generating and transmitting five SC-FDMA symbols during a slot in a wireless communication system to which the present disclosure may be applied.

The block spreading technique is a scheme that modulates transmission of the control signal by using the SC-FDMA scheme unlike the existing PUCCH format 1 series or 2 series. As illustrated in FIG. 8, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed by using the time domain spreading using the OCC.

FIG. 8 illustrates one example of generating and transmitting 5 SC-FDMA symbols during one slot in the wireless communication system to which the present disclosure can be applied.

In FIG. 8, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 8, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

General Carrier Aggregation

A communication environment considered in embodiments of the present disclosure includes multi-carrier supporting environments. That is, a multi-carrier system or a carrier aggregation system used in the present disclosure means a system that aggregates and uses one or more component carriers (CCs) having a smaller bandwidth smaller than a target band at the time of configuring a target wideband in order to support a wideband.

In the present disclosure, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be interchangeably used with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

Figure 9:
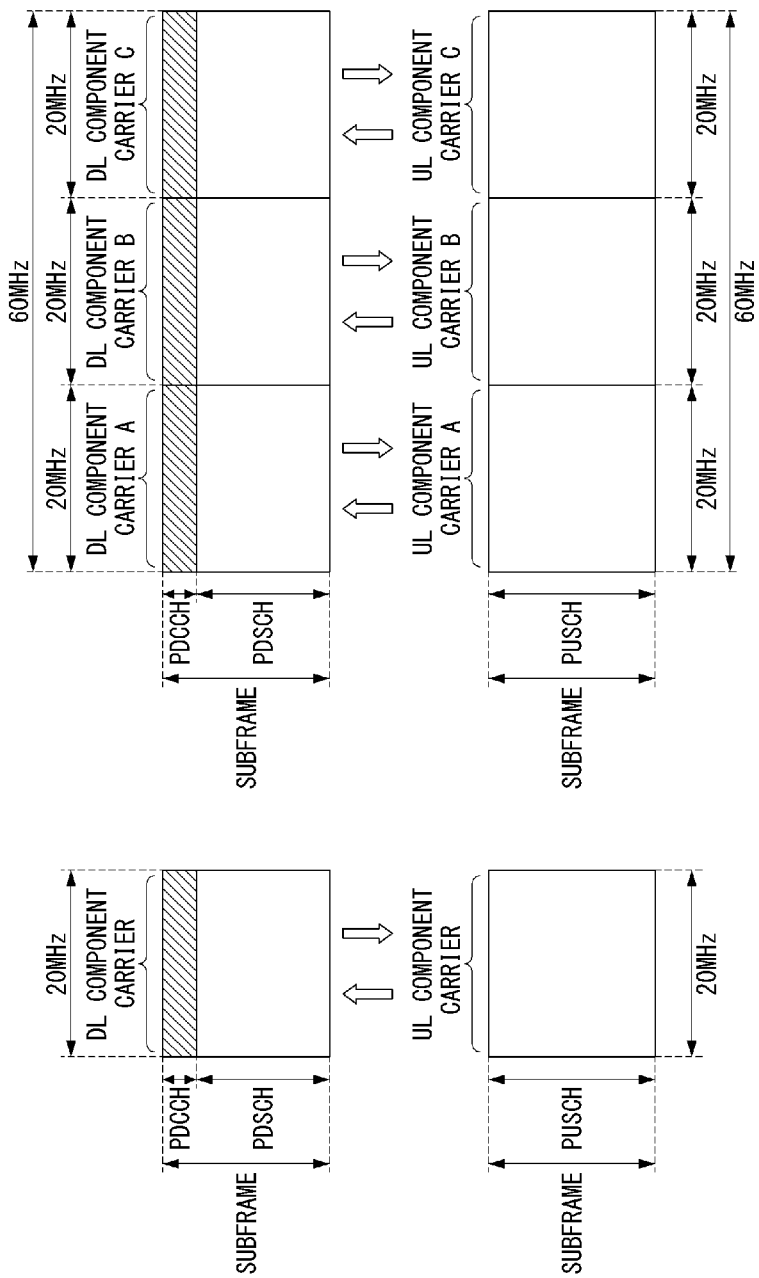
FIGS. 9A and 9B are diagrams illustrating an example of a component carrier and a carrier aggregation in a wireless communication system to which the present disclosure may be applied.

FIGS. 9A and 9B are diagrams illustrating examples of a component carrier and carrier aggregation in the wireless communication system to which the present disclosure can be applied.

FIG. 9A illustrates a single carrier structure used in an LTE system. The component carrier includes the DL CC and the UL CC. One component carrier may have a frequency range of 20 MHz.

FIG. 9B illustrates a carrier aggregation structure used in the LTE system. In the case of FIG. 9B, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF. In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

Figure 10:
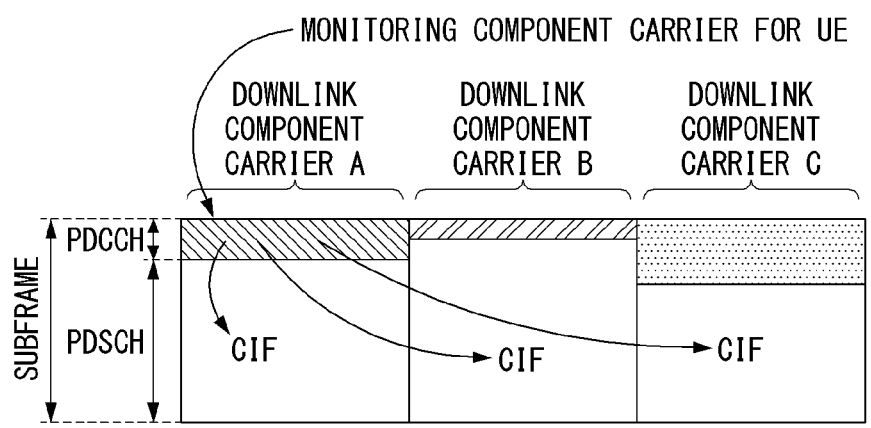
FIG. 10 is a diagram illustrating an example of a subframe structure according to cross carrier scheduling in a wireless communication system to which the present disclosure may be applied.

FIG. 10 a diagram illustrating one example of a subframe structure depending on cross carrier scheduling in the wireless communication system to which the present disclosure can be applied.

Referring to FIG. 10, a case is illustrated, in which three DL CCs are associated with a DL subframe for an LTE-A terminal and DL CC'A' is configured as a PDCCH monitoring DL CC. When the CIF is not used, each DL CC may transmit the PDCCH scheduling the PDSCH thereof without the CIF. On the contrary, when the CIF is used through the upper-layer signaling, only one DL CC 'A' may transmit the PDCCH scheduling the PDSCH thereof or the PDSCH of another CC by using the CIF. In this case, DL CC 'B' and 'C' in which the PDCCH monitoring DL CC is not configured does not transmit the PDCCH.

General ACK/NACK Multiplexing Method

In a situation in which the terminal simultaneously needs to transmit multiple ACKs/NACKs corresponding to multiple data units received from an eNB, an ACK/NACK multiplexing method based on PUCCH resource selection may be considered in order to maintain a single-frequency characteristic of the ACK/NACK signal and reduce ACK/NACK transmission power.

Together with ACK/NACK multiplexing, contents of ACK/NACK responses for multiple data units may be identified by combining a PUCCH resource and a resource of QPSK modulation symbols used for actual ACK/NACK transmission.

For example, when one PUCCH resource may transmit 4 bits and four data units may be maximally transmitted, an ACK/NACK result may be identified in the eNB as shown in Table 6 given below.

TABLE 6

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 6 given above, HARQ-ACK(i) represents an ACK/NACK result for an i-th data unit. In Table 3 given above, discontinuous transmission (DTX) means that there is no data unit to be transmitted for the corresponding HARQ-ACK(i) or that the terminal may not detect the data unit corresponding to the HARQ-ACK(i).

According to Table 5 given above, a maximum of four PUCCH resources ($n_{PUCCH,0}^{(1)}$, $n_{PUCCH,1}^{(1)}$, $n_{PUCCH,2}^{(1)}$, and $n_{PUCCH,3}^{(1)}$) are provided and b(0) and b(1) are two bits transmitted by using a selected PUCCH.

For example, when the terminal successfully receives all of four data units, the terminal transmits 2 bits (1,1) by using $n_{PUCCH,1}^{(1)}$.

When the terminal fails in decoding in first and third data units and succeeds in decoding in second and fourth data units, the terminal transmits bits (1,0) by using $n_{PUCCH,3}^{(1)}$.

In ACK/NACK channel selection, when there is at least one ACK, the NACK and the DTX are coupled with each other. The reason is that a combination of the PUCCH resource and the QPSK symbol may not all ACK/NACK states. However, when there is no ACK, the DTX is decoupled from the NACK.

In this case, the PUCCH resource linked to the data unit corresponding to one definite NACK may also be reserved to transmit signals of multiple ACKs/NACKs.

Validation of PDCCH for Semi-Persistent Scheduling

Semi-persistent scheduling (SPS) is a scheduling scheme that allocates the resource to the terminal to be persistently maintained during a specific time interval.

When a predetermined amount of data is transmitted for a specific time like a voice over Internet protocol (VoIP), since the control information need not be transmitted every data transmission interval for the resource allocation, the waste of the control information may be reduced by using the SPS scheme. In a so-called semi-persistent scheduling (SPS) method, a time resource domain in which the resource may be allocated to the terminal is preferentially allocated.

In this case, in a semi-persistent allocation method, a time resource domain allocated to a specific terminal may be configured to have periodicity. Then, a frequency resource domain is allocated as necessary to complete allocation of the time-frequency resource. Allocating the frequency resource domain may be designated as so-called activation. When the semi-persistent allocation method is used, since the resource allocation is maintained during a predetermined period by one-time signaling, the resource need not be repeatedly allocated, and as a result, signaling overhead may be reduced.

Thereafter, since the resource allocation to the terminal is not required, signaling for releasing the frequency resource allocation may be transmitted from the base station to the terminal. Releasing the allocation of the frequency resource domain may be designated as deactivation.

In current LTE, in which subframes the SPS is first transmitted/received through radio resource control (RRC) signaling for the SPS for the uplink and/or downlink is announced to the terminal. That is, the time resource is preferentially designated among the time and frequency resources allocated for the SPS through the RRC signaling. In order to announce a usable subframe, for example, a period and an offset of the subframe may be announced. However, since the terminal is allocated with only the time resource domain through the RRC signaling, even though the terminal receives the RRC signaling, the terminal does not immediately perform transmission and reception by the SPS and the terminal allocates the frequency resource domain as necessary to complete the allocation of the time-frequency resource. Allocating the frequency resource domain may be designated as deactivation and releasing the allocation of the frequency resource domain may be designated as deactivation.

Therefore, the terminal receives the PDCCH indicating the activation and thereafter, allocate the frequency resource according to RB allocation information included in the received PDCCH and applies modulation and code rate depending on modulation and coding scheme (MCS) information to start transmission and reception according to the period and the offset of the subframe allocated through the RRC signaling.

Next, when the terminal receives the PDCCH announcing the deactivation from the base station, the terminal stops transmission and reception. When the terminal receives the PDCCH indicating the activation or reactivation after stopping the transmission and reception, the terminal resumes the transmission and reception again with the period and the offset of the subframe allocated through the RRC signaling by using the RC allocation, the MCS, and the like designated by the PDCCH. That is, the time resource is performed through the RRC signaling, but the signal may be actually transmitted and received after receiving the PDCCH indicating the activation and reactivation of the SPS and the signal transmission and reception stop after receiving the PDCCH indicating the deactivation of the SPS.

When all conditions described below are satisfied, the terminal may validate a PDCCH including an SPS indication. First, a CRC parity bit added for a PDCCH payload needs to be scrambled with an SPS C-RNTI and second, a new data indicator (NDI) field needs to be set to 0. Herein, in the case of DCI formats 2, 2A, 2B, and 2C, the new data indicator field indicates one activated transmission block.

In addition, when each field used in the DCI format is set according to Tables 4 and 5 given below, the validation is completed. When the validation is completed, the terminal recognizes that received DCI information is valid SPS activation or deactivation (alternatively, release). On the contrary, when the validation is not completed, the terminal recognizes that a non-matching CRC is included in the received DCI format.

Table 7 shows a field for validating the PDCCH indicating the SPS activation.

TABLE 7

|  | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 8 shows a field for validating the PDCCH indicating the SPS deactivation (alternatively, release).

TABLE 8

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

When the DCI format indicates SPS downlink scheduling activation, a TPC command value for the PUCCH field may be used as indexes indicating four PUCCH resource values set by the upper layer.

PUCCH Piggybacking in Rel-8 LTE

Figure 11:
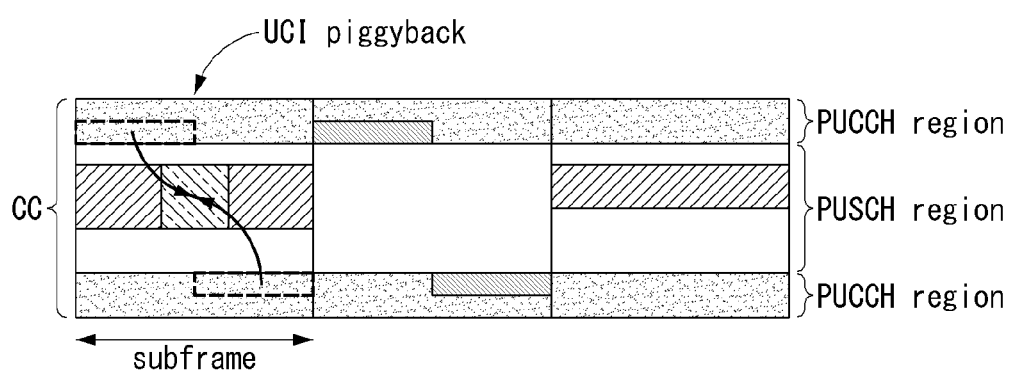
FIG. 11 is a diagram illustrating an example of transmission channel processing of UL-SCH in a wireless communication system to which the present disclosure may be applied.

FIG. 11 a diagram illustrating one example of transport channel processing of a UL-SCH in the wireless communication system to which the present disclosure can be applied.

In a 3GPP LTE system (=E-UTRA, Rel. 8), in the case of the UL, single carrier transmission having an excellent peak-to-average power ratio (PAPR) or cubic metric (CM) characteristic which influences the performance of a power amplifier is maintained for efficient utilization of the power amplifier of the terminal. That is, in the case of transmitting the PUSCH of the existing LTE system, data to be transmitted may maintain the single carrier characteristic through DFT-precoding and in the case of transmitting the PUCCH, information is transmitted while being loaded on a sequence having the single carrier characteristic to maintain the single carrier characteristic. However, when the data to be DFT-precoded is non-contiguously allocated to a frequency axis or the PUSCH and the PUCCH are simultaneously transmitted, the single carrier characteristic deteriorates. Therefore, when the PUSCH is transmitted in the same subframe as the transmission of the PUCCH as illustrated in FIG. 11, uplink control information (UCI) to be transmitted to the PUCCH is transmitted (piggyback) together with data through the PUSCH.

Since the PUCCH and the PUSCH may not be simultaneously transmitted as described above, the existing LTE terminal uses a method that multiplexes uplink control information (UCI) (CQI/PMI, HARQ-ACK, RI, and the like) to the PUSCH region in a subframe in which the PUSCH is transmitted.

As one example, when the channel quality indicator (CQI) and/or precoding matrix indicator (PMI) needs to be transmitted in a subframe allocated to transmit the PUSCH, UL-SCH data and the CQI/PMI are multiplexed after DFT-spreading to transmit both control information and data. In this case, the UL-SCH data is rate-matched by considering a CQI/PMI resource. Further, a scheme is used, in which the control information such as the HARQ ACK, the RI, and the like punctures the UL-SCH data to be multiplexed to the PUSCH region.

Figure 12:
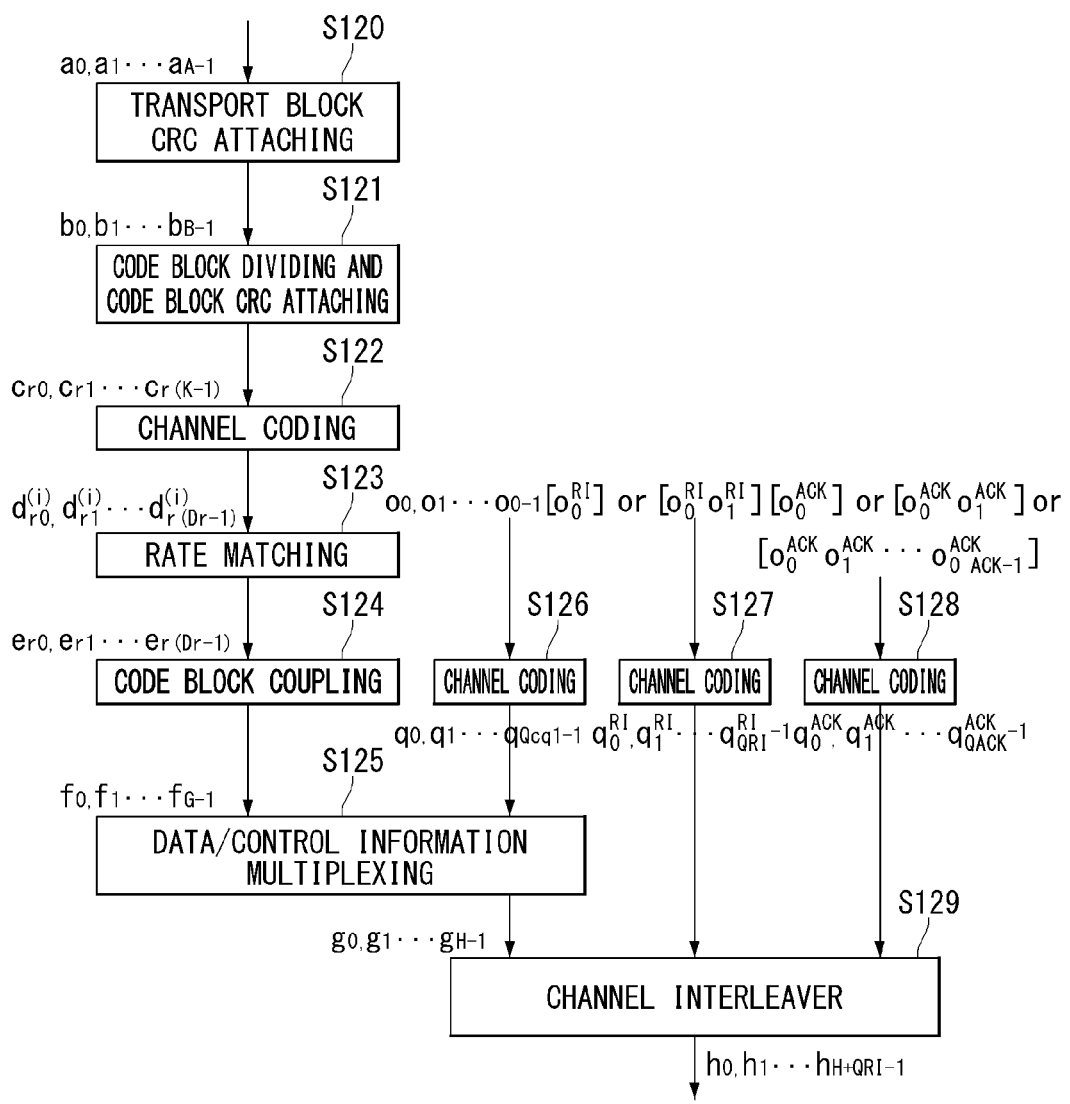
FIG. 12 is a diagram illustrating an example of a signal processing process of an uplink shared channel which is a transport channel in a wireless communication system to which the present disclosure may be applied.

FIG. 12 a diagram illustrating one example of a signal processing process of an uplink share channel of a transport channel in the wireless communication system to which the present disclosure can be applied.

Herein, the signal processing process of the uplink share channel (hereinafter, referred to as "UL-SCH") may be applied to one or more transport channels or control information types.

Referring to FIG. 12, the UL-SCH transfers data to a coding unit in the form of a transport block (TB) once every a transmission time interval (TTI).

A CRC parity bit $p_0, p_1, p_2, p_3, \ldots, p_{L-1}$ is attached to a bit of the transport block $a_0, a_1, a_2, a_3, \ldots, a_{A-1}$ received from the upper layer (S120). In this case, A represents the size of the transport block and L represents the number of parity bits. Input bits to which the CRC is attached are shown in $b_0, b_1, b_2, b_3, \ldots, b_{B-1}, \ldots$, In this case, B represents the number of bits of the transport block including the CRC.

$b_0, b_1, b_2, b_3, \ldots, b_{B-1}$ is segmented into multiple code blocks (CBs) according to the size of the TB and the CRC is attached to multiple segmented CBs (S121). Bits after the code block segmentation and the CRC attachment are shown in $c_{r0}, c_{r1}, c_{r2}, c_{r3}, \ldots, c_{r(K_r-1)}$. Herein, r represents No. (r=0, . . . , C−1) of the code block and Kr represents the bit number depending on the code block r. Further, C represents the total number of code blocks.

Subsequently, channel coding is performed (S122). Output bits after the channel coding are shown in $d_{r0}^{(i)}, d_{r1}^{(i)}, d_{r2}^{(i)}, d_{r3}^{(i)}, \ldots, d_{r(D_r-1)}^{(i)}$. In this case, i represents an encoded stream index and may have a value of 0, 1, or 2. Dr represents the number of bits of the i-th encoded stream for the code block r. r represents the code block number (r=0, . . . , C−1) and C represents the total number of code blocks. Each code block may be encoded by turbo coding.

Subsequently, rate matching is performed (S123). Bits after the rate matching are shown in $e_{r0}, e_{r1}, e_{r2}, e_{r3}, \ldots, e_{r(E_r-1)}$. In this case, r represents the code block number (r=0, . . . , C−1) and C represents the total number of code blocks. Er represents the number of rate-matched bits of the r-th code block.

Subsequently, concatenation among the code blocks is performed again (S124). Bits after the concatenation of the code blocks is performed are shown in $f_0, f_1, f_2, f_3, \ldots, f_{G-1}$. In this case, G represents the total number of bits encoded for transmission and when the control information is multiplexed with the UL-SCH, the number of bits used for transmitting the control information is not included.

Meanwhile, when the control information is transmitted in the PUSCH, channel coding of the CQI/PMI, the RI, and the ACK/NACK which are the control information is independently performed (S126, S127, and S128). Since different encoded symbols are allocated for transmitting each control information, the respective control information has different coding rates.

In time division duplex (TDD), as an ACK/NACK feedback mode, two modes of ACK/NACK bundling and ACK/NACK multiplexing are supported by an upper-layer configuration. ACK/NACK information bits for the ACK/NACK bundling are constituted by 1 bit or 2 bits and ACK/NACK information bits for the ACK/NACK multiplexing are constituted by 1 to 4 bits.

After the concatenation among the code blocks in step S134, encoded bits $f_0, f_1, f_2, f_3, \ldots, f_{G-1}$ of the UL-SCH data and encoded bits $q_0, q_1, q_2, q_3, \ldots, q_{N_L \cdot Q_{CQI}-1}$ of the CQI/PMI are multiplexed (S125). A multiplexed result of the data and the CQI/PMI is shown in $\bar{g}_0, \bar{g}_1, \bar{g}_2, \bar{g}_3, \ldots \bar{g}_{H'-1}$. In this case, $\bar{g}_i$ (i=0, . . . , H'−1) represents a column vector having a length of $(Q_m \cdot N_L)$. $H=(G+N_L \cdot Q_{CQI})$ and $H'=H/(N_L \cdot Q_m)$.

$N_L$ represents the number of layers mapped to a UL-SCH transport block and H represents the total number of encoded bits allocated to $N_L$ transport layers mapped with the transport block for the UL-SCH data and the CQI/PMI information.

Subsequently, the multiplexed data and CQI/PMI, a channel encoded RI, and the ACK/NACK are channel-interleaved to generate an output signal (S129).

Multi-Input Multi-Output (MIMO)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

In more detail, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method capable of greatly improving a communication capacity and transmission and reception performance without additional frequency allocation or power increment has the largest attention in recent years.

Figure 13:
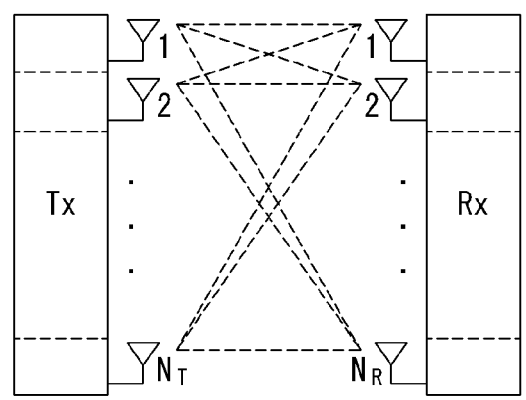
FIG. 13 is a diagram of a general multiple input multiple output (MIMO) antenna communication system.

FIG. 13 is a configuration diagram of a general multiple input multiple output (MIMO) communication system.

Referring to FIG. 13, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency can be greatly improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R) \quad \text{[Equation 1]}$$

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 13.

First, in respect to a transmission signal, when NT transmitting antennas are provided, since the maximum number of transmittable information is NT, NT may be expressed as a vector given below.

$$s = [s_1, s_2, \ldots, s_{N_T}]^T \quad \text{[Equation 2]}$$

Meanwhile, transmission power may be different in the respective transmission information s1, s2, . . . , sNT and in this case, when the respective transmission power is P1, P2, . . . , PNT, the transmission information of which the transmission power is adjusted may be expressed as a vector given below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Further, ŝ may be expressed as described below as a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector ŝ of which the transmission power is adjusted is multiplied by a weight matrix W to constitute NT transmission signals x1, x2, . . . , xNT which are actually transmitted. Herein, the weight matrix serves to appropriately distribute the transmission information to the respective antennas according to a transmission channel situation, and the like. The transmission signals x1, x2, . . . , xNT may be expressed as below by using a vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Herein, wij represents a weight between the i-th transmitting antenna and j-th transmission information and W represents the weight as the matrix. The matrix W is called a weight matrix or a precoding matrix.

Meanwhile, the transmission signal x described above may be divided into transmission signals in a case using the spatial diversity and a case using the spatial multiplexing.

In the case using the spatial multiplexing, since different signals are multiplexed and sent, all elements of an information vectors have different values, while when the spatial diversity is used, since the same signal is sent through multiple channel paths, all of the elements of the information vector s have the same value.

Of course, a method mixing the spatial multiplexing and the spatial diversity may also be considered. That is, for example, a case may also be considered, which transmits the same signal by using the spatial diversity through three transmitting antennas and different signals are sent by the spatial multiplexing through residual transmitting antennas.

Next, when NR receiving antennas are provided, received signals y1, y2, . . . , yNR of the respective antennas are expressed as a vector y as described below.

$$y=[y_1, y_2, \ldots, y_{N_R}]^T \qquad \text{[Equation 6]}$$

Meanwhile, in the case of modeling the channel in the MIMO antenna communication system, respective channels may be distinguished according to transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

Figure 14:
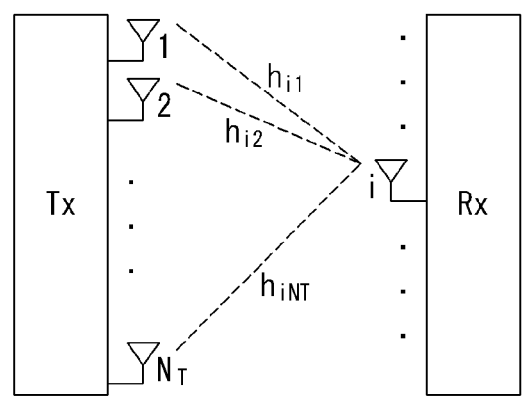
FIG. 14 is a diagram illustrating a channel from multiple transmission antennas to a single reception antenna.

FIG. 14 is a diagram illustrating a channel from multiple transmitting antennas to one receiving antenna.

As illustrated in FIG. 14, a channel which reaches receiving antenna I from a total of NT transmitting antennas may be expressed as below.

$$h_i^T = [h_{i1}, h_{i2}, \ldots, h_{iN_T}] \qquad \text{[Equation 7]}$$

Further, all of channels passing through NR receiving antennas from NT transmitting antennas may be shown as below through matrix expression shown in Equation given above.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \qquad \text{[Equation 8]}$$

Meanwhile, since additive white Gaussian noise (AWGN) is added after passing through a channel matrix H given above in an actual channel, white noises n1, n2, . . . , nNR added to NR receiving antennas, respectively are expressed as below.

$$n=[n_1, n_2, \ldots, n_{N_R}]^T \qquad \text{[Equation 9]}$$

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} \qquad \text{[Equation 10]}$$

$$= Hx + n$$

The numbers of rows and columns of the channel matrix H representing the state of the channel are determined by the numbers of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited as below.

$$\text{rank}(H) \leq \min(N_T, N_R) \qquad \text{[Equation 11]}$$

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In the present specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Reference Signal (RS)

In a wireless communication system, a signal may be distorted during transmission because data is transmitted through a radio channel. In order for a user equipment to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The above-described signal is called a pilot signal or reference signal (RS).

Furthermore, recently when a packet is transmitted in most of mobile communication systems, a method capable of enhancing transmission and reception data efficiency by adopting a multi-transmission antenna and a multi-reception antenna instead of using one transmission antenna and one reception antenna is used. When data is transmitted and received using multiple input and output antennas, a channel state between the transmission antenna and the reception antenna must be detected in order to receive a signal precisely. Accordingly, each transmission antenna must have an individual reference signal.

In a mobile communication system, an RS may be basically divided into two types depending on its purpose. There are an RS used for channel information acquisition and an RS used for data demodulation. The former must be transmitted in a broadband because it is used for a UE to obtain channel information toward the downlink, and it must be received and measured by even a UE that does not receive downlink data in a specific subframe. Furthermore, the former is also used for measurement, such as handover. The latter is an RS also transmitted in a corresponding resource when a base station transmits downlink, and a UE can perform channel estimation by receiving a corresponding RS and thus can demodulate data. This RS needs to be transmitted in a region in which data is transmitted.

A downlink reference signal includes one common reference signal (CRS) for the information acquisition of a channel state shared by all user equipments within a cell and for the measurement of handover and a dedicated reference signal (DRS) used for data demodulation for only a specific user equipment. Information for demodulation and channel measurement may be provided using such reference signals. That is, a DRS is used for only data demodulation, and a CRS is used for two purposes of channel information acquisition and data demodulation.

A reception side (i.e., UE) measures a channel state based on a CRS and feeds an indicator related to channel quality, such as a channel quality indicator (CQI), a precoding matrix index (PMI) and/or a rank indicator (RI), back to a transmission side (i.e., an eNB). A CRS is also called a cell-specific RS. In contrast, a reference signal related to the feedback of channel state information (CSI) may be defined as a CSI-RS.

A DRS may be transmitted through resource elements if data on a PDSCH needs to be demodulated. A user equipment may receive information regarding whether a DRS is present through a higher layer, and a DRS is valid only when a corresponding PDSCH has been mapped. A DRS may also be called a UE-specific RS or demodulation RS (DMRS).

Figure 15A:
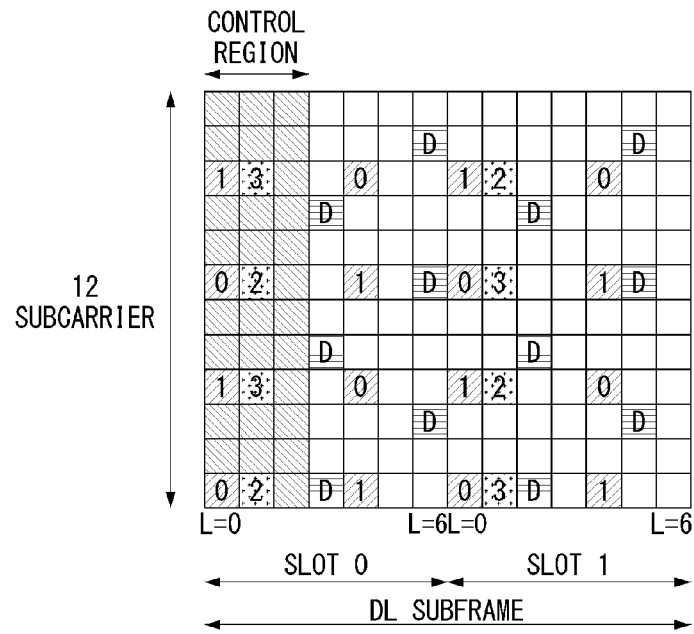
FIGS. 15A and 15B are diagrams showing an example of a reference signal pattern mapped to a downlink resource block pair in a wireless communication system to which the present disclosure may be applied.
Figure 15B:
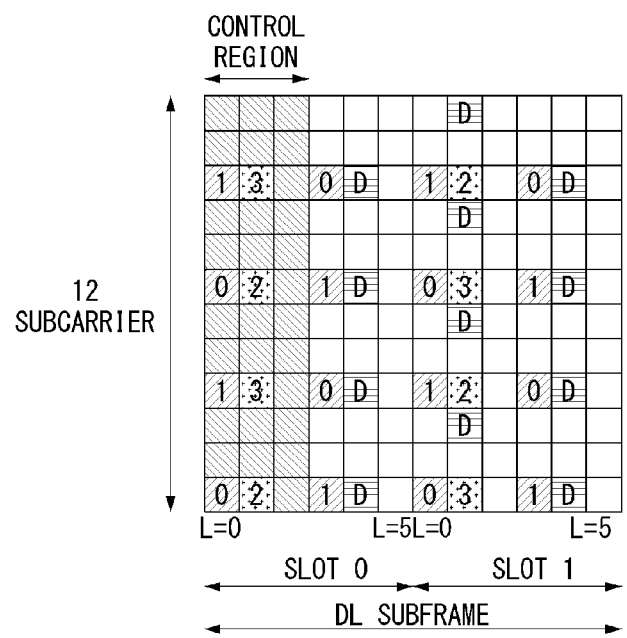

FIGS. 15A and 15B are diagrams showing an example of a reference signal pattern mapped to a downlink resource block pair in a wireless communication system to which the present disclosure may be applied.

Referring to FIGS. 15A and 15B, a downlink resource block pair, that is, a unit in which a reference signal is mapped, may be represented as one subframe in the time domain×12 subcarriers in the frequency domain. That is, in a time axis (x axis), one resource block pair has a length of 14 OFDM symbols (in the case of FIG. 15A) in a normal cyclic prefix (CP) and has a length of 12 OFDM symbols (in the case of FIG. 15B) in an extended cyclic prefix (extended CP). In the resource block lattice, resource elements (REs) indicated as "0", "1", "2" and "3" mean the positions of the CRSs of respective antenna port indices "0", "1", "2" and "3". Resource elements indicated as "D" mean the positions of DRSs.

Hereinafter, a CRS is described more specifically. A CRS is a reference signal which is used to estimate the channel of a physical antenna and may be received by all user equipments positioned within a cell in common. A CRS is distributed in a full frequency band. That is, the CRS is a cell-specific signal and is transmitted every subframe with respect to a broadband. Furthermore, a CRS may be used for channel quality information (CSI) and data demodulation.

A CRS is defined in various formats based on an antenna array on the transmission side (base station). In a 3GPP LTE system (e.g., Release-8), an RS for a maximum of 4 antenna ports is transmitted depending on the number of transmission antennas of a base station. The downlink signal transmission side has three types of antenna arrays, such as a single transmission antenna, two transmission antennas and four transmission antennas. For example, if the number of transmission antennas of a base station is two, a CRS for Nos. 0 and 1 antenna ports is transmitted. If the number of transmission antennas of a base station is four, CRSs for Nos. 0-3 antenna ports are respectively transmitted.

If a base station uses a single transmission antenna, a reference signal for a single antenna port is arrayed.

When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \qquad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. ns represents a slot index and, $N_{ID}^{cell}$ represents a cell ID. mod represents an modulo operation. The position of the reference signal varies depending on the $v_{shift}$ value in the frequency domain. Since $v_{shift}$ is subordinated to the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 2 shows the case of the normal CP and Equation 13 shows the case of the extended CP.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. mod represents the modulo operation. The position of the reference signal varies depending on the $v_{shift}$ value in the frequency domain. Since $v_{shift}$ is subordinated to the cell ID, the position of the reference signal has various frequency shift values according to the cell.

In an LTE-A system of an evolved form of the LTE system, the design needs to be performed to support a maximum of 8 transmission antennas in the downlink of a base station. Accordingly, an RS for the maximum of 8 transmission antennas must be also supported. In the LTE system, only a downlink RS for a maximum of 4 antenna ports has been defined. If a base station has 4 or a maximum of 8 downlink transmission antennas in the LTE-A system, an RS for such antenna ports needs to be additionally defined and designed. Regarding the RS for a maximum of 8 transmission antenna ports, both the above-described RS for channel measurement and the above-described RS for data demodulation must be designed.

One of important considerations in designing an LTE-A system is backward compatibility. That is, an LTE user equipment must well operate in the LTE-A system without any difficulty, and the system must support this. From a viewpoint of RS transmission, an RS for a maximum of 8 transmission antenna ports must be additionally defined in the time-frequency domain in which a CRS defined in LTE is transmitted every subframe in a full band. In the LTE-A system, if an RS pattern for the maximum of 8 transmission antenna is added to a full band every subframe using a method, such as that for the CRS of the existing LTE, RS overhead excessively increases.

Accordingly, an RS newly designed in the LTE-A system may be basically divided into two types, that is, an RS for channel measurement for the selection of an MCS, PMI, etc. (channel state information-RS, channel state indication-RS (CSI-RS)) and a data demodulation-RS for data demodulation transmitted in 8 transmission antennas.

The existing CRS is used for channel measurement, the measurement of handover, etc. and for data demodulation, whereas the CSI-RS for channel measurement is designed for a channel measurement-oriented purpose. Furthermore, the CSI-RS for channel measurement may also be used for the measurement of handover. Since the CSI-RS is used to obtain information on the channel state only, it does not need to be transmitted every subframe unlike the CRS. In order to reduce overhead of the CSI-RS, the CSI-RS is intermittently transmitted on the time axis.

A DMRS is dedicatedly transmitted to a UE scheduled in a corresponding time-frequency domain for data demodulation. That is, the DM-RS of a specific UE is transmitted only in a region in which a corresponding UE is scheduled, that is, only in a time-frequency domain in which data is received.

In the LTE-A system, an eNB has to transmit a CSI-RS for all antenna ports. To transmit a CSI-RS for a maximum of 8 transmission antenna ports every subframe has a disadvantage in that overhead is too great. Accordingly, the CSI-RS is not transmitted every subframe, but needs to be intermittently transmitted in the time axis in order to reduce corresponding overhead. That is, the CSI-RS may be periodically transmitted in the period of a multiple of one subframe or may be transmitted in a specific transmission pattern. In this case, the period or pattern in which the CSI-RS is transmitted may be configured by the eNB.

In order to measure a CSI-RS, a UE must be aware of the transmission subframe index of a CSI-RS for each CSI-RS antenna port of a cell to which the UE belongs, a CSI-RS resource element (RE) time-frequency position within the transmission subframe, and information on a CSI-RS sequence.

In the LTE-A system, an eNB needs to transmit a CSI-RS with respect to each of a maximum of 8 antenna ports. Resources used for the CSI-RS transmission of different antenna ports need to be orthogonal. When one eNB transmits CSI-RSs for different antenna ports, it may orthogonally allocate resources according to the FDM/TDM scheme by mapping the CSI-RSs for the respective antenna ports to different REs. Alternatively, the eNB may transmit the CSI-RSs for different antenna ports according to a CDM scheme for mapping the CSI-RSs to orthogonal codes.

When an eNB notifies its own cell UE of information on a CSI-RS, first, it has to notify the UE of information on a time-frequency to which a CSI-RS for each antenna port is mapped. Specifically, the information includes subframe numbers in which a CSI-RS is transmitted or the period in which a CSI-RS is transmitted, a subframe offset in which a CSI-RS is transmitted, an OFDM symbol number in which a CSI-RS RE of a specific antenna is transmitted, frequency spacing, an offset or shift value of an RE in the frequency axis, and so on.

Communication System Using Ultra-High Frequency Band

In a long term evolution (LTE)/LTE advanced (LTE-A) system, an error value of the oscillator of a user equipment and a base station is regulated as a requirement and is described as follows.

UE Side Frequency Error (in TS 36.101)

The UE modulated carrier frequency shall be accurate to within ±0.1 PPM observed over a period of one time slot (0.5 ms) compared to the carrier frequency received from the E-UTRA Node B eNB Side Frequency Error (in TS 36.104)

Frequency error is the measure of the difference between the actual BS transmit frequency and the assigned frequency.

Meanwhile, an oscillator accuracy depending on the type of a base station is described in Table 9.

TABLE 9

| BS class | Accuracy |
| --- | --- |
| Wide Area BS | ±0.05 ppm |
| Local Area BS | ±0.1 ppm |
| Home BS | ±0.25 ppm |

Accordingly, when a maximum difference of the oscillator between a base station and a user equipment is ±0.1 ppm and an error occurs in one direction, an offset value of a maximum of 0.2 ppm may occur. Such an offset value is converted into a Hz unit suitable for each center frequency by multiplying the offset value by the center frequency.

Meanwhile, in the OFDM system, a CFO value differently appears based on a frequency tone interval. In general, although the CFO value is large, the influence on an OFDM system having a sufficiently large frequency tone interval is relatively small. Accordingly, an actual CFO value (absolute value) needs to be represented as a relative value that influences the OFDM system, which is called a normalized CFO. The normalized CFO is represented as a value obtained by dividing a CFO value by a frequency tone interval. Table 10 shows CFOs and normalized CFOs for an error value of each center frequency and oscillator.

TABLE 10

| Center frequency | Oscillator Offset | | | |
| --- | --- | --- | --- | --- |
| (subcarrier spacing) | ±0.05 ppm | ±0.1 ppm | ±10 ppm | ±20 ppm |
| 2 GHz (15 kHz) | ±100 Hz (±0.0067) | ±200 Hz (±0.0133) | ±20 kHz (±1.3) | ±40 kHz (±2.7) |
| 30 GHz (104.25 kHz) | ±1.5 kHz (±0.014) | ±3 kHz (±0.029) | ±300 kHz (±2.9) | ±600 kHz (±5.8) |
| 60 GHz (104.25 kHz) | ±3 kHz (±0.029) | ±6 kHz (±0.058) | ±600 kHz (±5.8) | ±1.2 MHz (±11.5) |

In Table 10, a frequency tone interval (15 kHz) is assumed when the center frequency is 2 GHz (e.g., LTE Rel-8/9/10). When the center frequency is 30 GHz, 60 GHz, performance degradation in which a Doppler influence is consideration with respect to each center frequency is prevented using a frequency tone interval of 104.25 kHz. Table 2 is a simple example, and it is evident that a different frequency tone interval may be used for the center frequency.

Meanwhile, in the situation in which a user equipment moves at high speed or the situation in which a user equipment moves in a high frequency band, a great Doppler spread phenomenon occurs. Doppler spread causes spread in the frequency domain. As a result, this generates the distortion of a received signal from the viewpoint of a receiver. Doppler spread may be represented as $f_{doppler}=(v/\lambda)\cos\theta$. In this case, v is the moving speed of a user equipment, and $\lambda$ means the wavelength of the center frequency of a transmitted radio wave. $\Theta$ means an angle between a received radio wave and the moving direction of the user equipment. A case where $\theta$ is 0 is described as a precondition.

In this case, a coherence time has an inverse proportion to the Doppler spread. If the coherence time is defined as a time interval in which the correlation value of a channel response in the time domain is 50% or more, it is represented as $$T_c \approx \frac{9}{16\pi f_{doppler}}.$$

In a wireless communication system, Equation 15 is chiefly used which indicates the geometric mean between an equation for the Doppler spread and an equation for the coherence time.

$$T_c = \sqrt{\frac{9}{16\pi f_{doppler}}} = \frac{0.423}{f_{doppler}} \quad \text{[Equation 15]}$$

New Radio Access Technology System

As more communication devices require a greater communication capacity, there is a need for enhanced mobile broadband communication compared to the existing radio access technology (RAT). Furthermore, massive machine type communications (MTC) providing various services anywhere and at any time by connecting multiple devices and things is also considered. Furthermore, a communication system design in which a service/UE sensitive to reliability and latency are considered is discussed.

The introduction of a new radio access technology in which enhanced mobile broadband communication, massive MTC, and ultra-reliable and low latency communication (URLLC) as described above are considered is discussed. In the present disclosure, the corresponding technology is named a new RAT (hereinafter NR) for convenience sake.

Figure 16:
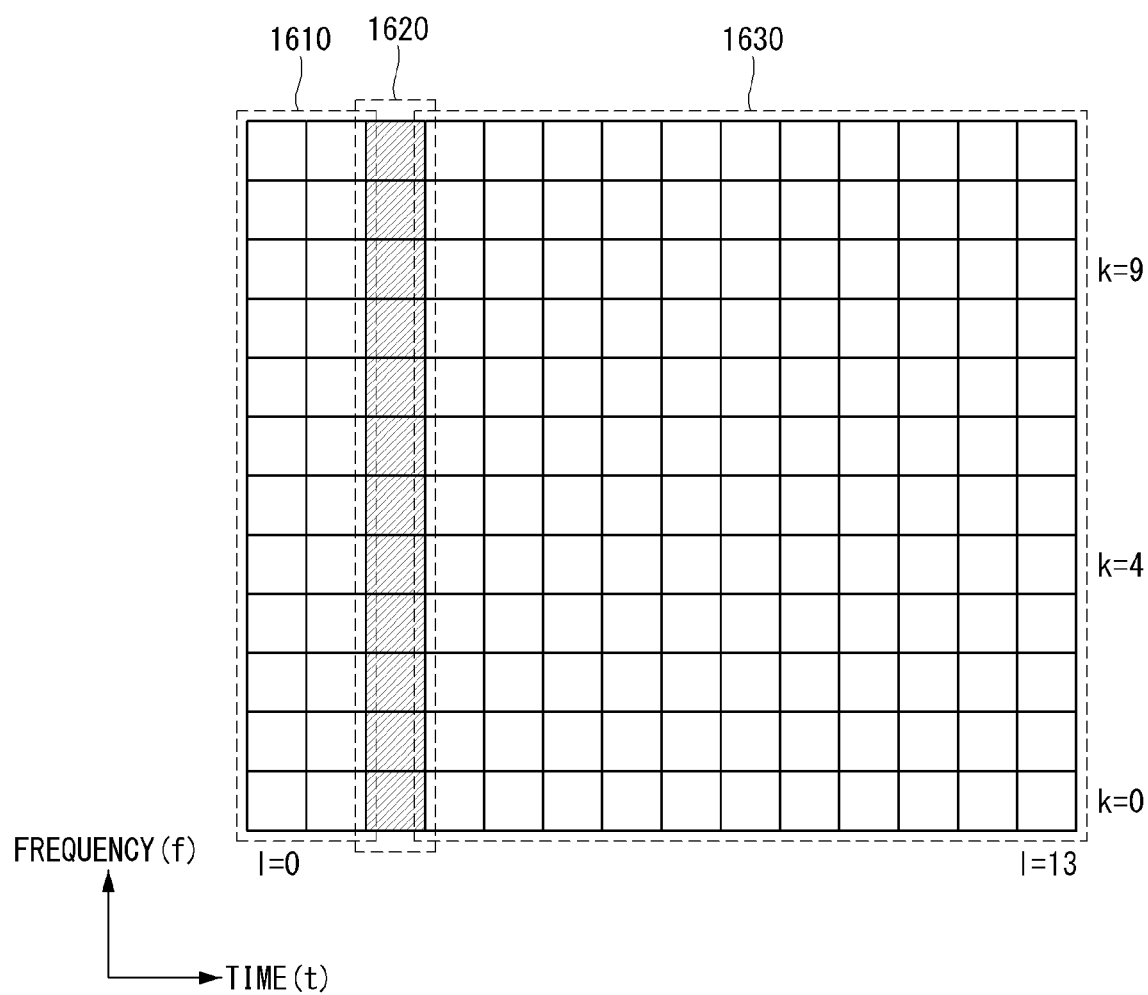
FIG. 16 illustrates one example of a resource region structure used in a communication system using mmWave to which the present disclosure may be applied.

FIG. 16 illustrates one example of a resource region structure used in a communication system using mmWave to which the present disclosure may be applied.

The communication system using an ultra-high frequency band such as mmWave uses a frequency band having a different physical property from an LTE/LTE-A communication system in the related art. As a result, in the communication system using the ultra-high frequency band, a resource structure of a different type from the structure of the resource region used in the communication system in the related art is discussed. FIG. 16 illustrates an example of a downlink resource structure in a new communication system.

When a resource block (RB) pair is considered, which is constituted by 14 Orthogonal Frequency Division Multiplexing (OFDM) symbols on a horizontal axis and 12 frequency tones on a vertical axis, first two (or three) OFDM symbols 1610 may be allocated to a control channel (e.g., Physical Downlink Control Channel (PDCCH), a DeModulation Reference Signal (DMRS) may be allocated to next one to two OFDM symbols 1620, and remaining OFDM symbols 1630 may be allocated to a data channel (e.g., Physical Downlink Shared Channel (PDSCH)).

Meanwhile, in the resource region structure illustrated in FIG. 16, PCRS, PNRS, or PTRS for CPE (or CFO) estimation may be loaded to some resource elements (REs) of a region 1630 to which the data channel is allocated and transmitted to the UE. The signal may be a signal for estimating phase noise and as described above, the signal may be a pilot signal or a signal acquired by changing or replicating a data signal.

The present disclosure proposes a method for transmitting the DMRS for channel estimation in downlink or uplink.

FIGS. 17A to 18B illustrate one example of a pattern of a demodulation reference signal proposed by the present disclosure.

Referring to FIGS. 17A to 18B, the demodulation reference signal for estimating the channel may be mapped to one symbol or two symbols according to the number of antenna ports.

Figure 17A:
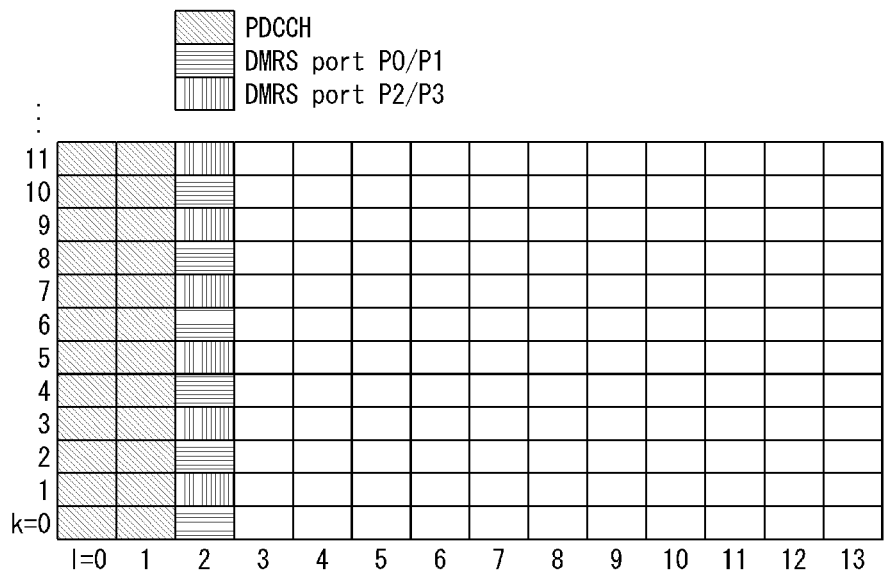
FIGS. 17A to 18B illustrate one example of a pattern of a demodulation reference signal proposed by the present disclosure.
Figure 17B:
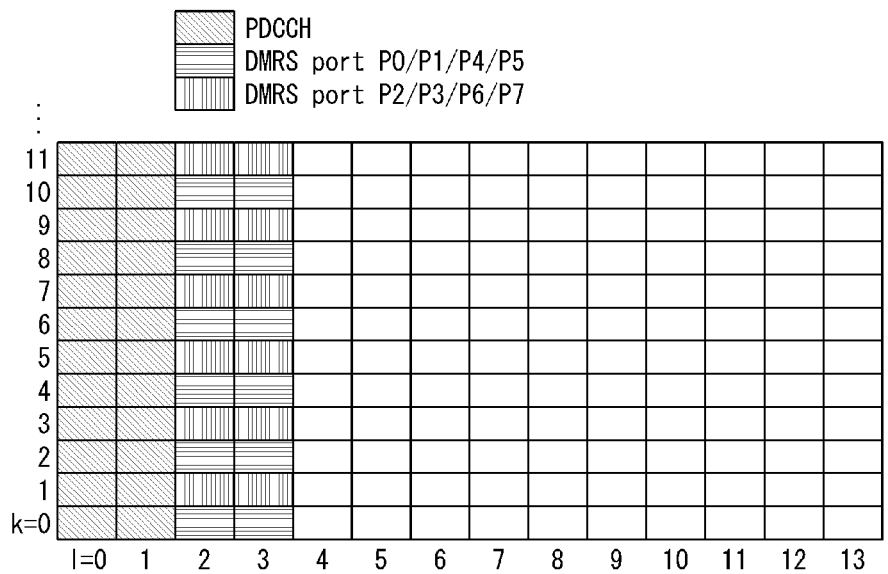
Figure 18A:
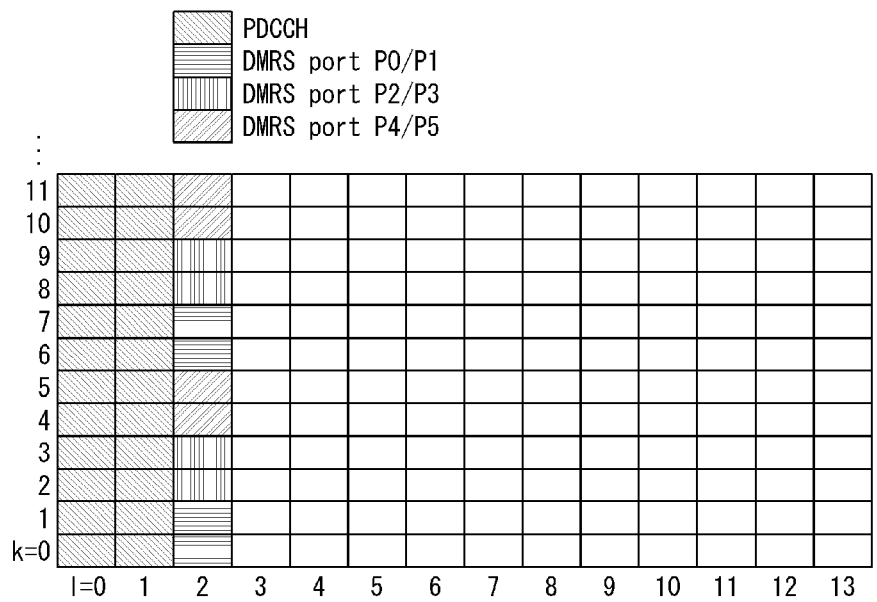
Figure 18B:
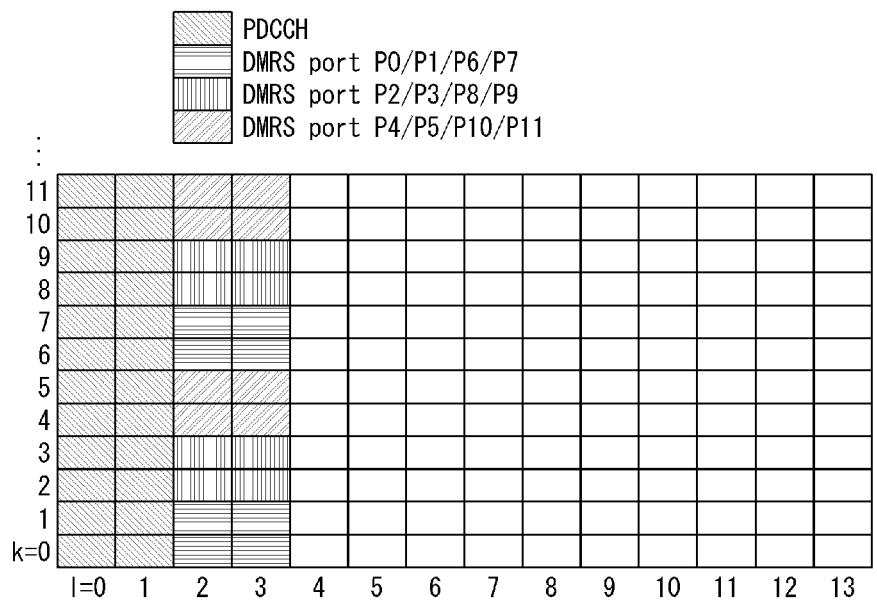

Specifically, the uplink DMRS and the downlink DMRS may be generated by the following method and mapped to the resource region. FIGS. 17A and 17B illustrate one example of an uplink or downlink DMRS mapped to a physical resource according Type 1 and FIGS. 18A and 18B illustrate one example of the uplink or downlink DMRS mapped to the physical resource according Type 2.

The demodulation reference signal for demodulating uplink data or downlink data is generated by mapping the demodulation reference sequence to the OFDM symbol.

The demodulation reference signal sequence may be mapped to one or two OFDM symbols according to the mapping type as illustrated in FIGS. 17A to 18B and may adopt a CDM scheme for port multiplexing.

Hereinafter, a DMRS for uplink data and a DMRS for downlink data will be separately described in detail.

Demodulation Reference Signal for PUSCH

A reference signal sequence r(m) for generating the downlink DMRS is generated by Equation 16 below when transform precoding for the PUSCH is not permitted.

In this case, one example of the case where the transform precoding for the PUSCH is not permitted may include a case of generating a CP-OFDM scheme transmission signal.

$$r(m) = \frac{1}{\sqrt{2}}(1 - 2 \cdot c(2m)) + j\frac{1}{\sqrt{2}}(1 - 2 \cdot c(2m+1))  \quad \text{[Equation 16]}$$

Here, c(i) means the pseudo-random sequence.

The reference signal sequence r(m) is generated by Equation 17 below when the transform precoding for the PUSCH is permitted.

In this case, one example of the case where the transform precoding for the PUSCH is permitted may include a case of generating a DFT-S-OFDM scheme transmission signal.

$$r(m) = e^{-j\frac{\pi qm(m+1)}{L}}  \quad \text{[Equation 17]}$$

The DMRS of the generated PUSCH is mapped to the physical resource according to given Type 1 or Type 2 by a higher layer parameter as illustrated in FIGS. 18A to 19B.

In this case, the DMRS may be mapped to a single symbol or double symbols according to the number of antenna ports.

When the transform precoding is not permitted, the reference signal sequence r(m) may be mapped to the physical resource by Equation 18 below.

$$a_{k,l}^{(p,\mu)} = \beta_{DMRS} w_f(k') \cdot w_t(l') \cdot r(2m + k' + m_0)  \quad \text{[Equation 18]}$$

$$k = \begin{cases} k_0 + 4m + 2k' + \Delta & \text{Configuration type 1} \\ k_0 + 6m + k' + \Delta & \text{Configuration type 2} \end{cases}$$

$$k' = 0, 1$$

$$l = 7 + l'$$

In Equation 18 above, l is relatively defined at the start of PUSCH transmission and $w_f(k')$, $w_t(l')$ and $\Delta$ are given by Tables 12 and 13 below.

Table 12 below shows one example of the parameters for the DMRS of the PUSCH for Type 1.

TABLE 12

| p | Δ | $w_f(k')$ | | $w_t(l')$ | |
|---|---|---|---|---|---|
| | | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 1 | +1 | +1 | +1 | +1 |
| 1003 | 1 | +1 | −1 | +1 | +1 |
| 1004 | 0 | +1 | +1 | +1 | −1 |
| 1005 | 0 | +1 | −1 | +1 | −1 |
| 1006 | 1 | +1 | +1 | +1 | −1 |
| 1007 | 1 | +1 | −1 | +1 | −1 |

Table 13 below shows one example of the parameters for the DMRS of the PUSCH for Type 2.

TABLE 13

| p | Δ | $w_f(k')$ k' = 0 | $w_f(k')$ k' = 1 | $w_t(l')$ l' = 0 | $w_t(l')$ l' = 1 |
|---|---|---|---|---|---|
| 1000 | 0 | +1 | +1 | +1 | +1 |
| 1001 | 0 | +1 | −1 | +1 | +1 |
| 1002 | 2 | +1 | +1 | +1 | +1 |
| 1003 | 2 | +1 | −1 | +1 | +1 |
| 1004 | 4 | +1 | +1 | +1 | +1 |
| 1005 | 4 | +1 | −1 | +1 | +1 |
| 1006 | 0 | +1 | +1 | +1 | −1 |
| 1007 | 0 | +1 | −1 | +1 | −1 |
| 1008 | 2 | +1 | +1 | +1 | −1 |
| 1009 | 2 | +1 | −1 | +1 | −1 |
| 1010 | 4 | +1 | +1 | +1 | −1 |
| 1011 | 4 | +1 | −1 | +1 | −1 |

Table 14 below shows one example of a time domain index l' and a supported antenna port p depending on a higher layer parameter UL_DMRS_dur.

TABLE 14

| UL_DMRS_dur | l' | p Type 1 | p Type 2 |
|---|---|---|---|
| Single-symbol DMRS | 0 | 1000-1003 | 1000-1005 |
| Double-symbol DMRS | 0, 1 | 1000-1007 | 1000-1011 |

Table 15 shows one example of a start location Ī of the DMRS of the PUSCH.

TABLE 15

| Uplink DMRS parameter | Ī Single symbol DMRS PUSCH mapping type A | Ī Single symbol DMRS PUSCH mapping type B | Ī Double symbol DMRS PUSCH mapping type A | Ī Double symbol DMRS PUSCH mapping type B |
|---|---|---|---|---|
| 0 | $l_0$ | $l_0$ | $l_0$ | $l_0$ |
| 1 | $l_0$, 7 | | | |
| 2 | $l_0$, 9 | | | |
| 3 | $l_0$, 11 | | | |

Demodulation Reference Signals for PDSCH

The reference signal sequence r(m) for generating the downlink DMRS is generated by Equation 19 below.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 19]}$$

Here, c(i) means the pseudo-random sequence.

The DMRS of the generated PDSCH is mapped to the physical resource according to given Type 1 or Type 2 by the higher layer parameter as illustrated in FIGS. 7 and 8.

In this case, the reference signal sequence r(m) may be mapped to the physical resource by Equation 20 below.

$$a_{k,l}^{(p,\mu)} = \beta_{DMRS} w_f(k') \cdot w_t(l') \cdot r(2m + k' + m_0) \quad \text{[Equation 20]}$$

$$k = \begin{cases} k_0 + 4m + 2k' + \Delta & \text{Configuration type 1} \\ k_0 + 6m + k' + \Delta & \text{Configuration type 2} \end{cases}$$

$$k' = 0, 1$$

$$l = \bar{l} + l'$$

In Equation 20 above, l is relatively defined at the start of the slot and $w_f(k')$, $w_t(l')$, and Δ are given by Tables 16 and 17 below.

A time axis index l' and supported antenna ports p vary depending on the higher layer parameter DL_DMRS_dur according to Table 12 below. An i value varies depending on a higher layer parameter given in Table 15 according to the mapping pattern.

For PDSCH mapping pattern A: If higher layer parameter DL_DMRS_typeA_pos is equal to 3, $l_0$=3 and if not, $l_0$=2.

For PDSCH mapping pattern B: $l_0$ is mapped to a first OFDM symbol in a PDSCH resource in which the DMRS is scheduled.

Table 16 below shows one example of the parameters for DMRS configuration type 1 of the PDSCH.

TABLE 16

| p | Δ | $w_f(k')$ k' = 0 | $w_f(k')$ k' = 1 | $w_t(l')$ l' = 0 | $w_t(l')$ l' = 1 |
|---|---|---|---|---|---|
| 1000 | 0 | +1 | +1 | +1 | +1 |
| 1001 | 0 | +1 | −1 | +1 | +1 |
| 1002 | 1 | +1 | +1 | +1 | +1 |
| 1003 | 1 | +1 | −1 | +1 | +1 |
| 1004 | 0 | +1 | +1 | +1 | −1 |
| 1005 | 0 | +1 | −1 | +1 | −1 |
| 1006 | 1 | +1 | +1 | +1 | −1 |
| 1007 | 1 | +1 | −1 | +1 | −1 |

Table 17 below shows one example of the parameters for DMRS configuration type 2 of the PDSCH.

TABLE 17

| p | Δ | $w_f(k')$ k' = 0 | $w_f(k')$ k' = 1 | $w_t(l')$ l' = 0 | $w_t(l')$ l' = 1 |
|---|---|---|---|---|---|
| 1000 | 0 | +1 | +1 | +1 | +1 |
| 1001 | 0 | +1 | −1 | +1 | +1 |
| 1002 | 2 | +1 | +1 | +1 | +1 |
| 1003 | 2 | +1 | −1 | +1 | +1 |
| 1004 | 4 | +1 | +1 | +1 | +1 |
| 1005 | 4 | +1 | −1 | +1 | +1 |
| 1006 | 0 | +1 | +1 | +1 | −1 |
| 1007 | 0 | +1 | −1 | +1 | −1 |
| 1008 | 2 | +1 | +1 | +1 | −1 |
| 1009 | 2 | +1 | −1 | +1 | −1 |
| 1010 | 4 | +1 | +1 | +1 | −1 |
| 1011 | 4 | +1 | −1 | +1 | −1 |

Table 18 below shows one example of l' which is duration of the PDSCH DMRS.

TABLE 18

| DL_DMRS_dur | l' | p Type 1 | p Type 2 |
|---|---|---|---|
| Single-symbol DMRS | 0 | 1000-1003 | 1000-1005 |
| Double-symbol DMRS | 0, 1 | 1000-1007 | 1000-1011 |

Table 19 below shows one example of a start location i of the DMRS of the PDSCH.

TABLE 19

| | i | |
|---|---|---|
| | Single symbol DMRS | Double symbol DMRS |
| Downlink DMRS parameter | PDSCH mapping type A | PDSCH mapping type B | PDSCH mapping type A | PDSCH mapping type B |
| 0 | $l_0$ | $l_0$ | $l_0$ | $l_0$ |
| 1 | $l_0$, 7 | | | |
| 2 | $l_0$, 9 | | | |
| 3 | $l_0$, 11 | | | |

Figure 19A:
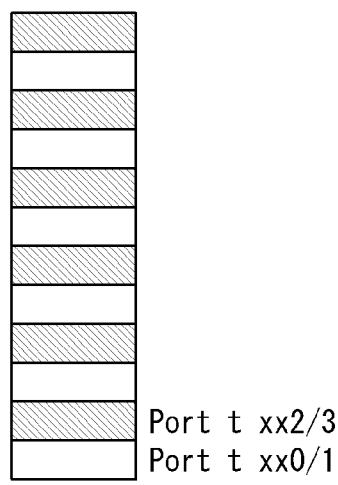
FIGS. 19A and 19B are diagrams illustrating one example of a DMRS port indexing method proposed by the present disclosure.
Figure 19B:
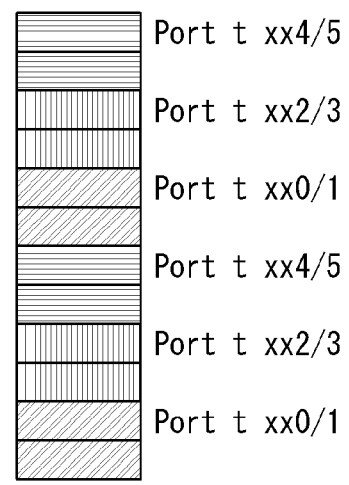

FIGS. 19A and 19B are diagrams illustrating one example of a DMRS port indexing method proposed by the present disclosure.

As illustrated in FIGS. 19A and 19B, DMRS port indexing may vary depending on the mapping type of the DMRS.

Specifically, when the mapping type of the DMRS is Type 1 described above, the DMRS port indexing is shown in FIG. 19A and Table 20 below.

TABLE 20

| Port indexing | Frequency offset: delta | FD-OCC | |
|---|---|---|---|
| XX0 | 0 | +1 | +1 |
| XX1 | 0 | +1 | −1 |
| XX2 | 1 | +1 | +1 |
| XX3 | 0 | +1 | −1 |

Specifically, when the mapping type of the DMRS is Type 2 described above, the DMRS port indexing is shown in FIG. 19B and Table 21 below.

TABLE 21

| Port indexing | Frequency offset: delta | FD-OCC | |
|---|---|---|---|
| XX0 | 0 | +1 | +1 |
| XX1 | 0 | +1 | −1 |
| XX2 | 2 | +1 | +1 |
| XX3 | 2 | +1 | −1 |
| XX4 | 4 | +1 | +1 |
| XX5 | 4 | +1 | −1 |

Figure 20:
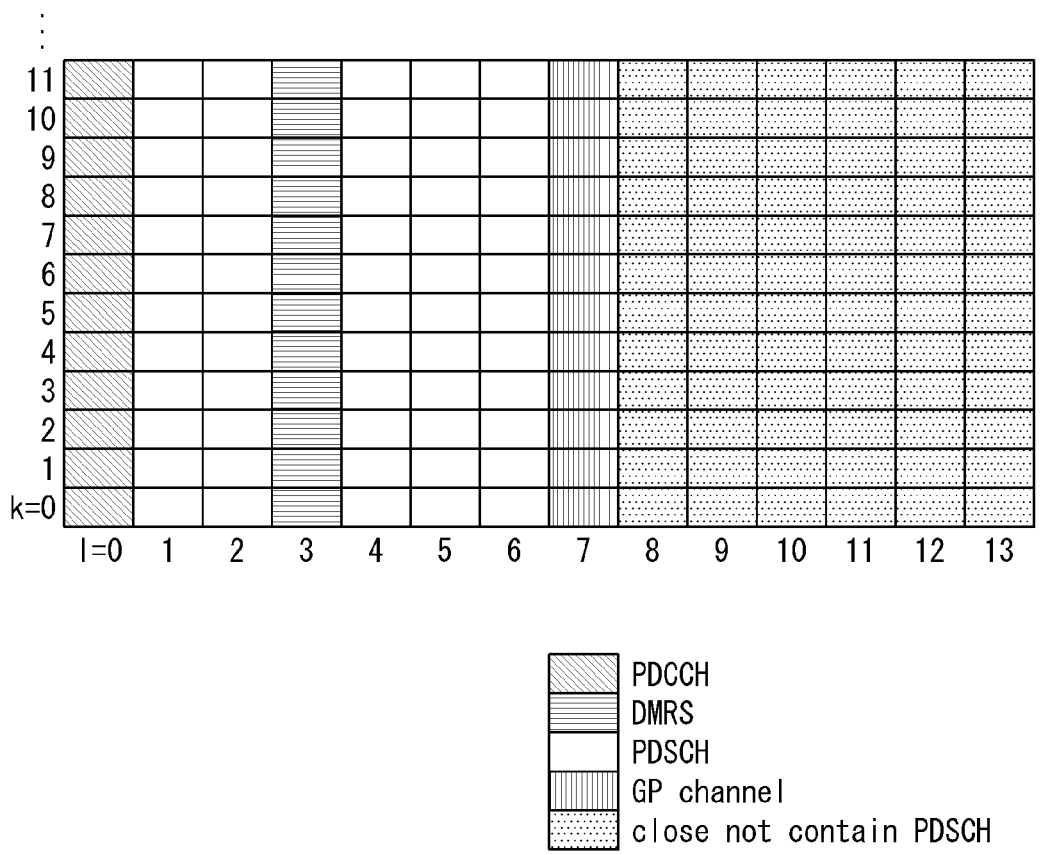

FIGS. 20 to 21B are diagrams illustrating one example of a method for determining whether to transmit a demodulation reference signal proposed by the present disclosure.

Referring to FIGS. 20 to 21B, an additional DMRS may be configured and transmitted in addition to a DMRS which is configured by default in order to compensate the channel in a High Doppler environment.

Specifically, when the DMRS is configured in units of the OFDM symbol as described in FIGS. 17A to 18B, if the DMRS is configured in a former symbol among symbols for a fast decoding speed, a problem may occur in channel compensation.

That is, in the case of the High Doppler environment, since a channel variation amount is large in one slot (or subframe), it is difficult to perform appropriate channel compensation by using only the DMRS configured in the former symbol.

Accordingly, in order to solve the problem, the channel may be compensated by configuring the DMRS in a latter OFDM symbol.

Hereinafter, the DMRS which is configured by default in the present disclosure will be referred to as a first DMRS or a front-loaded DMRS and an additionally configured DMRS will be referred to as a second DMRS or an additional DMRS.

FIGS. 22A to 25B are diagrams illustrating one example of a method for determining a location of a demodulation reference signal when hopping of a resource block proposed by the present disclosure is applied.

Referring to FIGS. 22A to 25B, when the frequency hopping for the resource block is applied, the DMRS may be applied to different OFDM symbols or the same OFDM symbol for each resource block.

Hereinafter, a specific resource region which is frequency-hopped may be referred to as hop and when the frequency hopping is performed at the time of uplink data transmission, the hop means a physical layer resource constituted by consecutive OFDM symbols mapped to the frequency resource of the same band.

Specifically, in the case of uplink transmission in the NR, the eNB may indicate or configure the frequency hopping operation to the UE in order to enhance the transmission/reception performance of data by using the frequency diversity effect.

For example, the eNB may transmit higher layer signaling and/or DCI signaling including an indicator indicating whether the frequency hopping is performed to the UE and the UE may determine whether to apply the frequency hopping based on the indication transmitted from the eNB.

For example, the eNB transmits at least one parameter of Frequency-hopping-PUSCH, Frequency-hopping-offset-set, $N_{symb,hop}^{PUSCH}(1)$, $N_{symb,hop}^{PUSCH}(2)$ to the UE to announce information related to hopping of the frequency.

Each parameter is defined as follows.

Frequency-hopping-PUSCH: indicating whether the frequency hopping is applied.

Frequency-hopping-offset-set: frequency offset between first hop and second hop when the frequency hopping is performed.

$N_{symb,hop}^{PUSCH}(1)$: the number of OFDM symbols constituting first hop $N_{symb,hop}^{PUSCH}(2)$: the number of OFDM symbols constituting second hop Parameters for the eNB to announce the information related to the hopping of the frequency to the UE may be configured through the higher layer signaling and/or DCI signaling or defined as a fixed value between the eNB and the UE, or a value of the parameter may be defined to be determined by a specific rule. That is, the eNB may transmit to the UE control information including the indicator indicating whether the frequency is hopped and resource information for a hopped resource.

When the UE receives the control information from the eNB, the UE may transmit the DMRS and the uplink data mapped according to a specific pattern to the eNB by performing the frequency hopping.

The eNB may estimate a channel value required for the channel compensation by using the received DMRS and compensates the channel for the uplink data by using the estimated channel value.

Thereafter, the eNB may detect data transmitted from the UE by performing demodulation and decoding processes with respect to the uplink data.

When the frequency hopping for the resource block is applied, the DMRS may be transmitted only in the OFDM symbol of the hopped hop or transmitted in the OFDM symbols of an entire resource region.

Figure 22A:
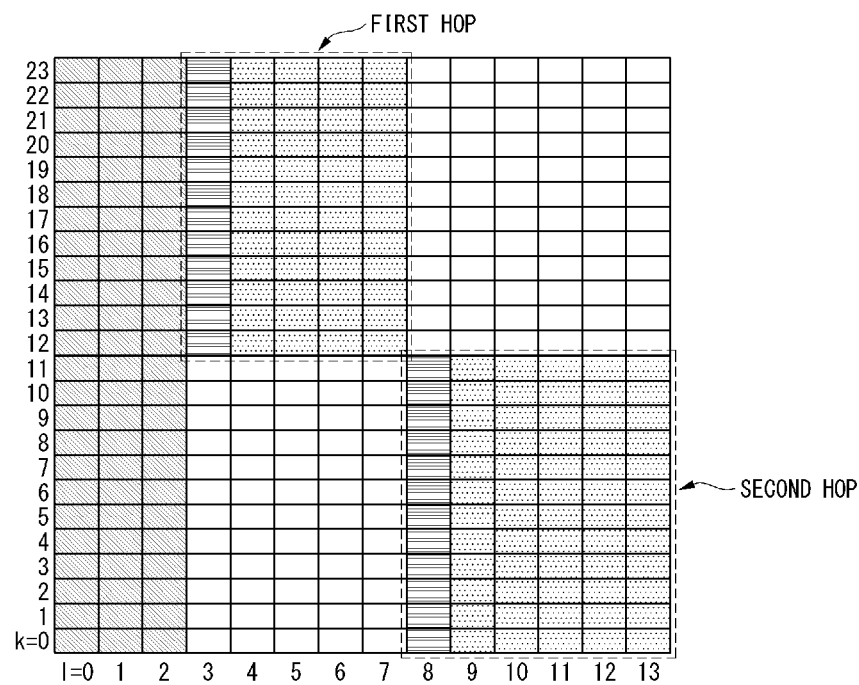
FIGS. 22A to 24 are diagrams illustrating one example of a method for determining a location of a demodulation reference signal when hopping of a resource block proposed by the present disclosure is applied.
Figure 22B:
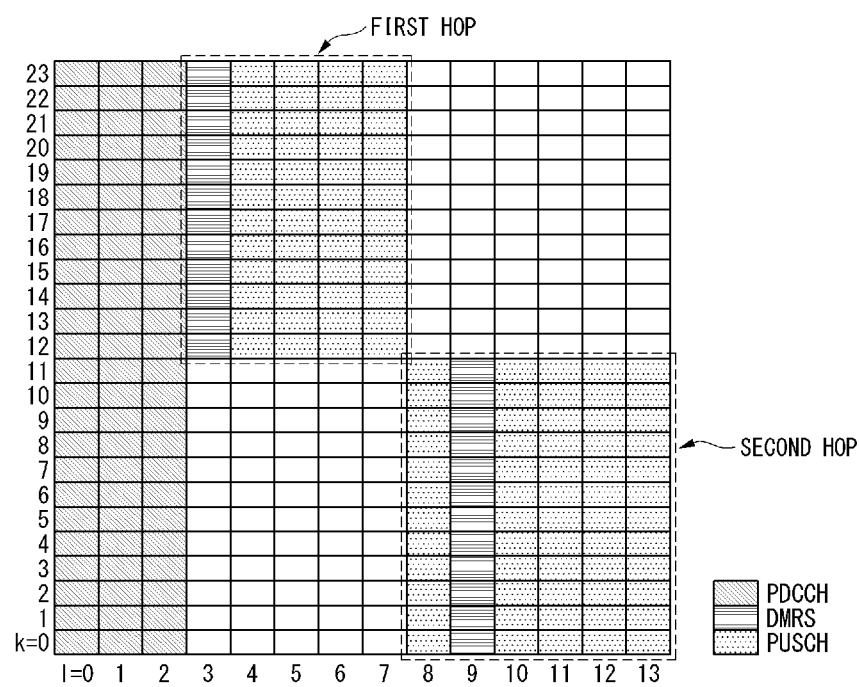

For example, when the frequency hopping for a PUSCH transmission region is applied as illustrated in FIGS. 22A and 22B, the DMRS may be transmitted only to the transmission region of the PUSCH performing the hopping.

In this case, each hop to which the frequency hopping is applied may include at least one OFDM symbol to which the DMRS is mapped.

When the frequency hopping is applied, the DMRS in the second hop may be mapped to a first OFDM symbol location as illustrated in FIG. 22A or mapped to the OFDM symbol location after a second OFDM symbol as illustrated in FIG. 22B.

That is, as illustrated in FIG. 22A, in the second hop in which the PUSCH is transmitted, the DMRS may be mapped to the OFDM symbol positioned between a last OFDM symbol of the first hop and the first OFDM symbol of the second hop.

When the DMRS of the second hop is positioned as described above, a decoding speed of data may be enhanced at a receiving side and since a data transmission symbol of the first hop and a DMRS transmission symbol of the second hop do not overlap with each other, there is an effect that a low CM/PAPR characteristic of the DMRS transmission symbol of the second hop may be maintained.

Alternatively, as illustrated in FIG. 22B, in the second hop, the DMRS may be mapped to an OFDM symbol positioned behind the first OFDM symbol of the second hop by a predetermined value.

In this case, the predetermined value may be a value which is fixed or is configurable.

Figure 23A:
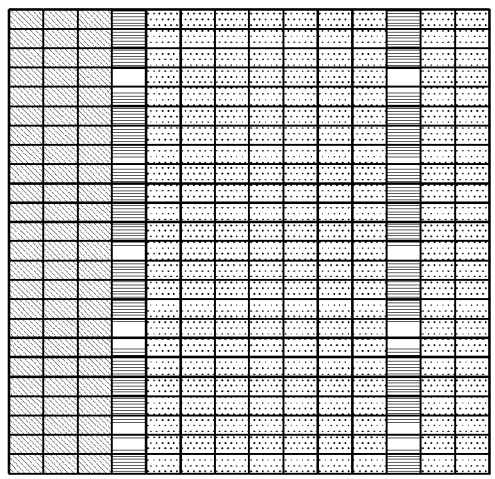
Figure 23B:
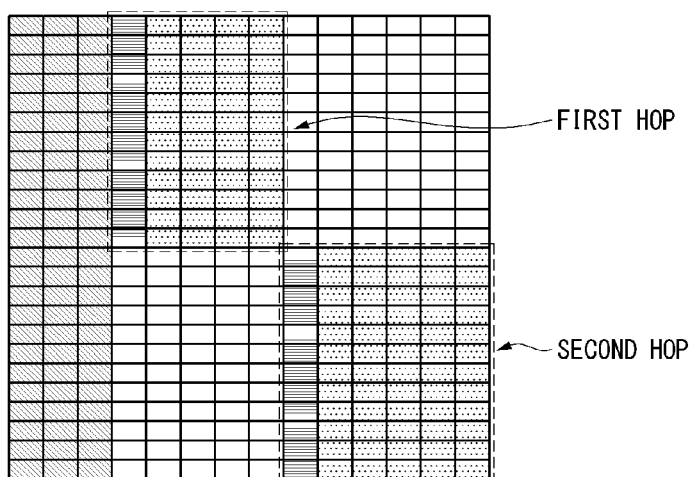

Since MU-MIMO of a higher order in the NR is one among important characteristics, the MU-MIMO may be performed between a UE performing the frequency hopping as illustrated in FIG. 23B and a UE not performing the frequency hopping as illustrated in FIG. 23A.

In this case, in order to guarantee orthogonality of the DMRS configured in the UE, the DMRS may be configured to be mapped to the same OFDM symbol among all UEs which are subjected to MU-MIMO.

That is, in order to prevent the locations of the OFDM symbols to which the DMRS is mapped from being differently configured among the UE performing the frequency hopping and the UE not performing the frequency hopping, the location of the OFDM symbol to which the DMRS of the UE performing the frequency hopping is mapped may be changed.

Figure 23C:
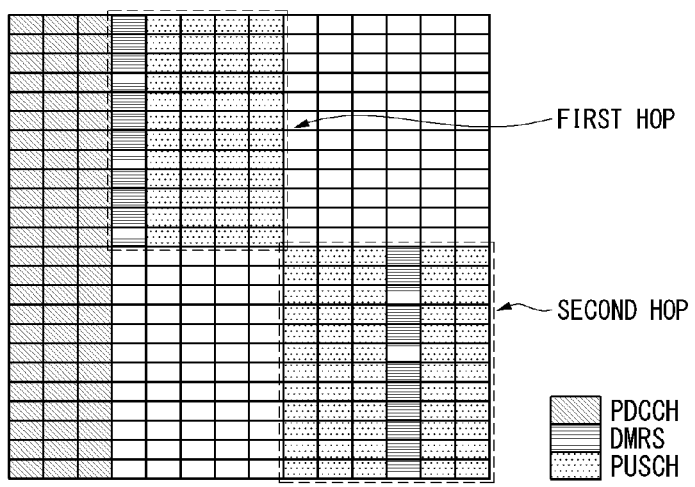

For example, when the MU-MIMO with the UE not performing the frequency hopping is performed as illustrated in FIG. 23A, the second DMRS of the UE performing the frequency hopping is mapped as illustrated in FIG. 23C to perform the MU-MIMO with the UE not performing the frequency hopping.

Specifically, the UE receives the control information described above from the eNB.

The control information may include pattern information indicating mapping patterns of the first DMRS and the second DMRS in addition to the indicator indicting whether the frequency is hopped and resource information indicating the hopped resource region.

Thereafter, the UE transmits the DMRS and the uplink data based on the control information transmitted from the eNB. In this case, the DMRS may be configured based on the mapping patterns included in the control information.

The eNB may estimate the channel value required for the channel compensation by using the received DMRS and compensates the channel for the uplink data by using the estimated channel value.

Thereafter, the eNB may detect data transmitted from the UE by performing demodulation and decoding processes with respect to the uplink data.

Figure 24:
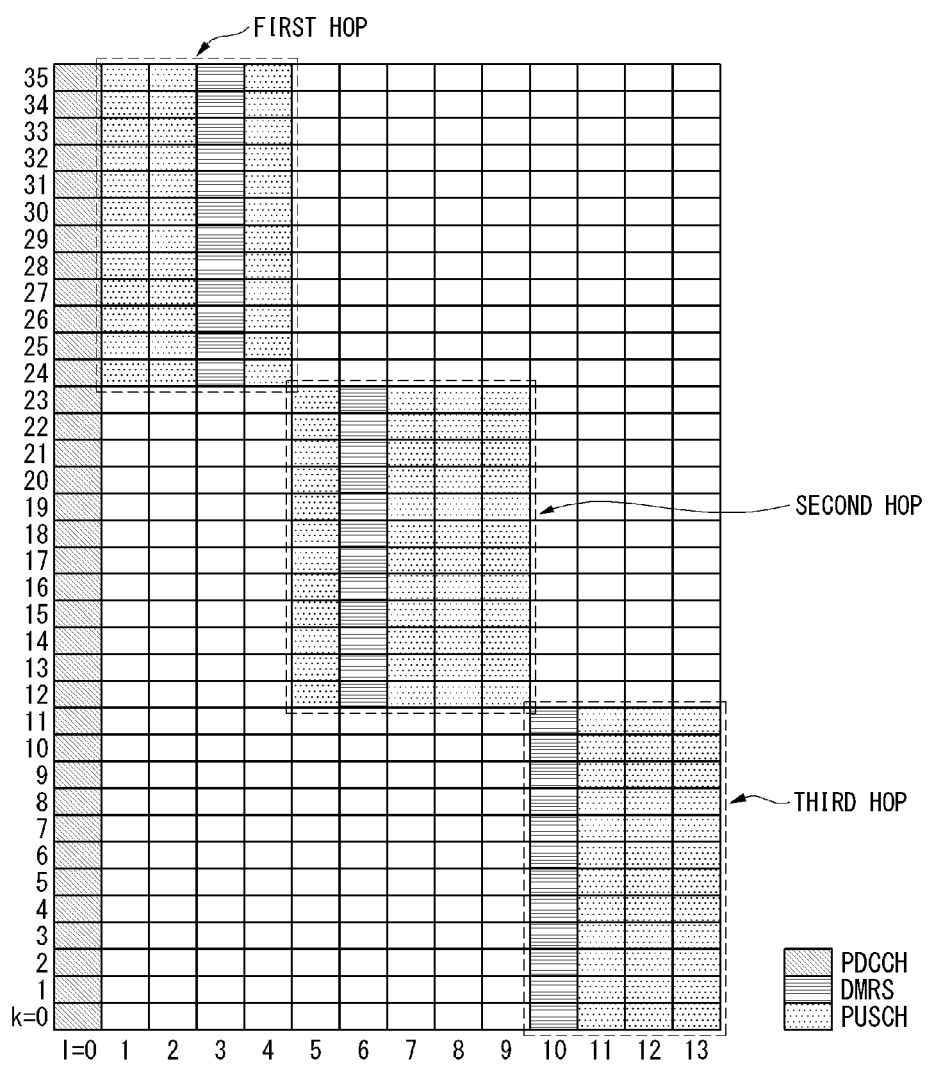
Figure 25:
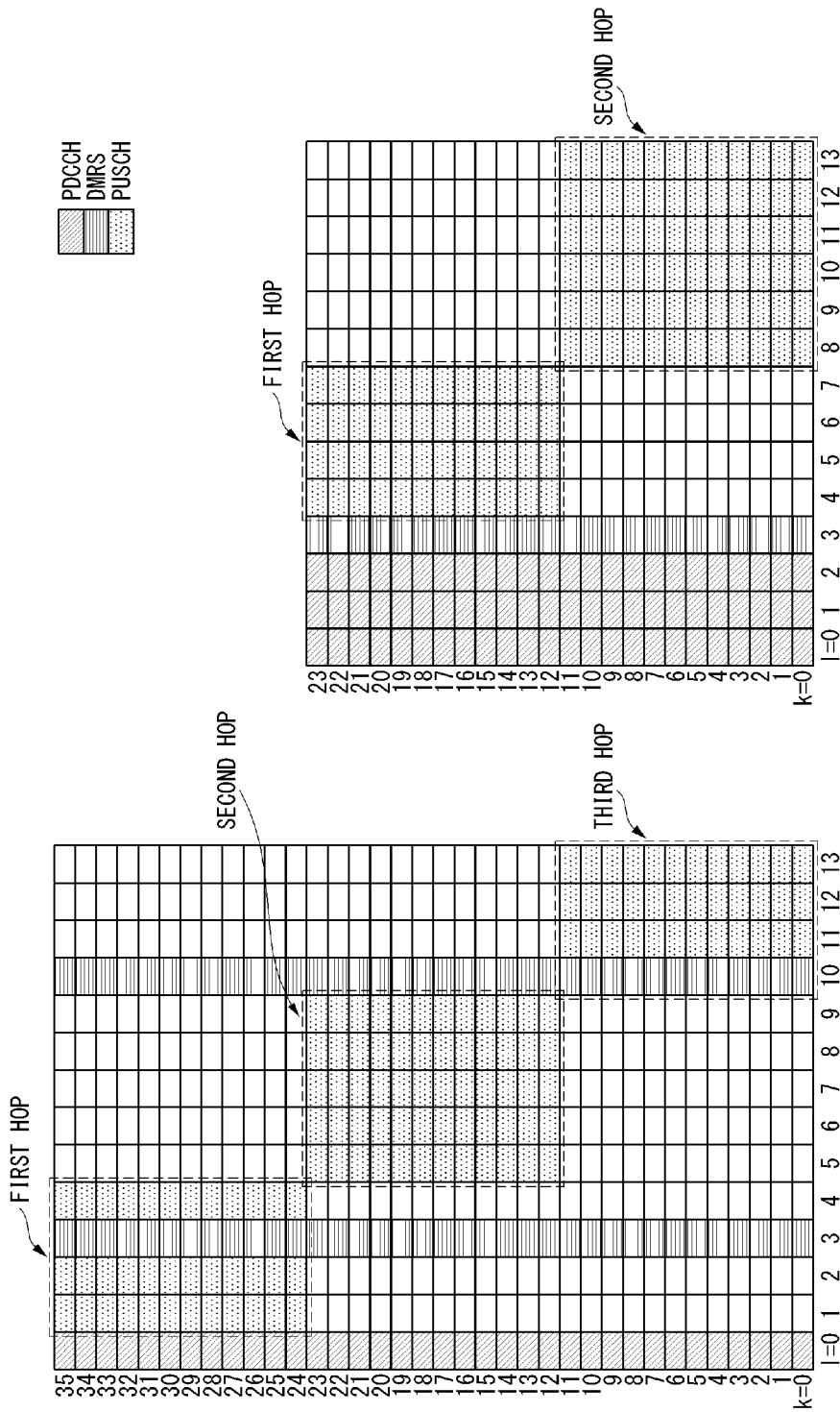
FIG. 25A illustrates one example of a method in which each of a first DMRS and a second DMRS is mapped to one OFDM symbol and transmitted.
FIG. 25B illustrates one example of a method in which only a first DMRS is mapped to one OFDM symbol and transmitted.

As another embodiment, the OFDM symbol to which the DMRS is mapped may be determined according to the number of hopped intervals as illustrated in FIG. 24.

That is, when the frequency hopping is performed in a specific interval in the slot as illustrated in FIG. 24, transmitting the DMRS to an occupation band of each interval is required with respect to a specific interval.

Accordingly, since transmission of the DMRS may be required regardless of the Doppler of the channel, the DMRS may be mapped to the OFDM symbol and transmitted in each hop.

Alternatively, when the number of hopping intervals of the PUSCH and the number of transmitted DMRSs are different from each other, the first DMRS and the second DMRS may be transmitted in an entire band of a specific OFDM symbol regardless of the hopping interval and the transmission region of the PUSCH as illustrated in FIGS. 25A and 25B.

FIG. 25A illustrates one example of a method in which each of the first DMRS and the second DMRS is mapped to one OFDM symbol and transmitted and FIG. 25B illustrates one example of a method in which only the first DMRS is mapped to one OFDM symbol and transmitted.

When the DMRS is mapped to the OFDM symbol as illustrated in FIG. 25A, the UE performing the hopping and the UE not performing the hopping may perform the MU-MIMO operation.

That is, since the DMRS is mapped to a specific OFDM symbol and transmitted in the entire band in which the PUSCH is transmitted, the DMRS is mapped to the same OFDM symbol regardless of whether the frequency is hopped in all UEs.

Accordingly, since the orthogonality of each UE is guaranteed, the UEs may perform the MU-MIMO operation regardless of whether the frequency is hopped.

In a normal LTE system, when the frequency hopping is applied, a fixed hopping resource and the DMRS are defined to be mapped to each other according to a rule pre-promised between the eNB and the UE.

However, when the frequency hopping is applied in the NR, since the ENB may announce information on the hopping resource to the UE, there is an effect that a higher degree of freedom may be provided in configuring the resource.

Further, when the DMRS is transmitted by using the frequency hopping method described in FIGS. 22A to 25B, a decoding time of received data may be reduced and there is an effect that the MU-MIMO between the UE performing the frequency hopping and the UE not performing the frequency hopping may be supported.

FIGS. 26 to 31D are diagrams illustrating one example of a mapping pattern of a demodulation reference signal for performing an MU-MIMO operation between UEs proposed by the present disclosure.

Referring to FIGS. 26 to 31D, the MU-MIMO operation may be performed among the UEs in which the first DMRS and the second DMRS are mapped to the same location or different locations.

Specifically, the DMRS in the NR may be divided into the first DMRS and the second DMRS and mapped to the OFDM symbol.

The first DMRS may be defined in units of the OFDM symbol for a fast decoding speed and positioned in a former symbol in the OFDM constituting the PDSCH or PUSCH.

Further, the second DMRS may be mapped in order to estimate a channel which varies in a time domain with respect to a time-varying channel due to Doppler spread, Doppler shift, etc., together with the first DMRS.

The first DMRS may be defined as a 1-symbol front-load DMRS and a 2-symbol front-load DMRS according to the number of constituted OFDM symbols and configured through the higher layer signaling or DCI signaling.

Further, when the second DMRS is defined together with the 1-symbol front-load DMRS, the second DMRS may be defined as the 1-symbol additional DMRS and when the second DMRS is defined together with the 2-symbol front-load DMRS, the second DMRS may be defined as the 2-symbol additional DMRS.

Table 22 below shows one example for the numbers and locations of 1-symbol additional DMRSs (starting from a 0-th symbol).

TABLE 22

| Position of the last PDSCH | One 1-symbol additional DMRS | Two 1-symbol additional DMRS | Three 1-symbol additional DMRS |
|---|---|---|---|
| $13^{th}$ | $11^{th}$ | $7^{th}, 11^{th}$ | $5^{th}, 8^{th}, 11^{th}$ |
| $12^{th}$ | $11^{th}$ | $7^{th}, 11^{th}$ | $5^{th}, 8^{th}, 11^{th}$ |
| $11^{th}$ | $9^{th}$ | $6^{th}, 9^{th}$ | $5^{th}, 8^{th}, 11^{th}$ |
| $10^{th}$ | $9^{th}$ | $6^{th}, 9^{th}$ | N/A |
| $9^{th}$ | $9^{th}$ | $6^{th}, 9^{th}$ | N/A |
| $8^{th}$ | $7^{th}$ | N/A | N/A |

Table 23 below shows one example for the numbers and locations of 2-symbol additional DMRSs (starting from the 0-th symbol).

TABLE 23

| Position of the last PDSCH | One 2-symbol additional DMRS | Two 2-symbol additional DMRS | Three 2-symbol additional DMRS |
|---|---|---|---|
| $13^{th}$ | $10^{th}, 11^{th}$ | N/A | N/A |
| $12^{th}$ | $10^{th}, 11^{th}$ | N/A | N/A |
| $11^{th}$ | $8^{th}, 9^{th}$ | N/A | N/A |
| $10^{th}$ | $8^{th}, 9^{th}$ | N/A | N/A |
| $9^{th}$ | N/A | N/A | N/A |
| $8^{th}$ | N/A | N/A | N/A |

As described above, in the NR, the number of OFDM symbols constituting the first DMRS may vary depending on the UE and the numbers and the locations of second DMRSs may also vary depending on the UE.

When the DMRS is differently configured depending on the UE as such, a method for MU-MIMO between UEs having differently configured DMRSs and related signaling may be defined.

One example of the case where the DMRS is differently configured depending on the UE as described above may be described below.

The number or/and locations of OFDM symbols constituting the first DMRS are differently configured.
  ex) UE 1: 1-symbol front-load DMRS, UE 2: 2-symbol front-load DMRS
The number or/and locations of second DMRSs are differently configured.
  ex) UE 1: two 1-symbol additional DMRS, UE 2: one 1-symbol additional DMRS
The number and/or locations of OFDM symbols constituting the first DMRS and the number and/or locations of second DMRSs are differently configured.
  ex) UE 1: one 2-symbol additional DMRS, UE 2: two 1-symbol additional DMRS In the above example, it may be assumed that the mapping types of the DMRSs may be the same as each other.

In this case, the MU-MIMO between different UEs may be performed through the following method.

First, the eNB may combine DMRS antenna ports so as to perform the MU-MIMO operation only between the UEs in which the same DMRS is configured.

Specifically, the eNB may configure the UEs in which the same first DMRS and second DMRS are configured as a specific group and configures different DMRS antenna ports in different UEs only in the configured specific group and configures orthogonal MU-MIMO or different DMRS sequences to perform quasi-orthogonal MU-MIMO.

In this case, configuring the same DMRS means that the number and locations of OFDM symbols constituting the first DMRS are the same as each other, the number and locations of OFDM symbols constituting the second DMRS are the same as each other, and the mapping types of the first DMRS and the second DMRS are the same as each other.

As described above, when the MU-MIMO is performed only between the UEs in which the same DMRS is configured, the UE may assume that only a UE in which a DMRS having the same configuration value as the DMRS configured therein may be configured to perform the MU-MIMO.

Accordingly, since the UE may perform only detection for a port(s) of another UE which is MU-paired on the DMRS configured in the UE without separate signaling, the orthogonality between the MU-paired UEs may be maintained and an execution operation may be concisely defined from the viewpoint of the signaling and the from the viewpoint of the UE.

Second, when the eNB combines the DMRS antenna ports so as to perform the MU-MIMO operation between the UEs in which different DMRSs are configured, the eNB may perform muting so as not to transmit/receive data in a specific resource region.

Specifically, when a combination of DMRS ports capable of performing the MU-MIMO is configured between the UEs in which different DMRSs are configured, the eNB may configure a configuration value indicating that data is not transmitted but muted in a region in which the DMRSs of both UEs do not overlap with each other in the UE through the higher layer signaling (e.g., RRC and/or MAC CE) and/or DCI signaling.

That is, when different DMRSs are configured between the UEs in which the MU-MIMO is performed, the eNB may configure so as not to transmit data from the eNB or not to transmit data to the eNB in a specific resource region in order to protect the DMRS of another UE.

In this case, configuring different DMRSs means that at least one of the number and locations of OFDM symbols constituting the first DMRS, the number and locations of OFDM symbols constituting the second DMRS, and the mapping types of the first DMRS and the second DMRS is different.

Further, the configuration value may be defined as a type such as a location set of a specific OFDM symbol in which rate matching is performed or an interference layer/port is transmitted and/or a frequency pattern (e.g., Comb offset or RE group offset).

Table 24 below shows one example of the configuration value.

TABLE 24

| state | OFDM symbol index | Frequency pattern |
|---|---|---|
| pattern_mupaired_ue = 0 | $7^{th}$ | Comb offset pattern 0 |
| pattern_mupaired_ue = 1 | $7^{th}$, $11^{th}$ | Comb offset pattern 0 |
| pattern_mupaired_ue = 2 | $7^{th}$ | Comb offset pattern 1 |
| pattern_mupaired_ue = 3 | $7^{th}$, $11^{th}$ | Comb offset pattern 1 |
| pattern_mupaired_ue = 4 | $7^{th}$ | RE group offset pattern 0 |
| pattern_mupaired_ue = 5 | $7^{th}$, $11^{th}$ | RE group offset pattern 0 |
| pattern_mupaired_ue = 6 | $7^{th}$ | RE group offset pattern 1 |
| pattern_mupaired_ue = 7 | $7^{th}$, $11^{th}$ | RE group offset pattern 1 |
| pattern_mupaired_ue = 8 | $7^{th}$ | RE group offset pattern 2 |
| pattern_mupaired_ue = 9 | $7^{th}$, $11^{th}$ | RE group offset pattern 2 |
| pattern_mupaired_ue = 10 | $7^{th}$ | Full occupied |
| pattern_mupaired_ue = 11 | $7^{th}$, $11^{th}$ | Full occupied |
| pattern_mupaired_ue = 12 | reserved | reserved |
| pattern_mupaired_ue = 13 | reserved | reserved |
| pattern_mupaired_ue = 14 | reserved | reserved |
| pattern_mupaired_ue = 15 | reserved | reserved |

In Table 24, an OFDM symbol index may mean an OFDM symbol index to perform muting (rate matching).

Figure 26:
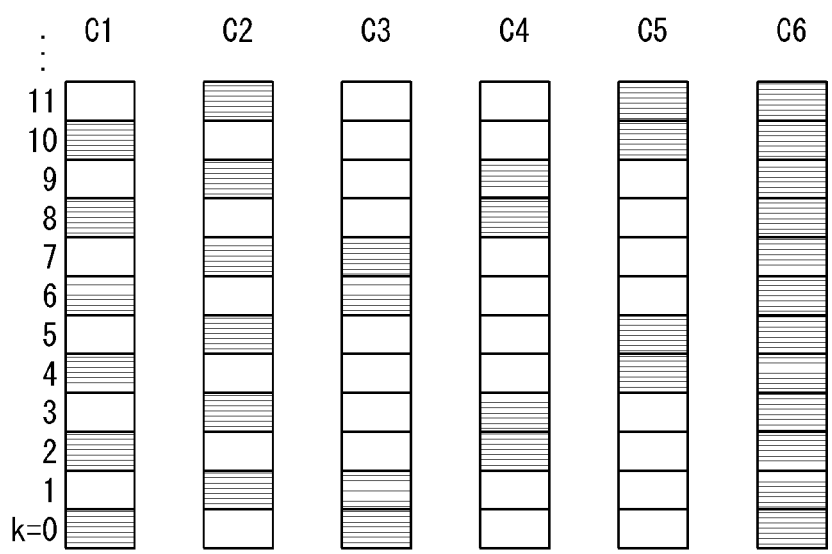

The frequency pattern may represent a pattern which the DMRS has in a specific OFDM symbol as illustrated in FIG. 26.

In FIG. 26, C1, C2, C3, C4, C5, and C6 represent examples of Comb offset pattern 0, Comb offset pattern 1, RE group offset pattern 0, RE group offset pattern 1, RE group offset pattern 2, and Full occupied of Table 24.

Figure 27:
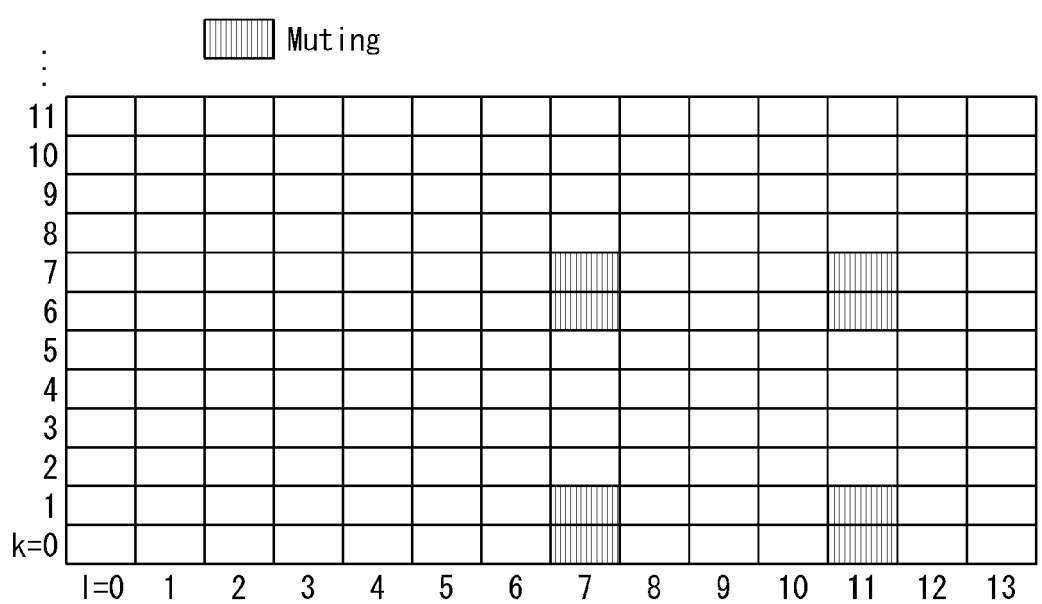
Figure 29A:
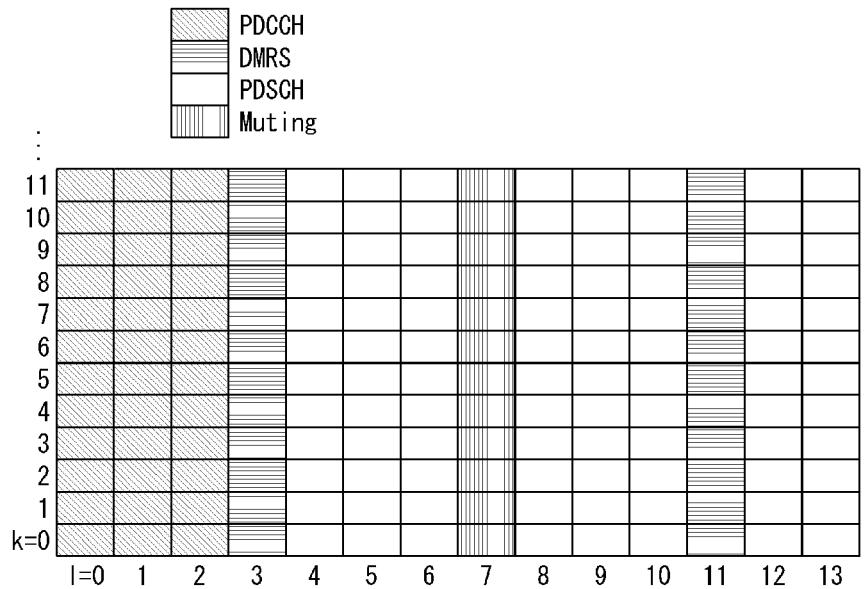
Figure 29B:
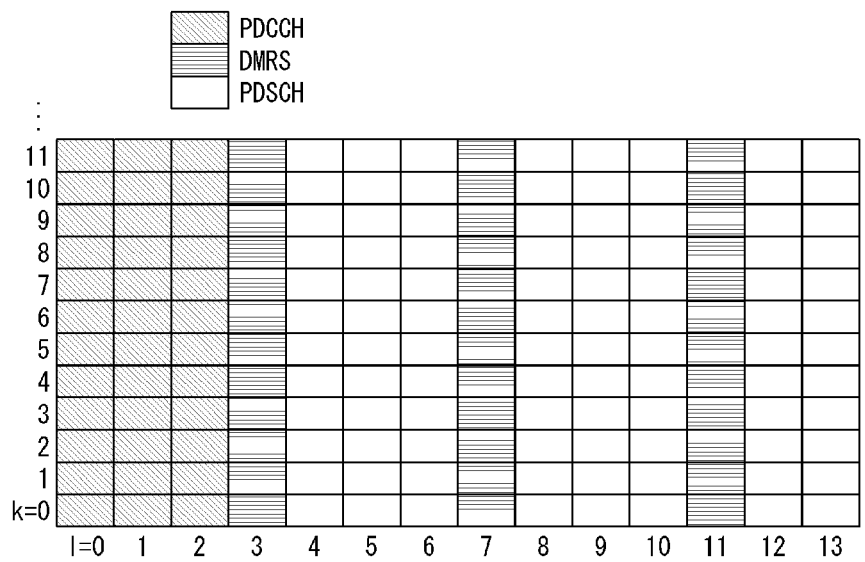

When "pattern_mupaired_ue=5" is indicated to a specific UE as the configuration value in Table 24 as illustrated in FIG. 27, the UE performs muting in the corresponding region.

FIG. 28A illustrates a case where one 1-symbol additional DMRS is configured in UE 1 and FIG. 28B illustrates a case where two 1-symbol additional DMRSs are configured in UE 2.

In this case, as illustrated in FIG. 28C, when UE 1 and UE 2 are subjected to MU-MIMO, the eNB may indicate that data is not transmitted/received but muted in a resource region corresponding OFDM symbol index 7 which is a resource region in which UE 2 transmits the DMRS to UE 1.

In FIGS. 28A to 28C, a region meaning the DMRS is expressed by an entire specific OFDM symbol, but it is apparent that an RE(s) occupied for actual DMRS transmission may vary depending on a DMRS pattern configured in an actual UE.

In this case, the ENB may indicate information on antenna port(s) which may be MU-paired with each UE through higher layer signaling (e.g., RRC and/or MAC CE) and/or DCI signaling.

When the MU-MIMO is performed between both UEs in which the configurations of the DMRSs are not the same as each other through such a method, since whether muting is performed may be indicated to a specific UE in the region where the DMRSs of both UEs do not overlap with each other, the DMRS of another UE may be protected and the orthogonal MU-MIMO operation may be available even between the UEs in which different DMRSs are configured.

Third, when the eNB combines the DMRS antenna ports so as to perform the MU-MIMO operation between the UEs in which different DMRSs are configured, the eNB may transmit configuration values related to configurations of the DMRSs of the UEs.

Specifically, when the UEs in which different DMRSs are configured are configured to perform the MU-MIMO operation, the eNB may indicate configuration information related to the DMRS configuration of another UE which is MU-paired with each UE to the UE through the higher layer signaling (e.g., RRC and/or MAC CE) and/or DCI signaling.

In addition, when a specific resource region where the DMRSs do not overlap with each other occurs with respect to different UEs which are MU-paired, the eNB may instruct the UE in which the DMRS is configured to transmit/receive the DMRS and instruct the UE in which the DMRS is not configured to prevent transmission/reception of data in the specific resource region.

That is, the eNB may transmit the configuration information related to the DMRS configuration of a counterpart UE to each of the MU-paired UEs and a resource region where the DMRSs of the MU-paired UEs are transmitted may be muted so as to prevent another UE to transmit/receive data in order to protect the corresponding DMRS.

In addition, when the DMRS configuration information of another MU-paired UE, which is instructed from the ENB through the signaling is different from the DMRS configuration information configured in the UE, the UE in which the DMRS is configured in the specific resource region may assume that the DMRS is transmitted in the specific resource region and perform data receiving and channel estimating processes.

Further, the UE in which the DMRS is not configured in the specific resource region may assume that data is not transmitted in the specific resource region and perform the data receiving and channel estimating processes.

In this case, the configuration information may include parameters indicating the number and locations of symbols to which the first DMRS and the second DMRS of the MU-paired UE are mapped, respectively.

Figure 30A:
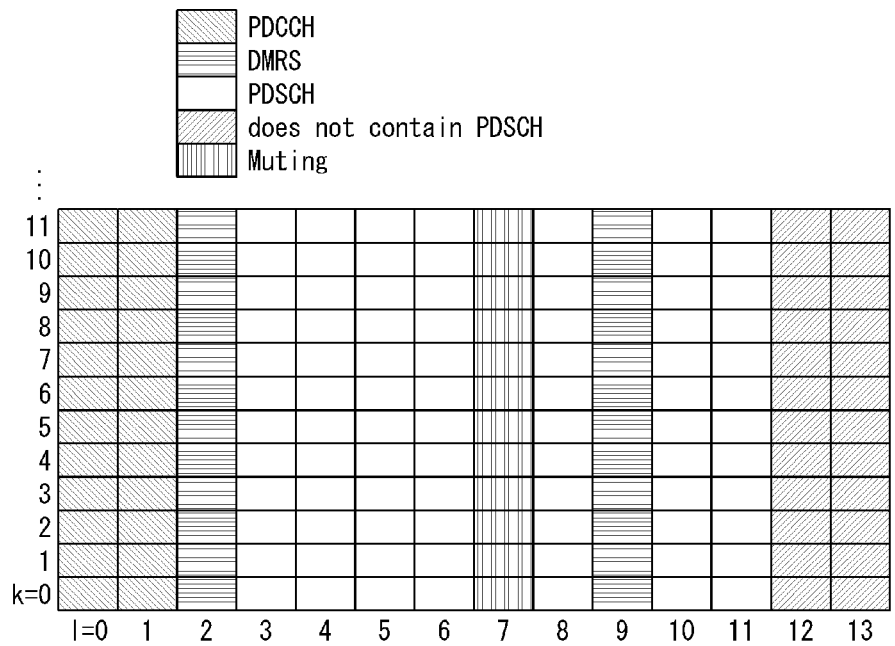
Figure 30B:
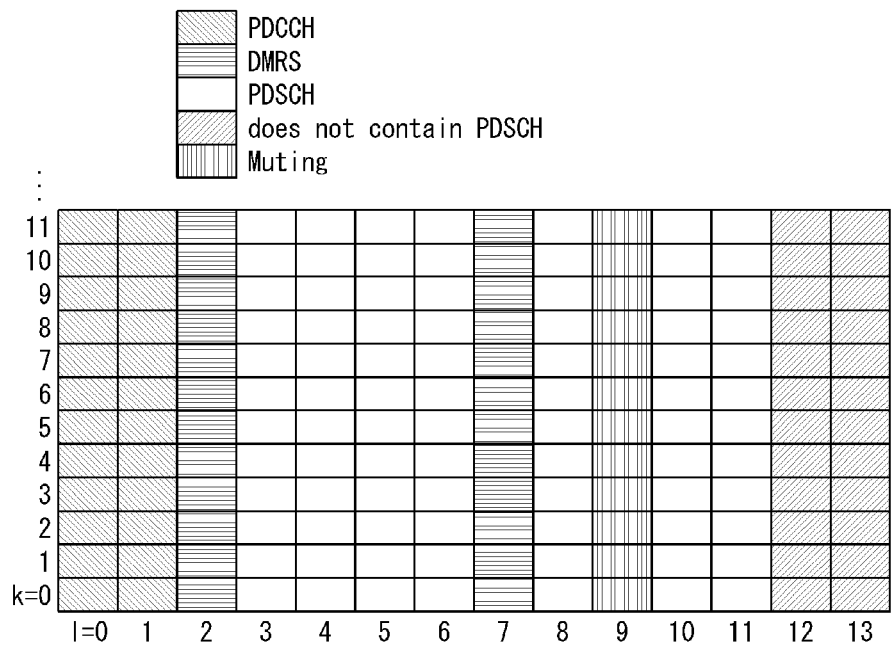

For example, when UE 1 in which the first DMRS and the second DMRS are configured as illustrated in FIG. 30A and UE 2 in which the first DMRS and the second DMRS are configured as illustrated in FIG. 30B are MU-paired, the UE may transmit the DMRS configuration information of UE 2 to UE 1 and transmit the DMRS configuration information of UE 1 to UE 2.

That is, UE 1 may receive, from the eNB, configuration information including the number and symbol indexes of OFDM symbols to which the first DMRS and the second DMRS of UE 2 are mapped.

UE 1 that receives the configuration information from the eNB may recognize that data is not transmitted/received but muted in OFDM symbol index '7'.

Thereafter, the UE may assume that data is not transmitted/received but muted in OFDM symbol index '7' and perform the data receiving and channel estimating procedures.

On the contrary, the UE 2 may receive, from the eNB, configuration information including the number and symbol indexes of OFDM symbols to which the first DMRS and the second DMRS of UE 1 are mapped.

Therefore, UE 2 may detect an interference channel due to MU-paired UE 1 in OFDM symbol indexes '3' and '11'.

Alternatively, as illustrated in FIGS. 30A and 30B, when the locations of the second DMRSs of UE 1 and UE 2 are completely different from each other, UE 1 may recognize that the DMRS of MU-paired UE 2 is configured at an OFDM symbol location different from UE 1 through the configuration information of the eNB.

UE 1 may recognize that UE 2 transmits the DMRS in OFDM symbol index '7' and assume that the data is not transmitted/received but muted in OFDM symbol index '7' and perform the data transmitting/receiving and channel estimating procedures.

UE 2 may also assume that data is not transmitted/received but muted in OFDM symbol index '9' and perform the data transmitting/receiving and channel estimating procedures.

In this case, the eNB may transmit information on antenna ports which may be MU-paired with the UE through the higher layer signaling and/or DCI signaling.

The eNB indicates the information on the antenna ports which may be MU-paired with the UE by such a method to reduce a port candidate(s) in which the UE is to perform blind detection.

Fourth, the eNB may combine DMRS antenna ports so as to perform the MU-MIMO only between the UEs in which some configuration values among the configuration values of the DMRS are the same as each other.

For example, the ENB may combine the DMRS antenna ports so that the MU-MIMO is performed between UEs in which at least one of the mapping pattern of the first DMRS or the number of mapped OFDM symbols is the same or combine the DMRS antenna ports so that the MU-MIMO is performed between UEs in which at least one of the mapping pattern of the second DMRS, the number of mapped OFDM symbols, the location of the mapped OFDM symbol, or DMRS sequences of the first DMRS and the second DMRS is the same.

In this case, some configuration values which are the same as each other among different UEs may be configured to fixed values between the eNB and the UE in advance or configured in the UE through the higher layer signaling (e.g., RRC and/or MAC CE) and/or DCI signaling.

When the eNB configures the combination of the DMRS antenna ports so that UEs satisfying such a condition may perform the MU-MIMO, the eNB may announce to the UE configuration information for some configuration values which are differently configured through the higher layer signaling (e.g., RRC and/or MAC CE) and/or DCI signaling.

That is, the MU-paired UEs may receive, from the eNB, configuration information for a configuration value configured differently therefrom among the DMRS configuration values of the counterpart UE.

When the specific resource region where the DMRSs do not overlap with each other occurs because some configuration values are different from each other with respect to different UEs which are MU-paired, the eNB may transmit the DMRS to the UE in which the DMRS is configured in the specific resource region or instruct the UE to transmit the DMRS.

Further, the eNB may not transmit data to the UE in which the DMRS is not configured in the specific resource region or instruct the UE not to transmit data.

That is, the eNB may transmit the configuration information related to the DMRS configuration of the counterpart UE to the MU-paired UEs and the MU-paired UEs may recognize a configuration value (first configuration value) configured similarly to the counterpart UE and a configuration value (second configuration value) configured differently from the counterpart UE through the configuration information transmitted from the eNB.

The UE that recognizes the configuration value configured differently from the counterpart UE through the first and second configuration values may not perform transmission/reception of data in a resource region in which the counterpart UE transmits the DMRS.

Further, the UE may assume that data is not transmitted/received in the resource region in which the counterpart UE transmits the DMRS and perform the data receiving and channel estimating procedures.

As another embodiment of the present disclosure, the eNB may transmit to the UE only the second configuration value included in the configuration information and perform such an operation based on the second configuration value.

When such a method is used, since only the second configuration value is transmitted to the UE, signaling overhead may be reduced.

For example, the eNB may configure a DMRS antenna port(s) combination in which only UEs (e.g., UE 1 and UE 2) in which the number and locations of OFDM symbols constituting the first DMRS may perform the MU-MIMO.

In this case, the eNB may transmit to UE 1 configuration information for the number and locations of OFDM symbols in which the second DMRS of UE 2 is configured and UE 1 may assume that data is not transmitted in the resource region where the second DMRS of UE 2 is configured based on the configuration information transmitted from the eNB and perform the channel estimation.

Alternatively, the eNB may configure a DMRS antenna port(s) combination in which only UEs (e.g., UE 2 and UE 2) in which the number and locations of OFDM symbols to which the second DMRS is mapped are the same may perform the MU-MIMO.

In this case, the eNB may transmit to UE 1 configuration information for the number and locations of OFDM symbols in which the second DMRS of UE 2 is configured and UE 1 may assume that data is not transmitted in the resource region where the second DMRS of UE 2 is configured based on the configuration information transmitted from the eNB and perform the channel estimation.

In the embodiment of the present disclosure, when there is a plurality of MU-paired UEs, the configuration information may include all configuration values of the plurality of UEs or a specific configuration value which may include all mapping patterns of the plurality of UEs.

Table 25 below shows one example of configuration information when the plurality of UEs is MU-paired.

TABLE 25

| Parameter to indicate the number of additional DMRS | The number of additional DMRS |
| --- | --- |
| num_add_dmrs = 0 | 0 (only front-load DMRS) |
| num_add_dmrs = 1 | 1 (one 1-symbol additional DMRS) |
| num_add_dmrs = 2 | 2 (two 1-symbol additional DMRS) |

Figure 31B:
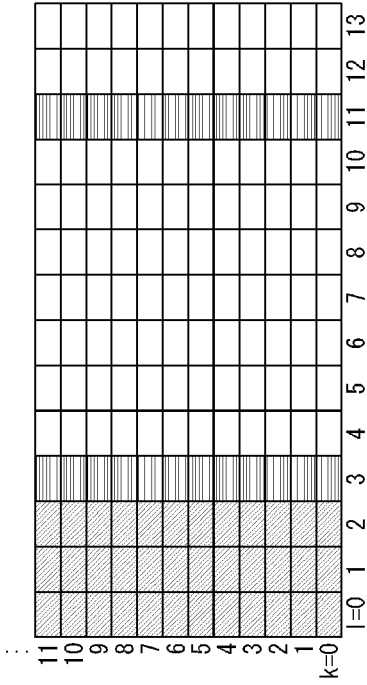
FIGS. 31A to 31D illustrate one example of a mapping pattern of a DMRS according to a value of "num_add_dmrs".

"num_add_dmrs" represents the number of OFDM symbols to which the second DMRS is mapped. FIGS. 31A to 31C[illustrate one example of the mapping pattern of the DMRS according to a value of "num_add_dmrs".

In Table 25, num_add_dmrs configured for {UE 1, UE 2, UE 3, UE 4} may be {0, 1, 1, 2} and when UE 1, UE 2, UE 3, and UE 4 are MU-paired, a specific configuration value which may include all DMRS patterns which are represented by the configuration values of the DMRSs configured for the plurality of UEs which are MU-paired may become num_add_dmrs=2.

That is, a configuration value which may include all DMRS mapping patterns of the plurality of UEs may become num_add_dmrs=2.

Accordingly, the ENB transmits to all MU-paired UEs the configuration information including num_add_dmrs=2, and as a result, respective MU-paired UEs may recognize configuration values of the DMRSs for other UEs.

Further, the UE that recognizes the configuration values of the DMRSs of other UEs mutes a resource region where the DMRSs are configured for other UEs even though the DMRS of the UE is not configured to protect the DMRSs of other UEs which are MU-paired.

As another embodiment, num_add_dmrs configured for {UE 1, UE 2, UE 3, UE 4} may be 10, 1, 1, 01 and when UE a, UE b, UE c, and UE d are MU-paired, the specific configuration value may become num_add_dmrs=1.

As yet another embodiment of the present disclosure, when the ENB configures the combination of the DMRS antenna ports so as to perform the MU-MIMO operation between the UEs in which only some configuration values are the same as each other, the ENB may limit some configuration values which are the same as each other between the UEs to a specific configuration value.

Specifically, when the antenna ports are combined so as to perform the MU-MIMO between the UEs in which some configuration values are the same as each other, RS overhead may increase due to the configuration values of different DMRSs of the UEs which are subjected to the MU-MIMO and the number of configuration values which should be transmitted to the UE increases, and as a result, the signaling overhead may increase.

Accordingly, in order to prevent the RS overhead and reduce the signaling overhead, the configuration values of the DMRSs which should be the same as each other to be MU-MIMO may be limited to a specific configuration value.

For example, in a case where FIGS. 31A to 31D are the mapping patterns of the DMRSs of UE 1, UE 2, UE 3, and UE 4, respectively, UE 1 to UE 3 are MU-MIMO with UE 4, the RS overhead increases.

That is, in the case where UE 1 to UE 3 are MU-paired with UE 4, since a lot of resources capable of transmitting data should be muted due to the mapping pattern of the DMRS, unnecessary RS overhead increases.

In particular, since the DMRS mapping pattern of UE 3 is not defined in a subset form of the DMRS mapping pattern of UE 4, when UE 3 performs the muting for MU-pairing with UE 4, the RS overhead becomes very large.

Figure 31D:
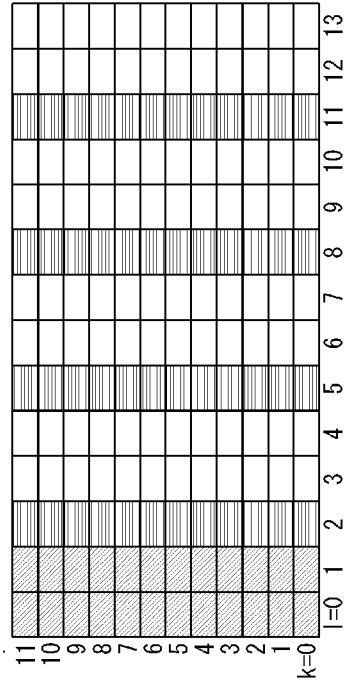
Figure 31A:
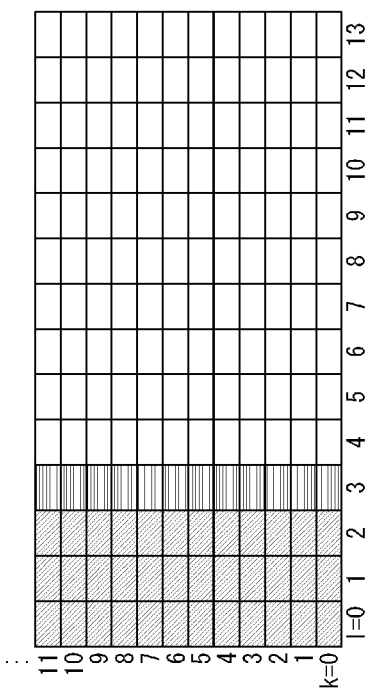
Figure 31C:
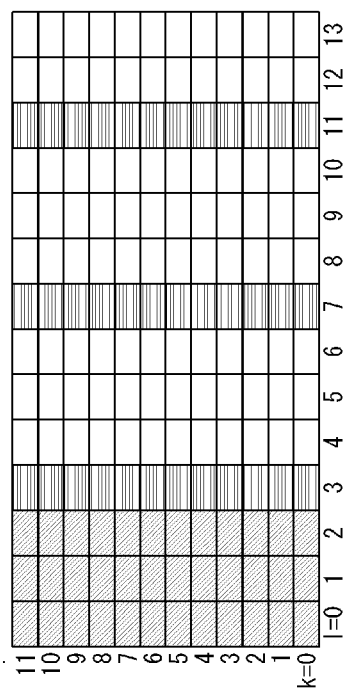

Accordingly, the configuration value may be limited to the specific configuration value so as to prevent MU-pairing with respect to the DMRS configuration illustrated in FIG. 31D, which may increase excessive RS overhead.

For example, the eNB may configure the UEs having the DMRS mapping patterns illustrated in FIGS. 31A to 31C to be MU-paired with each other and the UEs having the DMRS mapping pattern illustrated in FIG. 31D may configure the UEs which have the same DMRS mapping pattern to be MU-paired with each other.

In this case, the specific configuration value may be defined as a predetermined fixed value between the ENB and the UEs or the ENB may transmit the specific configuration value to the UEs through the higher layer signaling and/or DCI signaling.

Table 26 below shows one example of the specific configuration value.

TABLE 26

| state | OFDM symbol number of first DMRS | Number of second DMRS |
| --- | --- | --- |
| group_mupaired_dmrsconfig = 0 | {1}, {2} | {0, 1, 2}, {3} |
| group_mupaired_dmrsconfig = 1 |  | {0, 1}, {2}, {3} |
| group_mupaired_dmrsconfig = 2 |  | {0, 1}, {1, 2}, {3} |
| group_mupaired_dmrsconfig = 3 | {1, 2} | {0, 1, 2}, {3} |
| group_mupaired_dmrsconfig = 4 |  | {0, 1}, {2}, {3} |
| group_mupaired_dmrsconfig = 5 |  | {0, 1}, {1, 2}, {3} |
| group_mupaired_dmrsconfig = 6 | reserved | Reserved |
| group_mupaired_dmrsconfig = 7 | reserved | reserved |

In Table 26, a configuration value in II may mean that the MU-MIMO is available between different UEs in which the DMRS is configured.

For example, in the case of UEs in which group_mupaired_dmrsconfig meaning a combination of DMRS configuration values which may be MU-MIMO is configured to 0, the MU-MIMO between UEs of which the numbers of OFDM symbols to which the first DMRS is mapped are different from each other as 1 and 2 may not be available.

Further, the MU-MIMO may be available among UEs of which the numbers of OFDM symbols to which the second DMRS is mapped are configured to 0, 1, and 2 and a UE of which the number of OFDM symbols is configured to 3 may be MU-MIMO only with another UE of which the number of OFDM symbols is configured to 3.

As another example, in the case of UEs in which the value of group_mupaired_dmrsconfig is configured to '4', the MU-MIMO may also be available between the UEs of which the numbers of OFDM symbols to which the first DMRS is mapped are configured to be different from each other as 1 and 2.

Further, the MU-MIMO may be available between the UEs of which the numbers of OFDM symbols to which the second DMRS is mapped are configured to 0 and 1, the UE of which the number of OFDM symbols is configured to 2 may be MU-MIMO only with another UE of which the number of OFDM symbols is configured to 2, and the UE of which the number of OFDM symbols is configured to 3 may be MU-MIMO only with another UE of which the number of OFDM symbols is configured to 3.

When such a method is used, the signaling overhead due to additional signaling may increase, but the eNB may flexibly configure and control the MU-MIMO according to the case.

The eNB may instruct the UE to perform the muting through the higher layer signaling (e.g., RRC and/or MAC CE, etc.) and/or DCI signaling without transmitting data to REs other than REs to which the DMRS is mapped in the OFDM symbol in which the DMRS is configured.

Alternatively, the UE may not transmit but mute data with respect to the REs other than the REs to which the DMRS is mapped in the OFDM symbol based on a predetermined value between the eNB and the UE.

In this case, the same method may be applied all OFDM symbols in which the DMRS is configured. That is, the rate matching in the DMRS symbol may be similarly performed in all DMRS symbols.

As still yet another embodiment of the present disclosure, when the plurality of UEs performs the MU-MIMO, the eNB may configure the DMRS antenna port combination so as to perform the MU-MIMO only between UEs having the same DMRS configuration value among UEs in which at least one OFDM symbol to which the second DMRS is mapped is configured.

The embodiment may be applied even to a case of quasi-orthogonal MU-MIMO in which different DMRS sequences are configured for different UEs.

In this case, the UE may assume that only UEs having a configuration value which is the same as the DMRS configuration value configured thereto perform the MU-MIMO therewith only when the second DMRS is applied to at least one OFDM symbol.

Accordingly, since the UE may perform only detection for a port(s) of another UE which is MU-paired on the DMRS configured in the UE without separate signaling, the orthogonality between the MU-paired UEs may be maintained and an execution operation may be concise from the viewpoint of the signaling and the from the viewpoint of the UE.

As still yet another embodiment of the present disclosure, when the plurality of UEs performs the MU-MIMO, the eNB may configure the DMRS antenna port combination so as to perform the MU-MIMO between UEs in which different first DMRSs are configured among UEs in which the second DMRS is not configured.

Specifically, the number and locations of OFDM symbols to which the second DMRS is mapped may be variously configured. Accordingly, when the MU-MIMO is performed between the UEs in which the number and locations of OFDM symbols to which the second DMRS is mapped is differently configured, the signaling overhead may increase and reception complexity of the UE may increase.

However, when the second DMRS is not configured and only the first DMRS is configured, since an available configuration value of the first DMRS is limited to the 1-symbol front-load DMRS and the 2-symbol front-load DMRS, the MU-MIMO between the UEs may be permitted in order to reduce the limit for the MU-MIMO in this case.

When the second DMRS is not configured, the UE may assume that UEs having a different configuration value of the first DMRS therefrom may also be configured to perform the MU-MIMO in addition to a UE having the same configuration value of the first DMRS thereas.

Specifically, the UE does not assume that only the UE having the same configuration value of the first DMRS configured therefor is MU-paired and may perform the blind detection for the antenna port(s) which is MU-paired by using the configuration value of the first DMRS which may be MU-paired.

In this case, since signaling of information related to the MU-MIMO is reduced, the signaling overhead may be reduced.

Alternatively, the eNB may indicate to the UE a configuration value indicating that data is not transmitted/received but muted through the higher layer signaling (e.g., RRC and/or MAC CE) and/or DCI signaling with respect to a resource region where mapping of the first DMRS does not overlap with the MU-paired UEs.

The eNB does not transmit data to the UEs transmitting the signaling in the corresponding resource region and the UE may transmit data to the eNB in the corresponding region or perform data reception and channel estimation by assuming that the data is not transmitted from the eNB.

A part of the second scheme described in FIGS. 26 to 28C may be applied to the embodiment.

Alternatively, the eNB may indicate information on the configuration value of the first DMRS of another UE which is MU-paired with each UE through the higher layer signaling (e.g., RRC and/or MAC CE) and/or DCI signaling.

In addition, when the resource region where the mapping of the first DMRS does not overlap occurs in the MU-paired UEs as described above, the eNB may transmit the first DMRS to the UEs in which the first DMRS is configured in the corresponding resource region and may not transmit data to the UEs in which the first DMRS is not configured in the corresponding resource region.

In this case, when the configuration value of the first DMRS of another MU-paired UE, which is indicated through the signaling is different from the first DMRS configuration value configured for the UE, the UE may assume that the first DMRS of another UE is transmitted to the corresponding resource region and perform the data receiving and channel estimating processes.

A part of the third scheme described in FIGS. 30A to 31D may be applied to the embodiment.

Figure 32:
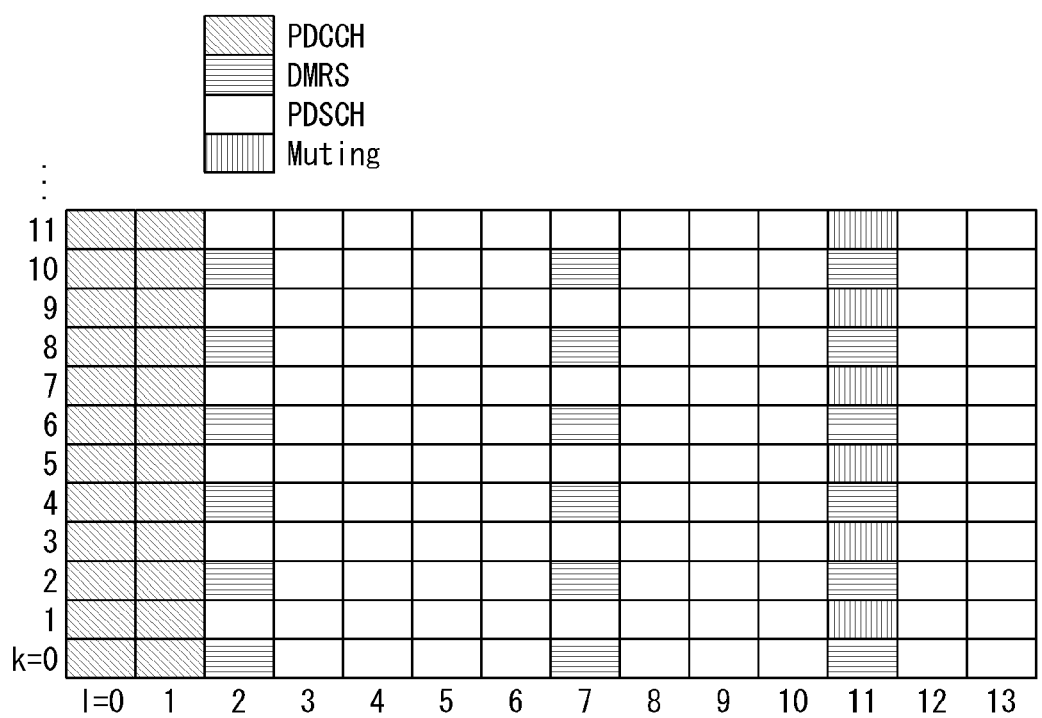
FIG. 32 is a diagram illustrating one example of a method for determining transmission power of a demodulation reference signal proposed by the present disclosure.

FIG. 32 is a diagram illustrating one example of a method for determining transmission power of a demodulation reference signal proposed by the present disclosure.

Referring to FIG. 32, a value of a power ratio between the DMRS and the data, which is configured in the first DMRS may be applied similarly to all second DMRSs.

Specifically, when the first DMRS and the second DMRS are configured for the UE as illustrated in FIG. 32, data may be muted in an OFDM symbol in which a specific second DMRS is configured due to multiplexing with another RS such as the CSI-RS.

That is, data may not be transmitted/received in specific REs due to multiplexing with other reference signals in a specific OFDM symbol to which the second DMRS is mapped.

In this case, power of muted REs is added to the second DMRS to boost the RS. However, when only the transmission power of the specific second DMRS is boosted, the DMRSs configured for the UEs have different transmission power, and as a result, the power ratio between the DMRS and the data may vary depending on the DMRS, thereby degrading the channel estimation performance of the UE.

Accordingly, the ENB may indicate to the UE the power ratio of different DMRSs and the data in order to guarantee accurate channel estimation of the UE or configure the power ratios of the DMRSs and the data to the same value with respect to all DMRSs configured for the UE.

In this case, the power ratio of the DMRS and the data may be configured based on the first DMRS.

Even when only a case for uplink or downlink is described in FIGS. 17A to 32, in a case where it is specified that the embodiments are limitedly applied to the uplink or downlink, the embodiments of the present disclosure may be applied to the downlink in addition to the uplink.

Figure 33:
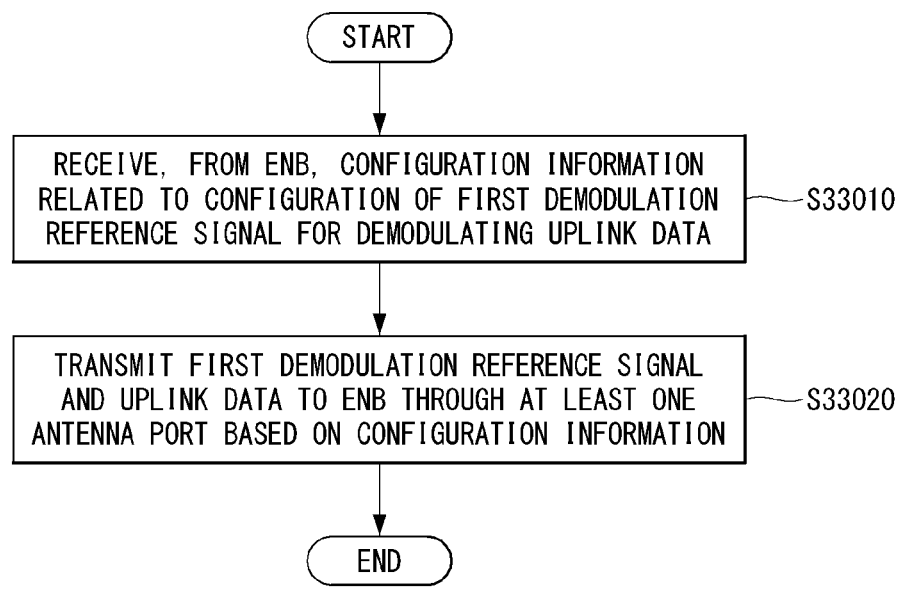
FIG. 33 is a flowchart showing one example of a method for transmitting a demodulation reference signal proposed by the present disclosure.

FIG. 33 is a flowchart showing one example of a method for transmitting a demodulation reference signal proposed by the present disclosure.

Referring to FIG. 33, the UE receives, from the eNB, configuration information related to the configuration of the first demodulation reference signal for modulating downlink data (S33010). In this case, the configuration information may include parameters related the configuration information and the DMRS described in FIGS. 20 to 32.

Thereafter, the UE receives the first demodulation reference signal and the downlink data from the eNB through at least one antenna port based on the configuration information (S33020).

In this case, the first demodulation reference signal and the downlink data may be transmitted by using the frequency hopping described in FIGS. 22A to 25B in the subframe and the first demodulation reference signal may be positioned on the same time-axis symbol as at least one another demodulation reference signal transmitted on another antenna port as described in FIGS. 17A to 19B.

The UE may receive from the eNB the downlink data and the demodulation reference signal for demodulating the downlink data through such a method.

The method described in FIG. 33 may be applied even to transmission of the uplink data.

That is, the eNB may transmit the configuration information related to the configuration of the demodulation reference signal for demodulating the uplink data and receive the demodulation reference signal and the uplink data from the UE.

Figure 34:
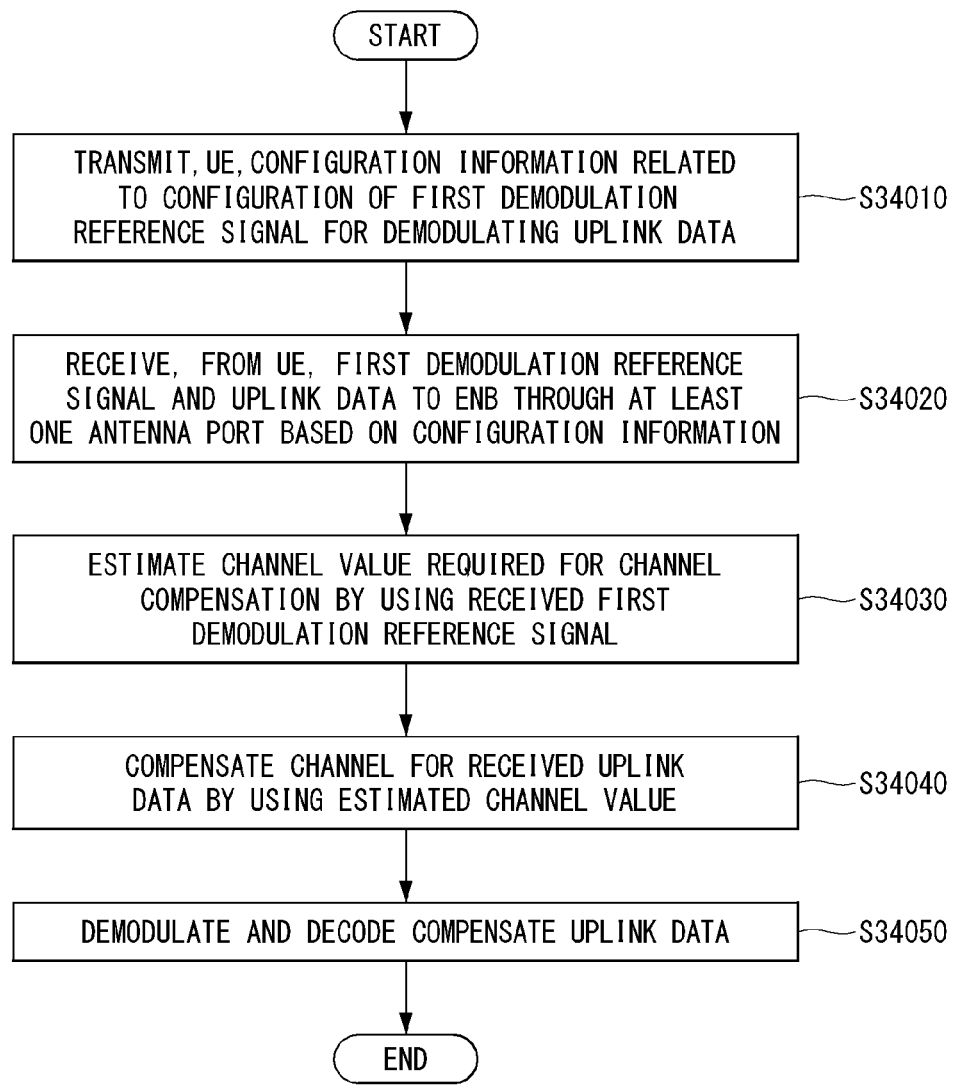
FIG. 34 is a flowchart showing one example of a method for decoding data by receiving a demodulation reference signal proposed by the present disclosure.

FIG. 34 is a flowchart showing one example of a method for decoding data by receiving a demodulation reference signal proposed by the present disclosure.

Referring to FIG. 34, the UE receives, from the eNB, configuration information related to the configuration of the first demodulation reference signal for modulating downlink data (S34010). In this case, the configuration information may include parameters related the configuration information and the DMRS described in FIGS. 20 to 32.

Thereafter, the UE receives the first demodulation reference signal and the downlink data from the eNB through at least one antenna port based on the configuration information (S34020).

The UE estimates a channel value required for channel compensation by using the first demodulation reference signal received from the eNB and performs the channel compensation for the received downlink data by using the estimated channel value (S34030 and S34040).

Thereafter, the UE may perform demodulation and decoding of the compensated downlink data (S34050).

In this case, the first demodulation reference signal and the downlink data may be transmitted by using the frequency hopping described in FIGS. 22A to 25B in the subframe and the first demodulation reference signal may be positioned on the same time-axis symbol as at least one another demodulation reference signal transmitted on another antenna port as described in FIGS. 17A to 19B.

The method described in FIG. 34 may be applied even to the case where the UE transmits the uplink data to the eNB.

Figure 35:
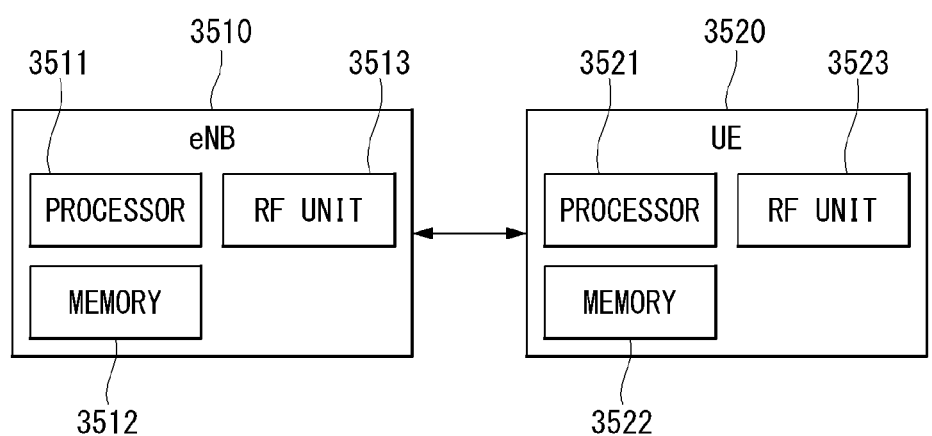
FIG. 35 is a diagram illustrating one example of an internal block diagram of a wireless device to which the present disclosure may be applied.

FIG. 35 is a diagram illustrating one example of an internal block diagram of a wireless device to which the present disclosure may be applied.

Here, the wireless device may be an eNB and a UE and the eNB includes both a macro eNB and a small eNB.

As illustrated in FIG. 35, the eNB 3510 and the UE 3520 include communication units (a transceiving unit 3513 and an RF 3523), processors 3511 and 3521, and memories 3512 and 3522.

Besides, the eNB and the UE may further include an input unit and an output unit.

The communication units 3513 and 3523 the processors 3511 and 3521, the input unit, the output unit, and the memories 3512 and 3522 are functionally connected to perform the method proposed in the present disclosure.

Upon receiving information generated from a PHY protocol layer, the communication units (the transceiving unit 3513 and the RF unit 3523) and move the received information to a radio-frequency (RF) spectrum and performs filtering, amplification, and the like and transmits the information to an antenna. Further the communication unit performs a function to move a radio frequency RF) signal received by the antenna to a band that may be processed by a PHY protocol and perform filtering.

In addition, the communication unit may also include a switch function for switching transmission and reception functions.

The processors 3511 and 3521 implement a function, a process, and/or a method which are proposed in the present specification. Layers of a radio interface protocol may be implemented by the processor.

The processor may be expressed as a control section, a controller, a control unit, a computer, and the like.

The memories 3512 and 3522 are connected with the processor to store a protocol or a parameter for performing the uplink resource allocation method.

The processors 3511 and 3521 may include an application-specific integrated circuit (ASIC), another chipset, a logic circuit, and/or a data processing apparatus. The memory may include a read-only memory (ROM), a random access memory (RAM), a flash memory, a memory card, a storage medium, and/or other storage devices. The communication unit may include a baseband circuit for processing the radio signal. When the embodiment is implemented by software, the aforementioned technique may be implemented by a module (a process, a function, and the like) that performs the aforementioned function.

The module may be stored in the memory and executed by the processor. The memory may be positioned inside or outside the processor and connected with the processor by various well-known means.

An output unit (display section or display unit) is controlled by the processor, and outputs information output from the processor together with a key input signal generated by a key input unit various information signals from the processor.

Furthermore, although the drawings have been described for the sake of convenience of explanation, it is also possible to design a new embodiment to be implemented by merging the embodiments described in each drawing. In addition, it is also within the scope of the present disclosure to design a computer-readable recording medium in which a program for executing the previously described embodiments is recorded according to the needs of those skilled in the art.

Configurations and methods of the described embodiments may not be limitedly applied to the method for transmitting/receiving the reference signal according to present disclosure, but all or some of the respective embodiments may be selectively combined and configured so as to be variously modified.

Meanwhile, the method for transmitting/receiving the reference signal according to present disclosure may be implemented as a processor readable code in a processor readable recording medium provided in a network device. The processor readable recording medium includes all kinds of recording devices storing data which may be deciphered by a processor. Examples of the processor readable recording medium include a ROM, a RAM, a CD-ROM, a magnetic tape, a floppy disk, an optical data storage device, and the like and further include a device implemented as a type of a carrier wave such as transmission through the Internet. Further, the processor readable recording media may be stored and executed as codes which may be distributed in the computer system connected through a network and read by the processor in a distribution method.

Further, although the embodiments of present disclosure have been illustrated and described above, present disclosure is not limited to the aforementioned specific embodiments, various modifications may be made by a person with ordinary skill in the technical field to which the present disclosure pertains without departing from the subject matters of the present disclosure that are claimed in the claims, and these modifications should not be appreciated individually from the technical spirit or prospect of the present disclosure.

In addition, in present disclosure, both the invention of the object and the invention of the method are described and the description of both inventions may be supplemented as necessary.

INDUSTRIAL APPLICABILITY

An example in which in the wireless communication system of the present disclosure, the RRC connection method is applied to the 3GPP LTE/LTE-A system is described primarily, but it is possible to apply the RRC connection method to various wireless communication systems in addition to the 3GPP LTE/LTE-A system.

What is claimed is:

1. A method for transmitting a reference signal by a terminal in a wireless communication system, the method comprising:
    receiving, from a base station, configuration information related to a configuration of a first demodulation reference signal for demodulating uplink data; and
    transmitting the first demodulation reference signal and the uplink data to the base station through at least one antenna port based on the configuration information,
    wherein the first demodulation reference signal and the uplink data are transmitted by using frequency hopping in a subframe, and
    wherein the first demodulation reference signal is positioned on the same time-axis symbol as at least one another demodulation reference signal transmitted on another antenna port.

2. The method of claim 1, wherein the frequency hopping is performed in units of one hop, and
    wherein the hop includes at least one Orthogonal Frequency Division Multiplexing (OFDM) symbol to which the first demodulation reference signal is mapped.

3. The method of claim 1, wherein the first demodulation reference signal is transmitted in a first hop in the subframe and positioned in a first OFDM symbol of the first hop.

4. The method of claim 1, wherein the configuration information includes at least one of a first parameter indicating whether to apply the frequency hopping or resource information indicating a location of each hop in which the frequency hopping is performed in the subframe.

5. The method of claim 1, further comprising:
    transmitting a second demodulation reference signal to the base station through the at least one antenna port based on the configuration information,
    wherein the second demodulation reference signal is transmitted in a second hop in the subframe and positioned in the first OFDM symbol of the second hop.

6. The method of claim 5, wherein the terminal performs uplink multi user (MU)-multiple-input multiple output (MIMO) with another terminal.

7. The method of claim 6, wherein the configuration information further includes pattern information of mapping patterns of the first demodulation reference signal and the second demodulation reference signal, and
    wherein locations of OFDM symbols to which the first and second demodulation reference signals are mapped are the same as the location of a symbol to which the demodulation reference signal of another terminal is mapped.

8. The method of claim 7, wherein the numbers and locations of OFDM symbols to which the first and second demodulation reference signals are mapped are the same as the number and locations of OFDM symbols to which the demodulation reference signal of the another terminal is mapped.

9. The method of claim 7, wherein when the number and locations of OFDM symbols to which the first or second demodulation reference signal is mapped is different from the number and locations of OFDM symbols to which the demodulation reference signal of the another terminal is mapped, the OFDM symbol to which the demodulation reference signal of the another terminal is mapped is muted.

10. The method of claim 9, wherein the configuration information further includes configuration information indicating the number and locations of OFDM symbols to which the demodulation reference signal of the another terminal is mapped.

11. A terminal transmitting a reference signal in a wireless communication system, the terminal comprising:
    a radio frequency (RF) unit transmitting and receiving a radio signal to and from the outside; and
    a processor functionally coupled with the RF unit,
    wherein the processor is configured to
    receive, from a base station, configuration information related to a configuration of a first demodulation reference signal for demodulating uplink data, and
    transmit the first demodulation reference signal and the uplink data to the base station through at least one antenna port based on the configuration information,
    wherein the first demodulation reference signal and the uplink data are transmitted by using frequency hopping in a subframe, and
    wherein the first demodulation reference signal is positioned on the same time-axis symbol as at least one another demodulation reference signal transmitted on another antenna port.

12. The terminal of claim 11, wherein the frequency hopping is performed in units of one hop, and
    wherein the hop includes at least one Orthogonal Frequency Division Multiplexing (OFDM) symbol to which the first demodulation reference signal is mapped.

13. The terminal of claim 11, wherein the first demodulation reference signal is transmitted in a first hop in the subframe and positioned in a first OFDM symbol of the first hop.

14. The method of claim 11, wherein the configuration information includes at least one of a first parameter indicating whether to apply the frequency hopping or resource information indicating a location of each hop in which the frequency hopping is performed in the subframe.

15. The terminal of claim 11, wherein the processor is configured to transmit a second demodulation reference signal to the base station through the at least one antenna port based on the configuration information, and
    wherein the second demodulation reference signal is transmitted in a second hop in the subframe and positioned in the first OFDM symbol of the second hop.

16. The terminal of claim 15, wherein the terminal performs uplink multi user (MU)-multiple-input multiple output (MIMO) with another terminal.

17. The terminal of claim 16, wherein the configuration information further includes pattern information of mapping patterns of the first demodulation reference signal and the second demodulation reference signal, and wherein locations of OFDM symbols to which the first and second demodulation reference signals are mapped are the same as the location of a symbol to which the demodulation reference signal of another terminal is mapped.

18. The terminal of claim 17, wherein the numbers and locations of OFDM symbols to which the first and second demodulation reference signals are mapped are the same as the number and locations of OFDM symbols to which the demodulation reference signal of the another terminal is mapped.

19. The terminal of claim 17, wherein when the number and locations of OFDM symbols to which the first or second demodulation reference signal is mapped is different from the number and locations of OFDM symbols to which the demodulation reference signal of the another terminal is mapped, the OFDM symbol to which the demodulation reference signal of the another terminal is mapped is muted.

20. The terminal of claim 19, wherein the configuration information further includes configuration information indicating the number and locations of OFDM symbols to which the demodulation reference signal of the another terminal is mapped.

* * * * *